(12) United States Patent
Edge

(10) Patent No.: US 12,207,158 B2
(45) Date of Patent: Jan. 21, 2025

(54) METHOD AND APPARATUS FOR SECURE LOCATION OF A MOBILE DEVICE

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 17/673,197

(22) Filed: Feb. 16, 2022

(65) Prior Publication Data

US 2023/0262416 A1 Aug. 17, 2023

(51) Int. Cl.
*H04W 4/029* (2018.01)
*G01S 5/02* (2010.01)
*H04W 12/121* (2021.01)

(52) U.S. Cl.
CPC .......... *H04W 4/029* (2018.02); *G01S 5/0236* (2013.01); *G01S 5/0244* (2020.05); *H04W 12/121* (2021.01)

(58) Field of Classification Search
CPC ... H04W 4/029; H04W 12/121; G01S 5/0244; G01S 5/0236
USPC ...................................................... 455/456.1
See application file for complete search history.

(56) References Cited

U.S. PATENT DOCUMENTS

| | | | |
|---|---|---|---|
| 2011/0227787 A1 | 9/2011 | Gum et al. | |
| 2015/0350833 A1* | 12/2015 | Kazemi | H04W 4/029 455/456.6 |
| 2021/0333411 A1 | 10/2021 | Gum et al. | |
| 2023/0224849 A1* | 7/2023 | Modarres Razavi | H04W 88/18 455/456.1 |

OTHER PUBLICATIONS

International Search Report and Written Opinion—PCT/US2022/082310—ISA/EPO—Apr. 24, 2023.

* cited by examiner

*Primary Examiner* — Ted M Wang
(74) *Attorney, Agent, or Firm* — Thien T. Nguyen

(57) ABSTRACT

Techniques are described for securely locating a user equipment (UE). Positioning measurements from the UE, which may be spoofed or not spoofed, are received by a location server, and used to determine a location uncertainty, which is used to determine whether the positioning measurements may be spoofed. The location uncertainty, for example, may be compared to an expected location uncertainty for positioning measurements that are not spoofed. If the location uncertainty is greater than the expected location uncertainty by more than a predetermined threshold, the positioning measurements may be spoofed. Positioning assistance data provided to the UE including information related to transmission times and transmission locations for positioning signals may be incomplete or inaccurate. Spoofed positioning measurements generated by a UE based on the incomplete or inaccurate information will include errors that produce a relatively large uncertainty compared to actual positioning measurements for which uncertainty would be smaller.

36 Claims, 13 Drawing Sheets

METHOD AND APPARATUS FOR SECURE LOCATION OF A MOBILE DEVICE

BACKGROUND

Field

The present disclosure relates generally to the field of wireless communications in a network, and more specifically to user equipment (UE) location determination through a wireless network.

Information

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise each known as a user equipment (UE).

Standardization is ongoing to combine satellite-based communication systems with terrestrial wireless communications systems, such as 5G New Radio (NR) networks. In such a system, a user equipment (UE) would access a satellite, also referred to as a space vehicle (SV), instead of a base station, which would connect to an earth station, also referred to as a ground station or non-terrestrial (NTN) gateway, which in turn would connect to a 5G network (e.g., directly or via a base station). A 5G network could treat the satellite system as another type of Radio Access Technology (RAT) distinct from, but also similar to, terrestrial 5G NR.

In many applications, it is critical that a location obtained for a UE is both accurate and reliable. For example, for satellite wireless access, it is usually mandated that a UE be served by a public land mobile network (PLMN) that is in the same country as the UE. Accordingly, it can be important to ensure that the location obtained for a UE is secure and has not been tampered with or spoofed, e.g., by a UE, user or third party. It is not always too difficult, however, to spoof a UE based location estimate or to spoof location measurements for a UE assisted location. Although network based location may be used to more securely locate a UE, the use of network based location can demand significant network cost and complexity and may not scale efficiently for a large number of UEs. Accordingly, a means to enable secure UE location determination without relying on network based location is desirable.

SUMMARY

Secure user equipment (UE) assisted location determination is supported. Positioning measurements from the UE, which may be spoofed or not spoofed, are received by a location server, and used to determine a location uncertainty, which is used to determine whether the positioning measurements have been spoofed. The location uncertainty, for example, may be compared to an expected location uncertainty produced by positioning measurement that are not spoofed. If the location uncertainty is greater than the expected location uncertainty by more than a predetermined threshold, the positioning measurements may be spoofed. Positioning assistance data provided to the UE or information related to transmission times of positioning signals may be incomplete or inaccurate. Spoofed positioning measurements generated by a UE based on the incomplete or inaccurate information will include errors that produce a relatively large uncertainty compared to actual positioning measurements that can be detected by the location server.

In one implementation, a method performed by a location server for supporting reliable positioning of a User Equipment (UE) in a wireless network, includes receiving positioning measurements from the UE; determining a location uncertainty associated with the positioning measurements; and determining whether the positioning measurements have been spoofed based on the location uncertainty associated with the positioning measurements.

In one implementation, a location server configured for supporting reliable positioning of a User Equipment (UE) in a wireless network, includes an external interface configured to wirelessly communicate with entities in the wireless network; at least one memory; at least one processor coupled to the external interface and the at least one memory, wherein the at least one processor is configured to: receive, via the external interface, positioning measurements from the UE; determine a location uncertainty associated with the positioning measurements; and determine whether the positioning measurements have been spoofed based on the location uncertainty associated with the positioning measurements.

In one implementation, a location server configured for supporting reliable positioning of a User Equipment (UE) in a wireless network, includes means for receiving positioning measurements from the UE; means for determining a location uncertainty associated with the positioning measurements; and means for determining whether the positioning measurements have been spoofed based on the location uncertainty associated with the positioning measurements.

In one implementation, a non-transitory computer readable storage medium including program code stored thereon, the program code is operable to configure at least one processor in a location server for supporting reliable positioning of a User Equipment (UE) in a wireless network, the program code comprising instructions to: receive positioning measurements from the UE; determine a location uncertainty associated with the positioning measurements; and determine whether the positioning measurements have been spoofed based on the location uncertainty associated with the positioning measurements.

In one implementation, a method performed by a transmitting entity for supporting reliable positioning of a User Equipment (UE) in a wireless network, includes receiving a positioning signal schedule; and transmitting positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE.

In one implementation, a transmitting entity configured for supporting reliable positioning of a User Equipment (UE) in a wireless network, includes a communications interface configured to communicate with entities in the wireless network; at least one memory; at least one processor coupled to the communications interface the at least one memory, wherein the at least one processor is configured to: receive, via the communications interface, a positioning signal schedule; and transmit, via the communications interface, positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE.

In one implementation, a transmitting entity configured for supporting reliable positioning of a User Equipment (UE) in a wireless network, includes means for receiving a positioning signal schedule; and means for transmitting positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE.

In one implementation, a non-transitory computer readable storage medium including program code stored thereon, the program code is operable to configure at least one processor in a transmitting entity for supporting reliable positioning of a User Equipment (UE) in a wireless network, the program code comprising instructions to: receive a positioning signal schedule; and transmit positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE.

In one implementation, a method performed by a User Equipment (UE) for supporting reliable positioning of the UE in a wireless network, comprising: receiving assistance data, the assistance data comprising data for positioning signals, one or more transmitters, or both, wherein the assistance data comprises at least one of incomplete data or incorrect data, or a combination thereof; obtaining positioning measurements for the positioning signals, the one or more transmitters, or both; sending the positioning measurements to a location server, wherein the positioning measurements enable the location server to determine a location uncertainty associated with the positioning measurements, wherein the location uncertainty enables the location server to determine whether the positioning measurements are spoofed or not spoofed.

In one implementation, a User Equipment (UE) configured for supporting reliable positioning of the UE in a wireless network, comprising: a wireless transceiver configured to wirelessly communicate with entities in the wireless network; at least one memory; at least one processor coupled to the wireless transceiver and the at least one memory, wherein the at least one processor is configured to: receive, via the wireless transceiver, assistance data, the assistance data comprising data for positioning signals, one or more transmitters, or both, wherein the assistance data comprises at least one of incomplete data or incorrect data, or a combination thereof; obtain positioning measurements for the positioning signals, the one or more transmitters, or both; send, via the wireless transceiver, the positioning measurements to a location server, wherein the positioning measurements enable the location server to determine a location uncertainty associated with the positioning measurements, wherein the location uncertainty enables the location server to determine whether the positioning measurements are spoofed or not spoofed.

In one implementation, a User Equipment (UE) configured for supporting reliable positioning of the UE in a wireless network, comprising: means for receiving assistance data, the assistance data comprising data for positioning signals, one or more transmitters, or both, wherein the assistance data comprises at least one of incomplete data or incorrect data, or a combination thereof; means for obtaining positioning measurements for the positioning signals, the one or more transmitters, or both; means for sending the positioning measurements to a location server, wherein the positioning measurements enable the location server to determine a location uncertainty associated with the positioning measurements, wherein the location uncertainty enables the location server to determine whether the positioning measurements are spoofed or not spoofed.

In one implementation, a non-transitory computer readable storage medium including program code stored thereon, the program code is operable to configure at least one processor in a User Equipment (UE) to support reliable positioning of the UE in a wireless network, the program code comprising instructions to: receive assistance data, the assistance data comprising data for positioning signals, one or more transmitters, or both, wherein the assistance data comprises at least one of incomplete data or incorrect data, or a combination thereof; obtain positioning measurements for the positioning signals, the one or more transmitters, or both; send the positioning measurements to a location server, wherein the positioning measurements enable the location server to determine a location uncertainty associated with the positioning measurements, wherein the location uncertainty enables the location server to determine whether the positioning measurements are spoofed or not spoofed.

BRIEF DESCRIPTION OF THE DRAWINGS

The accompanying drawings are presented to aid in the description of various aspects of the disclosure and are provided solely for illustration of the aspects and not limitation thereof.

Figure 1:
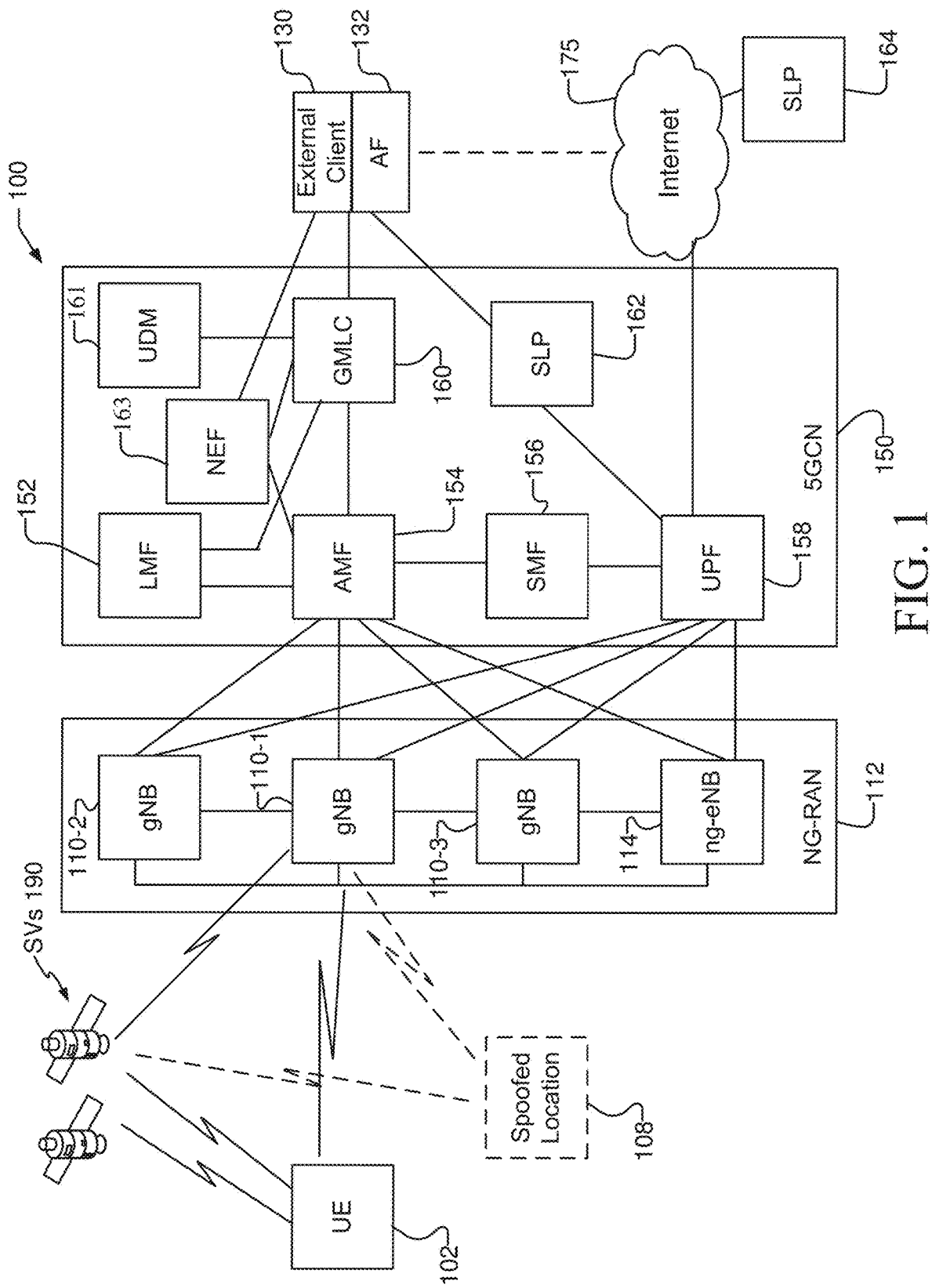
FIG. 1 shows a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1, 110-2, 110-3 of a base station are shown in FIG. 1. A reference to a base station 110 then refers to any of base stations 110-1, 110-2, 110-3.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE (also known as a mobile device) may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

Satellites, also referred to as space vehicles (SVs) or communication satellites, may be used in communication systems, for example, using gateways and one or more satellites to relay communication signals between the gateways and one or more UEs. A UE, for example, may access a satellite (instead of a terrestrial base station) which may be connected to an earth station (ES), which is also referred to as a ground station or Non-Terrestrial Network (NTN) Gateway. The earth station in turn would connect to an element in a 5G Network such as a modified base station (without a terrestrial antenna) or a network node in a 5G Core Network (5GCN). This element would in turn provide access to other elements in the 5G Network and ultimately to entities external to the 5G Network such as Internet web servers and other user devices.

A location server may be employed to support positioning. The location server may be part of or accessible from a serving network or a home network for a UE or may simply be accessible over the Internet or over a local Intranet. If positioning of a UE is needed, a location server may instigate a session (e.g., a location session or a Secure User Plane Location (SUPL) session) with the UE and coordinate location measurements by the UE and determination of an estimated location of the UE. During a location session, a location server may request positioning capabilities of the UE (or the UE may provide them to the location server without a request), may provide assistance data to the UE (e.g., if requested by the UE or in the absence of a request) and may request a location estimate or location measurements from a UE for various positioning techniques, e.g., for the Global Navigation Satellite System (GNSS), Time Difference of Arrival (TDOA), Angle of Departure (AOD), Round Trip Time (RTT) and multi cell RTT (Multi-RTT), and/or Enhanced Cell ID (ECID) position methods. Assistance data may be used by a UE to acquire and measure GNSS signals and/or reference signals, such as positioning reference signals (PRS) signals (e.g., by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AOD, Multi-RTT, etc.).

In a UE assisted mode of operation, a UE may return location measurements to a location server which may determine an estimated location of the UE based on these measurements and possibly based also on other known or configured data (e.g., satellite ephemeris data for GNSS location or base station characteristics including base station locations and possibly PRS timing in the case of terrestrial positioning using, e.g., TDOA, AOD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g., if a UE obtains satellite orbital data from data broadcast by GPS and GNSS satellites themselves) as well as sensors.

Ensuring that a location obtained for a UE is secure and has not been tampered with or spoofed, e.g., by a UE, user or third party, can be critical for some applications such as satellite wireless access, where it is usually mandated that a UE be served by a public land mobile network (PLMN) in the same country as the UE. It is not always very difficult, however, for a UE to spoof a UE based location estimate and it is not excessively difficult to spoof Global Navigation Satellite Systems (GNSS) location measurements for a UE assisted location. For example, a UE may determine a false location and then calculate GNSS pseudoranges (e.g. based on GNSS pseudoranges measured for the actual UE location) that would be measured at the false UE location.

Network based location, where a network obtains measurements of uplink (UL) signals transmitted by a UE and determines a location based on the measurements, may be sometimes used to more securely locate a UE. However, the use of network based location can demand significant network cost and complexity and may not scale efficiently for a large number of UEs. In addition, it can be possible for a UE to spoof a false location even for network based location by transmitting UL signals at incorrect times and/or in incorrect directions, or by relying on an accomplice to transmit UL signals on behalf of the UE at the false location. Therefore, it may not be preferred to rely on network based location to securely locate a UE.

In one implementation, in order to enable secure location of a UE using UE assisted location, satellite or base station assistance data used to assist position measurements and/or position calculation by the UE may be partly hidden from the UE and from a user of the UE. For example, ephemeris and clock data for communication and/or navigation satellites may be kept secure by a satellite operator and either not provided to a UE or nor fully provided to the UE. In addition, deliberate clock timing errors and/or other types of obfuscation may be included in assistance data provided to UEs. The assistance data that is made available to UEs may be selected (e.g. by a location server) to allow UE based location accuracy (for at least one position method) with an error of X meters (e.g., X=1 kilometer). The correct assistance data that is only available within a PLMN (e.g. is available to a location server but not a UE) may allow an error of Y meters, where Y is less than X (e.g., Y=10 meters). A UE that intends to spoof a false location might need to calculate spoofed measurements for the false location based on the publicly available assistance data, which (as just described) can only determine a location for a UE with an error of X meters. These calculated (and spoofed) measurements based on the publicly available assistance data would then unavoidably contain errors of the order X meters, where X represents the difference between the intended spoofed (and false) location and a location calculated (e.g. by a location server) based on the calculated (and spoofed) measurements. When the UE sends these spoofed measurements to the network, the network (e.g., location server) will determine the false location for the UE based on the spoofed measurements with an uncertainty, i.e., expected error, of X meters. The network (e.g. location server) is typically able to determine the error in a calculated location from inconsistencies between provided measurements, e.g. where each measurement locates the UE on a one dimensional line or a two dimensional surface and where the different lines or surfaces for the different measurement do not all intersect at a single common point which would otherwise represent the location for the UE, but instead intersect within a volume or area whose size (e.g. distance from one side to another) represents the uncertainty in the location. Conversely, if the UE had actually been physically present at the spoofed location and had performed accurate measurements, the location uncertainty, i.e., expected error, as determined by the network (e.g. a location server which can have the entire assistance data available) would have been Y meters. The network, e.g., location server, may accordingly suspect spoofing of the location measurements by the UE if the uncertainty/error is X meters and not Y meters, e.g., if the uncertainty/error is greater than a predetermined threshold. While this cannot detect all types of spoofing (e.g., if the user has an accomplice who sends measurements from the false location to the UE), it can detect spoofing based on calculating false measurements.

A UE or user may attempt to circumvent the spoofing detection according to the above solution by using an accurate known location of the UE at a certain time (e.g., obtained independently using GNSS or based on a surveyed map location) to accurately determine the hidden or obfuscated assistance data. For example, the accurately determined location of the UE at time T may provide accurate values for four variables, X, Y, Z, T, where X,Y,Z are location coordinates for the UE (e.g. latitude, longitude and altitude). If the UE makes an accurate measurement or measurements of signals received from one or more base stations (BSs), access points (APs) and/or satellites (SVs) at the location X,Y,Z and time T, then typically for a position method supported by the measurement or measurements, there will be a relationship (e.g. which may be expressed by one or more equations) between the known values for X,Y,Z,T, the obtained measurement(s) and part (or all) of assistance data for the BSs, APs and/or SVs provided to the UE. Such a relationship would normally be used by the UE to determine or help determine the values for X,Y,Z,T based on the measurements(s), which is how a UE would normally be located. However, in this case, the relationship (and associated equation(s)) can be used in a reverse-manner (sometimes referred to as "reverse location") to determine missing or obfuscated portions of the assistance data for the BSs, APs and/or SVs. For example, the relationship and associated equations might be used to determine, or help determine, an accurate location for a terrestrial transmitter, accurate orbital data for an SV or accurate timing of a position signal transmission. If there is only one obfuscated or hidden variable per BS, AP, or SV, then a single accurate location at a time T (e.g. one set of known values for X,Y,Z,T) could be enough to determine the obfuscated or hidden variable for a particular BS, AP or SV from a single measurement for this BS, AP or SV made by the UE at the known location and time X,Y,Z,T. If there are multiple obfuscated or hidden variables per BS, AP or SV, the UE or user may use an accurate measurement or measurements of signals received from one or more base stations (BSs), access points (APs) and/or satellites (SVs), that are obtained by the UE at different known times and at one or more known locations, to determine more than one hidden or obfuscated variable per BS, AP, or SV.

In one implementation, in order to enable secure location of a UE using UE assisted location where a UE or user may use one or more accurate locations for the UE at different times to determine hidden or obfuscated variables as discussed above, at least one hidden or obfuscated variable per BS, AP or SV may be time varying in a random (or pseudorandom) manner. For example, in one implementation, the hidden or obfuscated variable may be a signal transmission time (e.g. navigation signal transmission time or PRS signal transmission time) from a BS, AP or SV. The assistance data provided to a UE, for example, may indicate a fixed transmission time or a fixed sequence of transmission times. However, the BS, AP or SV may vary the actual transmission time(s) so that they differ slightly from the time(s) indicated in the publicly available assistance data. For example, if the publicly available assistance data indicates a transmission time T, the actual transmission time may be in the range [T−t, T+t] where the value t appears as an error to the UE and corresponds to a location error of X meters obtained by the UE (e.g. where X is approximately the same as the distance travelled by light or a radio signal in the time t). The network, e.g., location server, is aware of the actual transmission time and hence can remove this error when calculating a location of the UE based on position measurements received from the UE. However, the UE cannot necessarily calculate or anticipate the actual transmission time, which varies over time in a random manner and therefore may include the error in any calculation based on the transmission time T (e.g. such as attempting to calculate a spoofed measurement for the UE or a missing or obfuscated portion of assistance data).

In another possible method to circumvent spoofing detection, a UE or user might obtain accurate measurements of one or more BSs, APs and/or SVs at an accurately known UE location L-1 and at an accurately known time T-1 and then calculate changes or deltas to these measurements which would be measured at another accurately known location L-2 and possibly at a slightly different time T-2. The intent would be to spoof location at L-2 using accurate measurements applicable to L-2. The UE or user may also be able to determine which BS, AP or SV is being measured at any time (e.g. using AOA measurements) and to base calculation of a delta measurement on a known position of the measured BS, AP or SV, e.g. if this was provided to the UE as part of assistance data. This technique may be overcome by slightly randomizing navigation signal (e.g.

PRS) transmission time from a BS, AP or SV (e.g. as described previously) and by keeping exact BS, AP or SV location data (e.g. ephemeris data for an SV or a transmitting antenna location for a BS or AP)) confidential. This could prevent a UE or user from determining the exact position of the BS, AP or SV and the exact time at which a signal measured by the UE was transmitted. This could in turn prevent calculation of an accurate delta measurement and could lead to calculated (spoofed) measurements for the location L-2 containing errors in excess of those that would be measured by a UE that was actually at the location L-2. However, the network side (e.g. a location server) may have both accurate BS, AP or SV position data and accurate transmission timing data available and would then be able to determine an accurate UE location if measurements actually obtained at the location L-2 were provided but would determine a less accurate location for the spoofing case.

FIG. 1 shows an architecture based on a non-roaming 5G NR terrestrial network (TN) enabled to support secure location of a UE using UE assisted location as discussed herein. FIG. 1 illustrates a communication system 100 that comprises a UE 102 and components of a Fifth Generation (5G) network comprising a Next Generation Radio Access Network (NG-RAN) 112, which includes base stations (BSs) sometimes referred to as New Radio (NR) NodeBs or gNBs 110-1, 110-2, 110-3, a next generation evolved NodeB (ng-eNB) 114, and a 5G Core Network (5GCN) 150 that is in communication with an external client 130. The architecture of a gNB 110 may be split into functional parts, e.g., including one or more of a gNB Central Unit (gNB-CU), one or more gNB Distributed Units (gNB-DUs), and one or more gNB Remote Units (gNB-Rus), any of which may be physically co-located or may be physically separate from other parts of the gNB 110. A 5G network may also be referred to as a New Radio (NR) network; NG-RAN 112 may be referred to as an NR RAN or a 5G RAN; and 5GCN 150 may be referred to as a Next Generation (NG) Core network (NGC). The communication system 100 may further utilize information from space vehicles (SVs) 190 for a Global Navigation Satellite System (GNSS) like Global Positioning System (GPS), GLObal Navigation Satellite System (GLONASS), Galileo or Beidou or some other local or regional Satellite Positioning System (SPS) such as Indian Regional Navigation Satellite System (IRNSS), European Geostationary Navigation Overlay Service (EGNOS), or Wide Area Augmentation System (WAAS). Additional components of the communication system 100 are described below. The communication system 100 may include additional or alternative components.

FIG. 1 shows a serving gNB 110-1 for the UE 102 and neighbor gNBs 110-2, 110-3, and ng-eNB 114. A neighbor gNB may be any gNB which is able to receive and measure uplink (UL) signals transmitted by the UE 102 and/or is able to transmit a downlink (DL) reference signal (RS), e.g., positioning reference signals (PRS), that can be received and measured by the UE 102 to support location of the UE 102.

It should be noted that FIG. 1 provides only a generalized illustration of various components, any or all of which may be utilized as appropriate, and each of which may be duplicated or omitted, as necessary. Specifically, although only one UE 102 is illustrated, it will be understood that many UEs (e.g., hundreds, thousands, millions, etc.) may utilize the communication system 100. Similarly, the communication system 100 may include a larger or smaller number of SVs 190, gNBs 110-1, 110-2, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), also referred to as 4G, and IEEE 802.11 WiFi etc. For example, where a Wireless Local Area Network (WLAN), e.g., IEEE 802.11 radio interface, is used, the UE 102 may communicate with an Access Network (AN), as opposed to an NG-RAN, and accordingly, component 112 is sometimes referred to herein as an AN or as a RAN, denoted by the term "RAN", "(R)AN" or "(R)AN 112". In the case of an AN (e.g., IEEE 802.11 AN), the AN may be connected to a Non-3GPP Interworking Function (N3IWF) (e.g., in 5GCN 150) (not shown in FIG. 1), with the N3IWF connected to Access and Mobility Management Function (AMF) 154.

The UE 102 may be any electronic device and may be referred to as a device, a mobile device, a wireless device, a mobile terminal, a terminal, a mobile station (MS), a Secure User Plane Location (SUPL) Enabled Terminal (SET), or by some other name. The UE 102 may be a stand-alone device or may be embedded in another device, e.g., a factory tool, that is to be monitored or tracked. Moreover, UE 102 may correspond to a smart watch, digital glasses, fitness monitor, smart car, smart appliance, cellphone, smartphone, laptop, tablet, PDA, consumer tracking device for tracking consumer items, packages, assets, or entities such as individuals and pets, control device or some other portable or moveable device. The UE 102 may include a single entity or may include multiple entities such as in a personal area network where a user may employ audio, video and/or data I/O devices and/or body sensors and a separate wireline or wireless modem. Typically, though not necessarily, the UE 102 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 102 may also support wireless communication using a Wireless Local Area Network (WLAN) which may connect to other networks (e.g., the Internet) using a Digital Subscriber Line (DSL) or packet cable for example. The use of one or more of these RATs may allow the UE 102 to communicate with an external client 130 (e.g., via elements of 5GCN 150 not shown in FIG. 1, or possibly via a Gateway Mobile Location Center (GMLC) 160, and/or allow the external client 130 to receive location information regarding the UE 102 (e.g., via the GMLC 160).

The UE 102 may enter a connected state with a wireless communication network that may include the NG-RAN 112. In one example, the UE 102 may communicate with a cellular communication network by transmitting wireless signals to, or receiving wireless signals from a cellular transceiver, in the NG-RAN 112, such as a gNB 110-1. A transceiver provides user and control planes protocol terminations toward the UE 102 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 102 may have circuitry and processing resources capable of obtaining location related measurements. Location related measurements obtained by UE 102 may include measurements of signals received from satellite vehicles (SVs) 190 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs). UE 102 or gNB 110-1 to which UE 102 may send the measurements, may then obtain a location estimate for the UE 102 based on these location related measurements using any one of several position methods such as, for example, GNSS, Assisted GNSS (A-GNSS), Advanced Forward Link Trilateration (AFLT), Angle of Departure (AOD), Time Difference Of Arrival (TDOA), Round-Trip Time (RTT), WLAN (also referred to as WiFi) positioning, or Enhanced Cell ID (ECID) or combinations thereof. In some of these techniques (e.g., A-GNSS, AFLT, AOD, RTT, and TDOA), pseudoranges or timing differences may be measured at UE 102 relative to three or more terrestrial transmitters (e.g., gNBs) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 102.

The location server in FIG. 1 may correspond to, e.g., Location Management Function (LMF) 152 or Secure User Plane Location (SUPL) Location Platform (SLP) 162, and may be capable of providing positioning assistance data to UE 102 including, for example, information regarding signals to be measured (e.g., expected signal timing, signal coding, signal frequencies, signal Doppler), locations and identities of terrestrial transmitters (e.g., gNBs) and/or signal, timing and orbital information for GNSS SVs to facilitate positioning techniques such as A-GNSS, AFLT, AOD, TDOA, RTT, and ECID. The facilitation may include improving signal acquisition and measurement accuracy by UE 102 and, in some cases, enabling UE 102 to compute its estimated location based on the location measurements. For example, a location server (e.g., LMF 152 or SLP 162) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g., a gNB) such as transmission power and signal timing. A UE 102 may obtain measurements of signal strengths (e.g., received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), a Reference Signal Time Difference (RSTD), or a round trip signal propagation time (RTT) between UE 102 and a cellular transceiver (e.g., a gNB) or a local transceiver (e.g., a WiFi access point (AP)). A UE 102 may use these measurements together with assistance data (e.g., terrestrial assistance data or GNSS satellite data such as GNSS Almanac and/or GNSS Ephemeris information) received from a location server (e.g., LMF 152 or SLP 162) or broadcast by a base station (e.g., a gNB 110-1, 110-2) in NG-RAN 112 to determine a location for UE 102.

In some implementations, network entities are used to assist in location of a UE 102. For example, entities in a network such as gNBs 110-1, 110-2 may measure UL signals transmitted by UE 102. The UL signals may include or comprise UL reference signals such as UL positioning reference signals (PRSs) or UL Sounding Reference Signals (SRSs). The entities obtaining the location measurements (e.g., gNBs 110-1, 110-2) may then transfer the location measurements to the UE 102 or LMF 152, which may use the measurements to determine real time differences (RTDs) for multiple transceiver pairs. Examples of location measurements that may use UL signals can include an RSSI, RSRP, RSRQ, TOA, Rx-Tx, AOA and RTT.

An estimate of a location of the UE 102 may be referred to as a geodetic location, location, location estimate, location fix, fix, position, position estimate or position fix, and may be geographic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geographically or in civic form) within which the UE 102 is expected to be located with some probability or confidence level (e.g., 67%, 95%, etc.) A location of the UE 102 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g., for latitude, longitude and altitude above or below mean sea level).

As shown in FIG. 1, pairs of gNBs in NG-RAN 112 may be connected to one another, e.g., directly as shown in FIG. 1 or indirectly via other gNBs 110-1, 110-2. Access to the 5G network is provided to UE 102 via wireless communication between the UE 102 and one or more of the gNBs 110-1, 110-2, which may provide wireless communication access to the 5GCN 150 on behalf of the UE 102 using 5G (e.g., NR).

In FIG. 1, the serving gNB for UE 102 is assumed to be gNB 110-1, although other gNBs (e.g., gNB 110-2, 110-3, or ng-eNB 114) may act as a serving gNB if UE 102 moves to another location or may act as a secondary gNB to provide additional throughout and bandwidth to UE 102.

As noted, while FIG. 1 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 150. Thus, the NG-RAN 112 may include any combination of gNBs, evolved Node Bs (eNBs) supporting LTE, or other types of base stations or access points. As an example, NG-RAN 112 may include one or more ng-eNBs 114, which provide LTE wireless access to UE 102 and may connect to entities in 5GCN 150 such as AMF 154.

The gNBs 110-1, 110-2, 110-3, and ng-eNB 114 can communicate with the AMF 154, which, for positioning functionality, may communicate with the LMF 152. The AMF 154 may support mobility of the UE 102, including cell change and handover and may participate in supporting a signaling connection to the UE 102 and possibly helping establish and release Protocol Data Unit (PDU) sessions for UE 102 supported by the UPF 158. Other functions of AMF 154 may include: termination of a control plane (CP) interface from NG-RAN 112; termination of Non-Access Stratum (NAS) signaling connections from UEs such as UE 102, NAS ciphering and integrity protection; registration management; connection management; reachability management; mobility management; access authentication and authorization.

The gNB 110-1 may support positioning of the UE 102 when UE 102 accesses the NG-RAN 112. The gNB 110-1 may also process location service requests for the UE 102, e.g., received directly or indirectly from the GMLC 160. In some embodiments, a node/system that implements the gNB 110-1 may additionally or alternatively implement other types of location-support modules, such as an Enhanced Serving Mobile Location Center (E-SMLC) or a Secure User Plane Location (SUPL) Location Platform (SLP) 162. It will be noted that in some embodiments, at least part of the positioning functionality (including derivation of UE 102's location) may be performed at the UE 102 (e.g., using signal measurements for signals transmitted by wireless nodes, and assistance data provided to the UE 102).

The GMLC 160 may support a location request for the UE 102 received from an external client 130 and may forward such a location request to a serving AMF 154 for UE 102. The AMF 154 may then forward the location request to either gNB 110-1 or LMF 152 which may obtain one or more location estimates for UE 102 (e.g., according to the request from external client 130) and may return the location estimate(s) to AMF 154, which may return the location estimate(s) to external client 130 via GMLC 160. GMLC 160 may contain subscription information for an external client 130 and may authenticate and authorize a location request for UE 102 from external client 130. GMLC 160 may further initiate a location session for UE 102 by sending a location request for UE 102 to AMF 154 and may include in the location request an identity for UE 102 and the type of location being requested (e.g., such as a current location or a sequence of periodic or triggered locations).

As illustrated, a Unified Data Management (UDM) 161 may be connected to the GMLC 160. The UDM 161 is analogous to a Home Subscriber Server (HSS) for LTE access, and if desired, the UDM 161 may be combined with an HSS. The UDM 161 is a central database that contains user-related and subscription-related information for UE 102 and may perform the following functions: UE authentication, UE identification, access authorization, registration and mobility management, subscription management and Short Message Service management.

As further illustrated in FIG. 1, an external client 130 may be connected to the core network 150 via the GMLC 160 and/or the SLP 162. The external client 130 may optionally be connected to the core network 150 and/or to an SLP 164, that is external to 5GCN 150, via the Internet 175. The external client 130 may be a server, a web server, or a user device, such as a personal computer, a UE, etc.

A Network Exposure Function (NEF) 163 may be connected to the GMLC 160 and the AMF 154. In some implementations, the NEF 163 may be connected to communicate directly with the external client 130 or with an Application Function (AF) 132. The NEF 163 may support secure exposure of capabilities and events concerning 5GCN 150 and UE 102 to an external client 130 or AF 132 and may enable secure provision of information from external client 130 or AF 132 to 5GCN 150. The NEF 163, for example, may also function to obtain a current or last known location for a UE 102, may obtain an indication of a change in location for a UE 102, or an indication of when a UE 102 becomes available (or reachable). An external client 130 or an AF 132 may access NEF 163 in order to obtain location information for UE 102.

The LMF 152 and the gNB 110-1 may communicate using a New Radio Position Protocol A (NRPPa). NRPPa may be defined in 3GPP TS 38.455, with NRPPa messages being transferred between the gNB 110-1 and the LMF 152. Further, the LMF 152 and UE 102 may communicate using the LTE Positioning Protocol (LPP) defined in 3GPP TS 37.355, where LPP messages are transferred between the UE 102 and the LMF 152 via the serving AMF 154 and the serving gNB 110-1 for UE 102. The LPP protocol may be used to support positioning of UE 102 using UE assisted and/or UE based position methods such as Assisted GNSS (A-GNSS), Real Time Kinematic (RTK), Wireless Local Area Network (WLAN), Angle of Departure (AOD), Time Difference of Arrival (TDOA), Round-Trip Time (RTT), Multi-RTT, and/or Enhanced Cell Identity (ECID). The NRPPa protocol may be used to support positioning of UE 102 using network based position methods such as ECID (when used with measurements obtained by or received from a gNB 110-1, 110-2, 110-3, or ng-eNB 114) and/or may be used by LMF 152 to obtain location related information from gNBs 110 such as parameters defining positioning reference signal (PRS) transmission from gNBs for support of TDOA.

GNBs 110-1, 110-2, 110-3, or ng-eNB 114 may communicate with AMF 154 using a Next Generation Application Protocol (NGAP), e.g., as defined in 3GPP Technical Specification (TS) 38.413). NGAP may enable AMF 154 to request a location of a UE 102 from a gNB 110-1 for UE 102 and may enable gNB 110-1 to return a location for UE 102 to the AMF 154.

GNBs 110-1, 110-2, 110-3, or ng-eNB 114 may communicate with one another using an Xn Application Protocol (XnAP), e.g., as defined in 3GPP TS 38.423. XnAP may allow one gNB 110 to request another gNB 110 to obtain UL location measurements for a UE 102 and to return the UL location measurements. XnAP may also enable a gNB 110 to request another gNB 110 to transmit a downlink (DL) RS or PRS to enable a UE 102 to obtain DL location measurements of the transmitted DL RS or PRS.

A gNB (e.g., gNB 110-1) may communicate with a UE 102 using a Radio Resource Control (RRC) protocol, e.g., as defined in 3GPP TS 38.331. RRC may allow a gNB (e.g., gNB 110-1) to request location measurements from the UE 102 of DL RSs or DL PRSs transmitted by the gNB 110-1 and/or by other gNBs 110-2, 110-3, or ng-eNB 114 and to return some or all of the location measurements. RRC may also enable a gNB (e.g., gNB 110-1) to request the UE 102 to transmit an UL RS or PRS to enable the gNB 110-1 or other gNBs 110-2, 110-3, or ng-eNB 114 to obtain UL location measurements of the transmitted UL RS or PRS.

As illustrated, a Session Management Function (SMF) 156 connects the AMF 154 and the UPF 158. SMF 156 may manage the establishment, modification, and release of PDU sessions for UE 102, perform IP address allocation and management for UE 102, act as a Dynamic Host Configuration Protocol (DHCP) server for UE 102, and select and control a UPF 158 on behalf of UE 102.

The User Plane Function (UPF) 158 may support voice and data bearers for UE 102 and may enable UE 102 voice and data access to other networks such as the Internet 175. UPF 158 functions may include: external PDU session point of interconnect to a Data Network, packet (e.g., Internet Protocol (IP)) routing and forwarding, packet inspection and user plane part of policy rule enforcement, Quality of Service (QoS) handling for user plane, downlink packet buffering and downlink data notification triggering. UPF 158 may be connected to SLP 162 to enable support of location of UE 102 using the SUPL location solution defined by the Open Mobile Alliance (OMA). SLP 162 may be further connected to or accessible from external client 130.

As illustrated by spoofed location 108 (which is assumed to be different than the actual location of UE 102 in FIG. 1), the UE 102 may attempt to tamper with or spoof location measurements from base stations, illustrated by gNBs 110, and/or SVs 190. For example, the UE 102 may attempt to calculate GNSS pseudoranges for SVs 190 (based on pseudoranges for the actual location of the UE 102) that would be measured at the spoofed location 108. Similarly, the UE 102 may attempt to calculate measurements for one or more gNBs 110 such as an RSTD, AOA, TOA, Rx-Tx (based on the same type of measurements for the actual location of the UE 102) that would be measured at the spoofed location 108. The UE 102 may provide the spoofed location measurements to the LMF 152, e.g., for UE assisted positioning, in an attempt to cause the LMF 152 to incorrectly determine the location of the UE 102 as the spoofed location 108.

In one implementation, in order to enable secure location of the UE 102 using UE assisted location, satellite or base station assistance data provided to UE 102 by, e.g., LMF 152, for position measurements by the UE 102 may be partly hidden or obfuscated from the UE 102. For example, the ephemeris and/or clock data for SVs 190 may be kept secure by a satellite operator. In addition, deliberate clock timing errors or other types of obfuscation may be included in assistance data provided to the UE 102. The assistance data that is made available to UE 102 is selected to allow a UE based location accuracy (for at least one position method) with an error of X meters (e.g., X=1 kilometer). The correct assistance data that is available to the LMF 152, on the other hand, allows an error of Y meters, where Y is less than X (e.g., Y=10 meters).

Thus, UE 102 (when intending to spoof a location) will calculate measurements for the spoofed location 108 based on the publicly available assistance data, which will result in an error of X meters. The UE 102 may send the calculated spoofed measurements to the LMF 152 for UE assisted location determination, but the spoofed measurements unavoidably contain errors of the order X meters. When the LMF 152 determines the location of the UE 102 based on the spoofed measurements, the LMF 152 will determine the possibility or likelihood of a spoofed location 108, based on determining a location for the UE 102 from the spoofed measurements which has an uncertainty (i.e., expected error) of approximately X meters. If the UE 102 had actually been physically present at the spoofed location 108 and performed accurate measurements, the location uncertainty, i.e., expected error, would have been approximately Y meters. Accordingly, the LMF 152 may determine that the UE 102 may be providing spoofed measurements if the resulting location from the measurements has an uncertainty/error that is greater than a predetermined threshold, e.g., greater than Y meters and, for example, also greater than some multiple of Y meters (e.g. 5*Y meters) or some fraction of X meters such as X/10 meters. On the other hand, if the UE provides non-spoofed measurements for its actual location, the LMF 152 may determine a location for the UE 102 with an uncertainty of approximately Y meters. Then, if the resulting location for UE 102 from the measurements has an uncertainty/error that is not greater than the predetermined threshold, then the LMF 152 may determine that the UE 102 is not providing spoofed measurements.

Additionally, in some implementations, the hidden or obfuscated variable(s) in the assistance data provided to the UE 102 may vary over time in a random (or pseudo-random) manner. For example, the transmission times (e.g. for PRS signals or navigation signals) from a gNB 110, or SV 190, or an access point (AP) (not shown) provided in assistance data to the UE 102 may be fixed, while the actual transmission times may vary slightly in a random manner that is known to the LMF 152 but not the UE 102. In addition or instead, for a gNB 110 or AP, the location of transmission of a PRS or other signal may vary in a random or pseudo-random manner. For example a gNB 110 or an AP may be connected to several different remote antennas or remote radio heads at distances of around 100 meters to 5 kms from the gNB 110 or AP and may transmit a signal (e.g. a PRS signal) at each of a sequence of (e.g. periodic) transmission times from one of the remote antennas at each of the transmission times that is chosen randomly or pseudo-randomly for each transmission time. The LMF 152 may know which remote antenna or remote radio head is used at each transmission time but not the UE 102. Accordingly, if the UE 102 attempts to accurately determine spoofed measurements for the spoofed location 108 based on the available assistance data, the random variation over time of the hidden or obfuscated variables (which is unknown to the UE 102) will prevent the UE 102 from calculating measurements for the spoofed location 108 with an uncertainty/error that is less than the predetermined threshold.

Figure 2A:
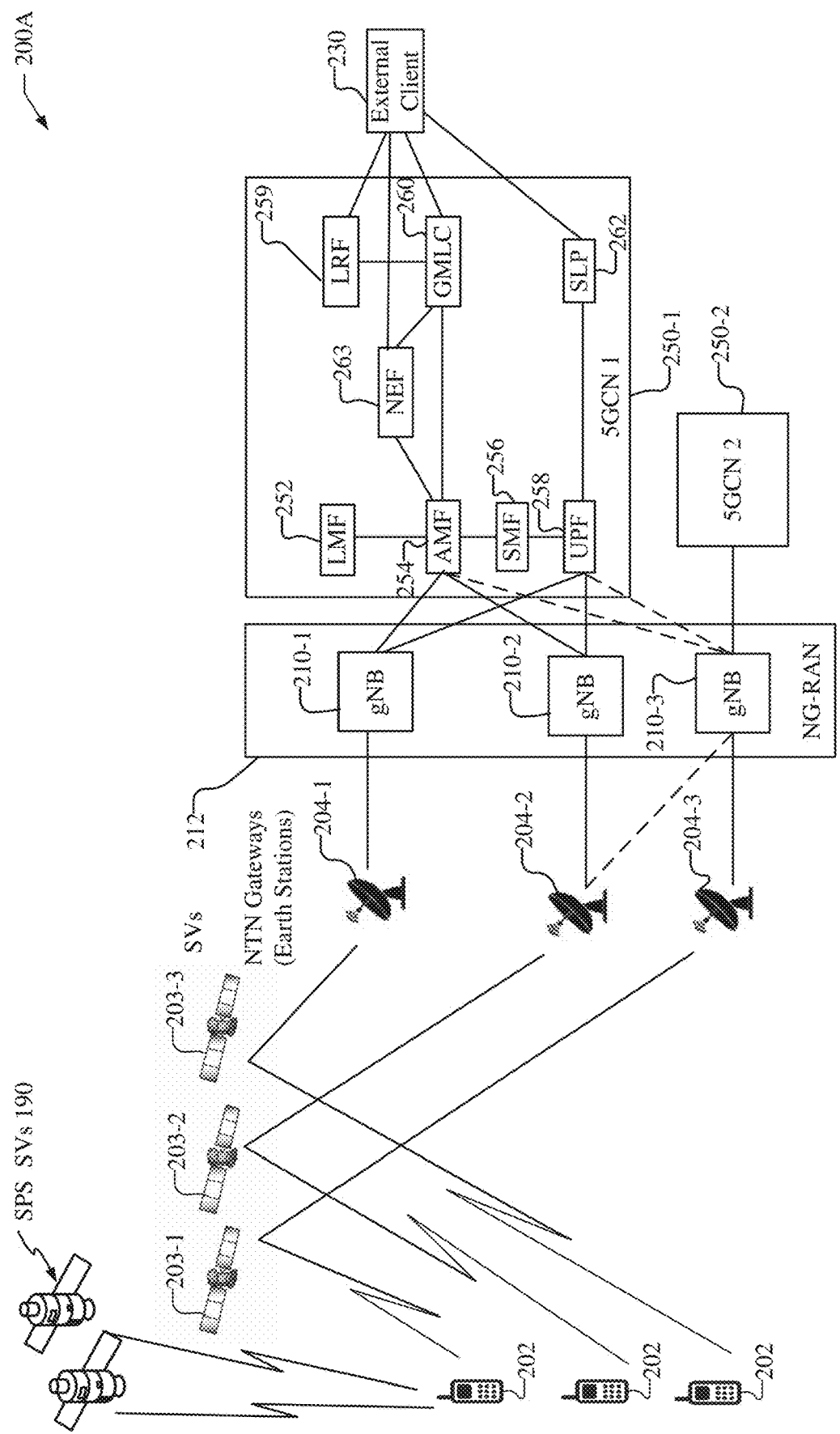
FIG. 2A illustrates high-level system architecture of a wireless communications system that includes transparent space vehicles in accordance with an aspect of the disclosure.

FIG. 2A illustrates an example communication system 200A, based on a 5G NR non-terrestrial network (NTN), enabled to support secure location of a UE using UE assisted location as discussed herein. FIG. 2A illustrates a communication system with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an earth station without demodulating or decoding the signals. Similarly, a transparent SV may receive an UL signal from an earth station and redirect the signal DL to served UEs without demodulating or decoding the signal. However, the SV may frequency convert received signals and may amplify and/or filter received signals before transmitting the signals.

The communication system 200A comprises a number of UEs 202 (e.g. which may each be the same as or similar to the UE 102 in FIG. 1), a number of SVs 203-1 to 203-3 (collectively referred to herein as SVs 203), a number of NTN gateways 204-1 to 204-3 (collectively referred to herein as NTN gateways 204) (sometimes referred to herein simply as gateways 204, earth stations 204, or ground stations 204), a number of NR NodeBs (gNBs) 210-1 to 210-3 (collectively referred to herein as gNBs 210) capable of communication with UEs 202 via SVs 203 and that are part of a Next Generation (NG) Radio Access Network (RAN) (NG-RAN) 212. The SVs 203 may be in low earth orbit (LEO), medium earth orbit (MEO), geostationary earth orbit (GEO) or some other type of orbit. It is noted that a gNB 210 refers in general to an enhanced gNB with support for SVs and may be referred to as a gNB (e.g., in 3GPP) or may be referred to as a satellite NodeB (sNB). The communication system 200A is illustrated as further including components of a number of Fifth Generation (5G) networks including 5G Core Networks (5GCNs) 250-1 and 250-2 (collectively referred to herein as 5GCNs 250), which may be the same as or similar to 5GCN 150 shown in FIG. 1. The 5GCNs 250 may be public land mobile networks (PLMN) that may be located in the same or in different countries. FIG. 2A illustrates various components within 5GCN1 250-1 that may operate with the NG-RAN 212. It should be understood that 5GCN2 250-2 and other 5GCNs may include identical, similar, or different components and associated NG-RANs, which are not illustrated in FIG. 2A in order to avoid unnecessary obfuscation. A 5G network may also be referred to as a New Radio (NR) network; NG-RAN 212 may be referred to as a 5G RAN or as an NR RAN; and 5GCN 250 may be referred to as an NG Core network (NGC).

The communication system 200A may further utilize information from space vehicles (SVs) 190 for SPS including GNSS like GPS, GLONASS, Galileo or Beidou or some other local or regional SPS, such as IRNSS, EGNOS, or WAAS, all of which are sometimes referred to herein as GNSS. It is noted that SVs 190 act as navigation SVs and are separate and distinct from SVs 203, which act as communication SVs. However, it is not precluded that some of SVs 190 may also act as some of SVs 203 and/or that some of SVs 203 may also act as some of SVs 190. In some implementations, for example, the SVs 203 may be used for both communication and positioning. Additional components of the communication system 200A are described below. The communication system 200A may include additional or alternative components.

Permitted connections in the communication system 200A having a network architecture with transparent SVs illustrated in FIG. 2A, allow a gNB 210 to access multiple Earth stations 204 and/or multiple SVs 203. A gNB 210, e.g., illustrated by gNB 210-3, may also be shared by multiple PLMNs (5GCNs 250), which may all be in the same country or possibly in different countries, and an Earth station 204, e.g., illustrated by Earth station 204-2, may be shared by more than one gNB 210.

It should be noted that FIG. 2A provides only a generalized illustration of various components, any, or all of which may be utilized as appropriate, and each of which may be duplicated or omitted, as necessary. Specifically, although only three UEs 202 are illustrated, it will be understood that many UEs (e.g., hundreds, thousands, millions, etc.) may utilize the communication system 200A. Similarly, the communication system 200A may include a larger (or smaller) number of SVs 190, SVs 203, earth stations 204, gNBs 210, NG-RAN 212, 5GCNs 250, external clients 230, and/or other components. The illustrated connections that connect the various components in the communication system 200A include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 2A illustrates a 5G-based network, similar network implementations and configurations may be used for other communication technologies, such as 3G, 4G Long Term Evolution (LTE), a future 6G, etc.

The UE 202 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 202 may correspond to a cellphone, smartphone, laptop, tablet, PDA, tracking device, navigation device, Internet of Things (IoT) device, or some other portable or moveable device. Typically, though not necessarily, the UE 202 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 212 and 5GCN 230), etc. The UE 202 may also support wireless communication using a Wireless Local Area Network (WLAN) which may connect to other networks (e.g., the Internet) using a Digital Subscriber Line (DSL) or packet cable for example. The UE 202 further supports wireless communications using space vehicles, such as SVs 203. The use of one or more of these RATs may allow the UE 202 to communicate with an external client 230 (via elements of 5GCN 250 not shown in FIG. 2A, or possibly via a Gateway Mobile Location Center (GMLC) 260).

The UE 202 may include a single entity or may include multiple entities such as in a personal area network where a user may employ audio, video and/or data I/O devices and/or body sensors and a separate wireline or wireless modem.

The UE 202 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 202. Once the SPS receiver has measured the signal propagation delays for each satellite, the range to each satellite can be determined and precise navigation information including 3-dimensional position, velocity, and time of day of the SPS receiver can then be determined using the measured ranges and the known locations of the satellites. Positioning methods which may be supported using SVs 190 may include A-GNSS, RTK, Precise Point Positioning (PPP) and Differential GNSS (DGNSS). Information and signals from SVs 203 may also be used to support positioning. The UE 202 may further support positioning using terrestrial positioning methods, such as TDOA, ECID, RTT, multi-cell RTT, AOA, AOD, TOA, Rx-Tx, and/or other positioning methods.

The UEs 202 are configured to communicate with 5GCNs 250 via the SVs 203, earth stations 204, and gNBs 210. As illustrated by NG-RAN 212, the NG-RANs associated with the 5GCNs 250 may include one or more gNBs 210. The NG-RAN 212 may further include a number of terrestrial base stations, e.g., gNBs (not shown) that are not capable of communication with UEs via SVs 203 (not shown). Pairs of terrestrial and/or satellite base stations, e.g., gNBs and gNB 210-1 in NG-RAN 212 may be connected to one another using terrestrial links—e.g., directly or indirectly via other gNBs or gNBs 210 and communicate using an Xn interface. Access to the 5G network is provided to UEs 202 via wireless communication between each UE 202 and a serving gNB 210, via an SV 203 and an earth station 204. The gNBs 210 may provide wireless communications access to the 5GCN 250 on behalf of each UE 202 using 5G NR. 5G NR radio access may also be referred to as NR radio access or as 5G radio access and may be as defined by the Third Generation Partnership Project (3GPP).

Base stations (BSs) in the NG-RAN 212 shown in FIG. 2A may also or instead include a next generation evolved NodeB, also referred to as an ng-eNB (not shown in FIG. 2A). An ng-eNB may be connected to one or more gNBs 210 and/or terrestrial gNBs in NG-RAN 212—e.g., directly or indirectly via other gNBs 210, gNBs and/or other ng-eNBs. An ng-eNB may provide LTE wireless access and/or evolved LTE (eLTE) wireless access to a UE 202.

A gNB 210 may be referred to by other names such as a gNB or a "satellite node" or "satellite access node." The gNBs 210 are not the same as terrestrial gNBs (e.g. gNBs 110 in FIG. 1), but may be based on a terrestrial gNB (e.g. a gNB 110) with additional capability. For example, a gNB 210 may terminate the radio interface and associated radio interface protocols to UEs 202 and may transmit DL signals to UEs 202 and receive UL signals from UEs 202 via SVs 203 and earth stations (ESs) 204. A gNB 210 may also support signaling connections and voice and data bearers to UEs 202 and may support handover of UEs 202 between different radio cells for the same SV 203, between different SVs 203 and/or between different gNBs 210. In some systems, a gNB 210 may be referred to as a gNB or as an enhanced gNB. GNBs 210 may be configured to manage moving radio beams (e.g. for LEO SVs) and associated mobility of UEs 202. The gNBs 210 may assist in the handover (or transfer) of SVs 203 between different Earth stations 204, different gNBs 210, and between different countries. The gNBs 210 may hide or obscure specific aspects of connected SVs 203 from the 5GCN 250, e.g., by interfacing to a 5GCN 250 in the same way or in a similar way to a gNB 110, and may avoid a 5GCN 250 from having to maintain configuration information for SVs 203 or perform mobility management related to SVs 203. The gNBs 210 may further assist in sharing of SVs 203 over multiple countries. The gNBs 210 may communicate with one or more earth stations 204, e.g., as illustrated by gNB 210-3 communicating with earth stations 204-2 and 204-3. The gNBs 210 may be separate from earth stations 204, e.g., as illustrated by gNBs 210-1 and 210-2, and earth stations 204-1 and 204-2. The gNBs 210 may instead include or may be combined with one or more earth stations 204, e.g., using a split architecture. For example, with a split architecture, a gNB 210 may include a Central Unit and an earth station may act as Distributed Unit (DU). A gNB 210 may typically be fixed on the ground with transparent SV operation. In one implementation, one gNB 210 may be physically combined with, or physically collocated with, one earth station 204 to reduce complexity and cost.

The earth stations 204 may be shared by more than one gNB 210 and may communicate with UE 202 via the SVs 203. An earth station 204 may be dedicated to just one SV operator (SVO) and to one associated constellation of SVs 203 and hence may be owned and managed by the SVO. Earth stations 204 may be included within a gNB 210, e.g., as a gNB-DU within a gNB 210, which may occur when the same SVO or the same mobile network operator (MNO) owns both the gNB 210 and the included earth stations 204. Earth stations 204 may communicate with SVs 203 using control and user plane protocols that may be proprietary to an SVO. The control and user plane protocols between earth stations 204 and SVs 203 may: (i) establish and release Earth Station 204 to SV 203 communication links, including authentication and ciphering; (ii) update SV software and firmware; (iii) perform SV Operations and Maintenance (O&M); (iv) control radio beams (e.g., direction, power, on/off status) and mapping between radio beams and earth station uplink (UL) and downlink (DL) payload; and (v) assist with handoff of an SV 203 or radio cell to another Earth station 204.

As noted, while FIG. 2A depicts nodes configured to communicate according to 5G NR communication protocols for an NG-RAN 212, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 202, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 212 and the EPC corresponds to 5GCN 250 in FIG. 2A. The methods and techniques described herein for enabling secure location of a UE may be applicable to such other networks.

The gNBs 210 in the NG-RAN 212 may communicate with the AMF 254 in a 5GCN 250, which, for positioning functionality, may communicate with a Location Management Function (LMF) 252. For example, the gNBs 210 may provide an N2 interface to the AMF 254. An N2 interface between a gNB 210 and a 5GCN 250 may be the same as, or almost the same as, an N2 interface supported between a gNB (e.g. a gNB 110) and a 5GCN (e.g. a 5GCN 110) for terrestrial NR access by a UE (e.g. a UE 102) and may use a Next Generation Application Protocol (NGAP) defined in 3GPP Technical Specification (TS) 38.413 between a gNB 210 and the AMF 254. The AMF 254 may support mobility of the UE 202, including radio cell change and handover and may participate in supporting a signaling connection to the UE 202 and possibly data and voice bearers for the UE 202. The LMF 252 may support positioning of the UE 202 when UE accesses the NG-RAN 212 and may support position procedures/methods such as A-GNSS, OTDOA, RTK, PPP, DGNSS, ECID, AOA, AOD, multi-cell RTT and/or other positioning procedures including positioning procedures based on communication or PRS signals from one or more SVs 203. The LMF 252 may also process location services requests for the UE 202, e.g., received from the AMF 254 or from a Gateway Mobile Location Center (GMLC) 260. The LMF 252 may be connected to AMF 254 and/or to GMLC 260. In some embodiments, a node/system that implements the LMF 252 may additionally or alternatively implement other types of location-support modules, such as an Enhanced Serving Mobile Location Center (E-SMLC). It is noted that in some embodiments, at least part of the positioning functionality (including derivation of a UE 202's location) may be performed at the UE 202 (e.g., using signal measurements obtained by UE 202 for signals transmitted by SVs 203, SVs 190, terrestrial gNBs and assistance data provided to the UE 202, e.g., by LMF 252).

The GMLC 260 may support a location request for the UE 202 received from an external client 230 and may forward such a location request to the AMF 254 for forwarding by the AMF 254 to the LMF 252. A location response from the LMF 252 (e.g., containing a location estimate for the UE 202) may be similarly returned to the GMLC 260 via the AMF 254, and the GMLC 260 may then return the location response (e.g., containing the location estimate) to the external client 230. The GMLC 260 is shown connected to only the AMF 254 in FIG. 2A though in some implementations may be connected to both the AMF 254 and the LMF 252 and may support direct communication between the GMLC 260 and LMF 252 or indirect communication, e.g., via the AMF 254.

A Network Exposure Function (NEF) 263 may be included in 5GCN 250, e.g., connected to the GMLC 260 and the AMF 254. In some implementations, the NEF 263 may be connected to communicate directly with the external client 230. The NEF 263 may support secure exposure of capabilities and events concerning 5GCN 250 and UE 202 to an external client 230 and may enable secure provision of information from external client 230 to 5GCN 250.

A User Plane Function (UPF) 258 may support voice and data bearers for UE 202 and may enable UE 202 voice and data access to other networks such as the Internet. The UPF 258 may be connected to gNBs 210 and possibly to terrestrial gNBs. UPF 258 functions may include: external Protocol Data Unit (PDU) session point of interconnect to a Data Network, packet (e.g., Internet Protocol (IP)) routing and forwarding, packet inspection and user plane part of policy rule enforcement, Quality of Service (QoS) handling for user plane, downlink packet buffering and downlink data notification triggering. UPF 258 may be connected to a Secure User Plane Location (SUPL) Location Platform (SLP) 262 to enable support of positioning of UE 202 using SUPL. SLP 262 may be further connected to or accessible from external client 230.

As illustrated, a Session Management Function (SMF) 256 connects to the AMF 254 and the UPF 258. The SMF 256 may have the capability to control both a local and a central UPF within a PDU session. SMF 256 may manage the establishment, modification, and release of PDU sessions for UE 202, perform IP address allocation and management for UE 202, act as a Dynamic Host Configuration Protocol (DHCP) server for UE 202, and select and control a UPF 258 on behalf of UE 202.

The external client 230 may be connected to the core network 250 via the GMLC 260 and/or the SLP 262, and in some implementations, the NEF 263. The external client 230 may optionally be connected to the core network 250 and/or to a location server, which may be, e.g., an SLP, that is external to 5GCN 250, via the Internet. The external client 230 may be connected to the UPF 258 directly (not shown in FIG. 2A) or through the Internet. The external client 230 may be a server, a web server, or a user device, such as a personal computer, a UE, etc.

A Location Retrieval Function (LRF) 259 may be connected to the GMLC 260, as illustrated, and in some implementations, to the SLP 262, as defined in 3GPP Technical Specifications (TSs) 23.271 and 23.167. LRF 259 may perform the same or similar functions to GMLC 260, with respect to receiving and responding to a location request from an external client 230 that corresponds to a Public Safety Answering Point (PSAP) supporting an emergency call from UE 202. One or more of the GMLC 260, LRF 259, and SLP 262 may be connected to the external client 230, e.g., through another network, such as the Internet.

The AMF 254 may normally support network access and registration by UEs 202, mobility of UEs 202, including radio cell change and handover and may participate in supporting a signaling connection to a UE 202 and possibly data and voice bearers for a UE 202. The role of an AMF 254 may be to Register the UE 202 during a Registration process. The AMF 254 may page the UE 202, e.g., by sending a paging message via one or more radio cells in the tracking area in which the UE 202 is located.

Communication system 200A may be associated with or have access to space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. UEs 202 may obtain location measurements for signals transmitted by SVs 190 and/or by base stations and access points such as eNBs, ng-eNB, terrestrial gNBs, and/or SVs 203 which may enable a UE 202 to determine a location estimate for UE 202 or to obtain a location estimate for UE 202 from a location server in 5GCN 250, e.g., LMF 252. For example, UE 202 may transfer location measurements to the location server to compute and return the location estimate. UEs 202 (or the LMF 252) may obtain a location estimate for UE 202 using position methods such as GPS, Assisted GPS (A-GPS), Assisted GNSS (A-GNSS), Observed Time Difference of Arrival (OTDOA), Enhanced Cell ID (ECID), multi-cell RTT, DL Time Difference of Arrival (DL-TDOA), Wireless Local Area Network (WLAN) positioning (e.g., using signals transmitted by IEEE 802.11 WiFi access points), sensors (e.g., inertial sensors) in UE 202, or some (hybrid) combination of these.

At least some of the entities in communication system 200A may correspond to and be the same as or similar to entities in communication system 100. For example, corresponding entities may include one or more of: UE 102 and UE 202; gNB 110 and gNB 210; AMF 154 and AMF 254; LMF 152 and LMF 252; UPF 158 and UPF 258; SMF 156 and SMF 256; GMLC 160 and GMLC 260; NEF 163 and NEF 263; SLP 162 and SLP 262; and external client 130 and external client 260.

As noted, while the communication system 200A is described in relation to 5G technology, the communication system 200A may be implemented to support other communication technologies, such as GSM, WCDMA, LTE, future 6G, etc., that are used for supporting and interacting with mobile devices such as the UE 202 (e.g., to implement voice, data, positioning, and other functionalities).

Figure 2B:
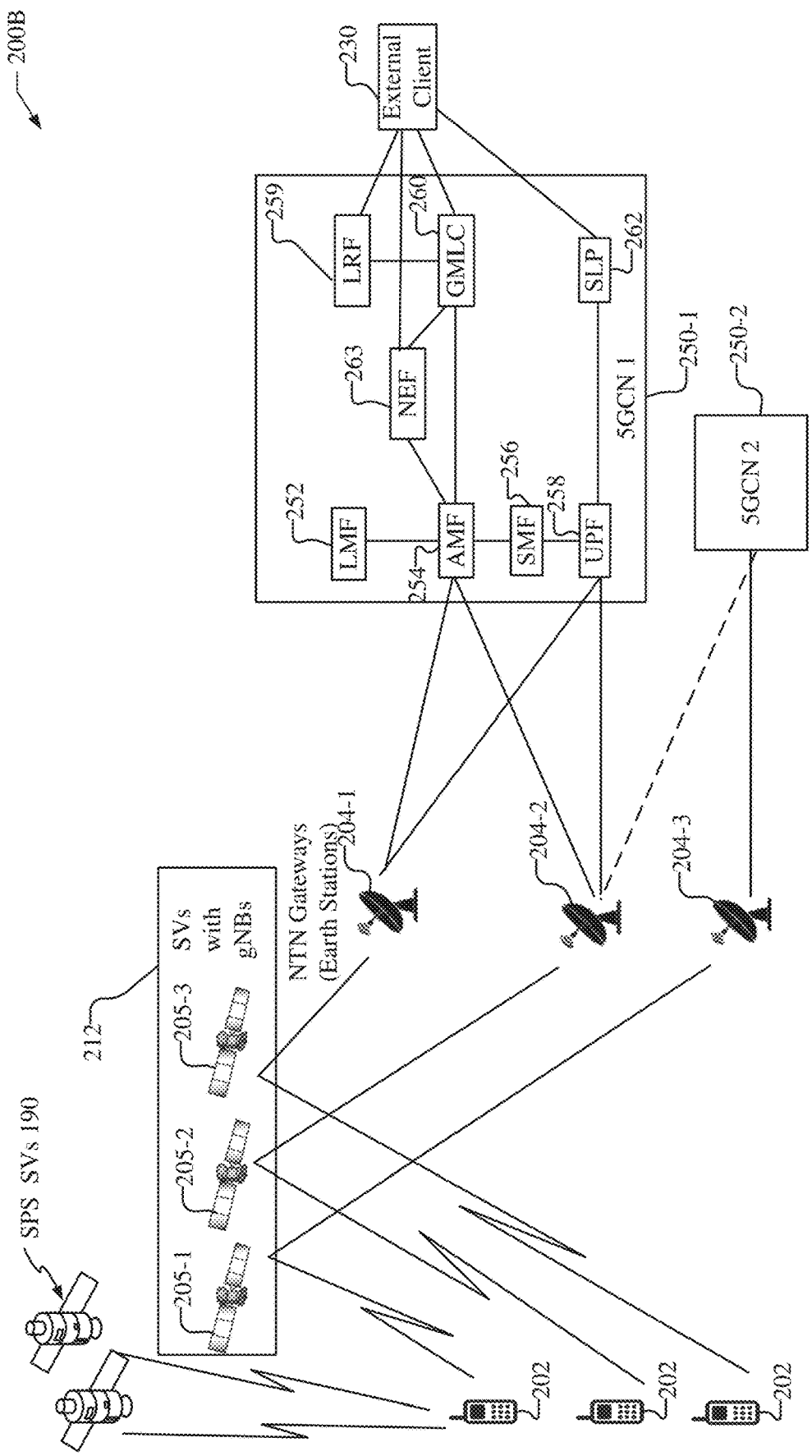
FIG. 2B illustrates high-level system architecture of a wireless communications system that includes regenerative space vehicles in accordance with an aspect of the disclosure.

FIG. 2B shows a diagram of a communication system 200B enabled to support secure location of a UE as discussed herein. The communication system shown in FIG. 2B is similar to that shown in FIG. 2A, like designated elements being similar or the same. FIG. 2B, however, illustrates a communication system with regenerative SVs 205-1, 205-2, and 205-3 (collectively referred to as SVs 205), as opposed to transparent SVs 203 shown in FIG. 2A. A regenerative SV 205, unlike a transparent SV 203, includes an on-board gNB 205 (e.g., that includes the functional capability of a gNB 210), and is sometimes referred to herein as an SV/gNB 205. The NG-RAN 212 is illustrated as including the SV/gNBs 205. Reference to a gNB 205 is used herein when referring to SV/gNB 205 functions related to communication with UEs 202 and 5GCNs 250, whereas reference to an SV 205 is used when referring to SV/gNB 205 functions related to communication with earth stations 204 and with UEs 202 at a physical radio frequency level. However, there may be no precise delimitation of an SV 205 versus a gNB 205.

An onboard gNB 205 may perform many of the same functions as a gNB 210 as described previously. For example, a gNB 205 may terminate the radio interface and associated radio interface protocols to UEs 202 and may transmit DL signals to UEs 202 and receive UL signals from UEs 202, which may include encoding and modulation of transmitted signals and demodulation and decoding of received signals. A gNB 205 may also support signaling connections and voice and data bearers to UEs 202 and may support handover of UEs 202 between different radio cells for the same gNB 205 and between different gNBs 205. The gNBs 205 may assist in the handover (or transfer) of SVs 205 between different Earth stations 204, different 5GCNs 250, and between different countries. The gNBs 205 may hide or obscure specific aspects of SVs 205 from the 5GCN 250, e.g., by interfacing to a 5GCN 250 in the same way or in a similar way to a gNB 110. The gNBs 205 may further assist in sharing of SVs 205 over multiple countries. The gNBs 205 may communicate with one or more earth stations 204 and with one or more 5GCNs 250 via the earth stations 204. In some implementations, gNBs 205 may communicate directly with other gNBs 205 using Inter-Satellite Links (ISLs) (not shown in FIG. 2B), which may support an Xn interface between any pair of gNBs 205.

With LEO SVs, an SV/gNB 205 may need to manage moving radio cells with coverage in different countries at different times. Earth stations 204 may be connected directly to the 5GCN 250, as illustrated. For example, as illustrated, earth station 204-1 may be connected to AMF 254 and UPF 258 of 5GCN 1 250-1, while earth station 204-2 may be similarly connected to 5GCN 1 250-1 and 5GNC 2 250-2, and earth station 204-3 is connected to 5GCN 2 250-2. The earth stations 204 may be shared by multiple 5GCNs 250, for example, if Earth stations 204 are limited. For example, in some implementations (illustrated with dotted lines), earth station 204-2 may be connected to both 5GCN 1 250-1 and 5GCN 2 250-2. The 5GCN 250 may need to be aware of SV 205 coverage areas in order to page UEs 202 and to manage handover. Thus, as can be seen, the communication system with regenerative SVs may have more impact and complexity with respect to both gNBs 205 and 5GCNs 250 than the communication system with transparent SVs 205 shown in FIG. 2A.

Figure 2C:
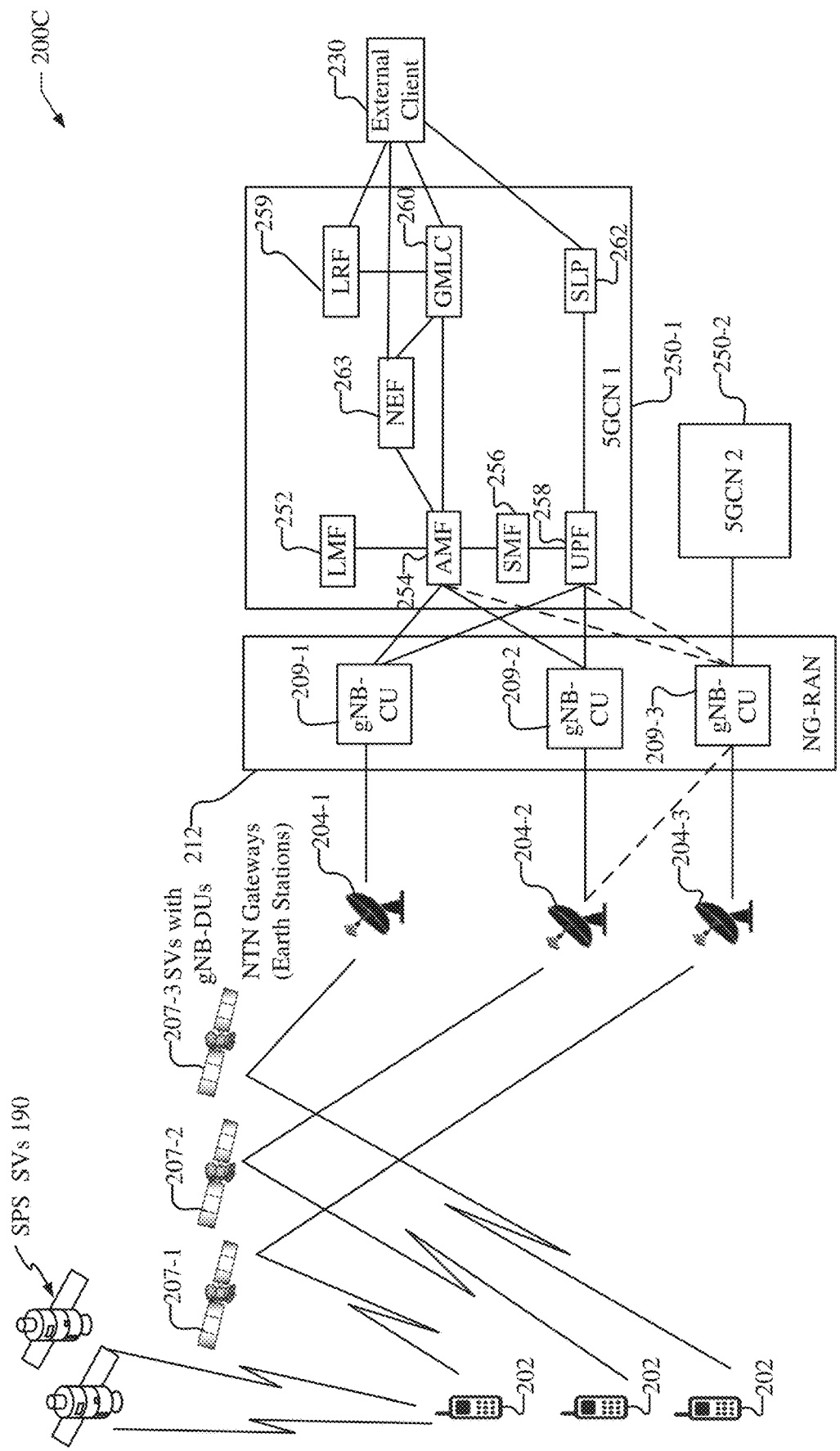
FIG. 2C illustrates high-level system architecture of a wireless communications system that includes regenerative space vehicles in a split architecture in accordance with an aspect of the disclosure.

FIG. 2C shows a diagram of a communication system 200C enabled to support secure location of a UE as discussed herein. The communication system shown in FIG. 2C is similar to that shown in FIGS. 2A and 2B, like designated elements being similar or the same. FIG. 2C, however, illustrates a communication system with regenerative SVs 207-1, 207-2, and 207-3 (collectively referred to as SVs 207), as opposed to transparent SVs 203 shown in FIG. 2A, and with a split architecture for the gNBs. The gNBs 209 include a central unit and may sometimes be referred as gNB-CU 209, and a regenerative SV 207, unlike a transparent SV 203, includes an on-board gNB Distributed Unit (gNB-DU) 207, and is sometimes referred to herein as an SV/gNB-DU 207. Reference to a gNB-DU 207 is used herein when referring to SV/gNB 207 functions related to communication with UEs 202 and gNB-CUs 209, whereas reference to an SV 207 is used when referring to SV/gNB-DU 207 functions related to communication with earth stations 204 and with UEs 202 at a physical radio frequency level. However, there may be no precise delimitation of an SV 207 versus a gNB-DU 207.

Each gNB-DU 207 communicates with one ground based gNB-CU 209 via one or more earth stations 204. One gNB-CU 209 together with the one or more gNB-DUs 207 which are in communication with the gNB-CU 209 performs functions, and may use internal communication protocols, which are similar to or the same as a terrestrial gNB with a split architecture as described in 3GPP technical specification (TS) 38.401. Here a gNB-DU 207 corresponds to and performs functions similar to or the same as a gNB Distributed Unit (gNB-DU) defined in TS 38.401, while a gNB-CU 209 corresponds to and performs functions similar to or the same as a gNB Central Unit (gNB-CU) defined in TS 38.401. For example, a gNB-DU 207 and a gNB-CU 209 may communicate with one another using an F1 Application Protocol (FLAP) as defined in 3GPP TS 38.473 and together may perform some or all of the same functions as a gNB 210 or gNB 205 as described previously. To simplify references to different types of gNB is the description below, a gNB-DU 207 may sometimes be referred to a gNB 207 (without the "DU" label), and a gNB-CU 209 may sometimes be referred to a gNB 209 (without the "CU" label).

A gNB-DU 207 may terminate the radio interface and associated lower level radio interface protocols to UEs 202 and may transmit DL signals to UEs 202 and receive UL signals from UEs 202, which may include encoding and modulation of transmitted signals and demodulation and decoding of received signals. A gNB-DU 207 may support and terminate Radio Link Control (RLC), Medium Access Control (MAC) and Physical (PHY) protocol layers for the NR Radio Frequency (RF) interface to UEs 202, as defined in 3GPP TSs 38.201, 38.202, 38.211, 38.212, 38.213, 38.214, 38.215, 38.321 and 38.322. The operation of a gNB-DU 207 is partly controlled by the associated gNB-CU 209. One gNB-DU 209 may support one or more NR radio cells for UEs 202. A gNB-CU 209 may support and terminate a Radio Resource Control (RRC) protocol, Packet Data Convergence Protocol (PDCP) and Service Data Protocol (SDAP) for the NR RF interface to UEs 202, as defined in 3GPP TSs 38.331, 38.323, and 37.324, respectively. A gNB-CU 209 may also be split into separate control plane (gNB-CU-CP) and user plane (gNB-CU-UP) portions, where a gNB-CU-CP communicates with one or more AMFs 254 in one more 5GCNs 250 using the NGAP protocol and where a gNB-CU-UP communicates with one or more UPFs 258 in one more 5GCNs 250 using a General Packet Radio System (GPRS) tunneling protocol (GTP) user plane protocol (GTP-U) as defined in 3GPP TS 29.281. A gNB-DU 207 and gNB-CU 209 may communicate over an F1 interface to (a) support control plane signaling for a UE 202 using Internet Protocol (IP), Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

A gNB-CU 209 may communicate with one or more other gNB-CUs 209 and/or with one more other gNBs using terrestrial links to support an Xn interface between any pair of gNB-CUs 207 and/or between any gNB-CU 209 and any other gNB.

A gNB-DU 207 together with a gNB-CU 209 may: (i) support signaling connections and voice and data bearers to UEs 202; (ii) support handover of UEs 202 between different radio cells for the same gNB-DU 207 and between different gNB-DUs 207; and (iii) assist in the handover (or transfer) of SVs 207 between different Earth stations 204, different 5GCNs 250, and between different countries. A gNB-CU 209 may hide or obscure specific aspects of SVs 207 from a 5GCN 250, e.g., by interfacing to a 5GCN 250 in the same way or in a similar way to a terrestrial gNB (e.g. a gNB 110). The gNB-CUs 209 may further assist in sharing of SVs 207 over multiple countries.

In communication system 200C, the gNB-DUs 207 that communicate with and are accessible from any gNB-CU 209 will change over time with LEO or MEO SVs 207. With the split gNB architecture, a 5GCN 250 may connect to fixed gNB-CUs 209 which do not change over time and which may reduce difficulty with paging of a UE 202. For example, a 5GCN 250 may not need to know which SV/gNB-DUs 207 are needed for paging a UE 202. The communication system with regenerative SVs 207 with a split gNB architecture may thereby reduce 5GCN 250 impact at the expense of additional impact to a gNB-CU 209.

Similar to the discussion in reference to FIG. 1, a UE 202 may attempt to tamper with or spoof location measurements from NTN transmitters, e.g., SVs 203, 205, 207, terrestrial transmitters, e.g., gNBs 110, and/or SVs 190. In one implementation, in order to enable secure location of a UE 202, satellite or base station assistance data provided by, e.g., LMF 252, for position measurements by the UE 202 may be partly hidden or obfuscated from the UE 102. In some implementations, a hidden or obfuscated variable in the assistance data that is provided to the UE 202 may vary over time in a random (or pseudo-random) manner. Accordingly, if a UE 202 attempts to calculate location measurements for a spoofed location using publicly available assistance data, the location determined from those measurements will include a larger uncertainty than when measurements are not spoofed, that may be greater than a predetermined threshold, and that can thereby be identified by a location server, e.g., LMF 252, and used to identify spoofed location measurements.

Figure 3:
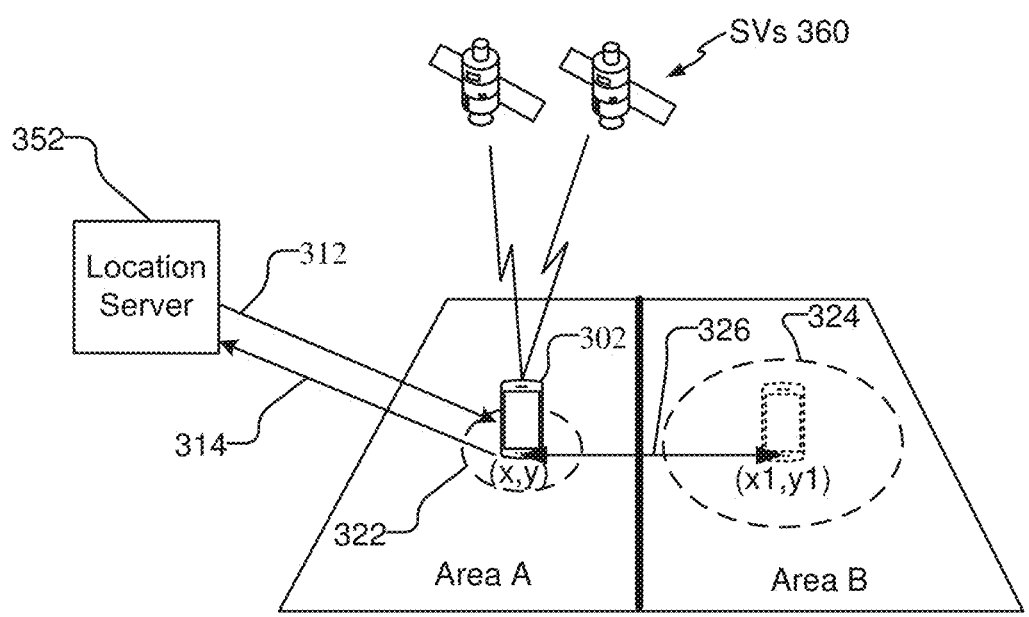
FIG. 3 illustrates an example of an implementation for detecting spoofed positioning measurements from a UE based on location uncertainty associated with the positioning measurements.

FIG. 3, by way of example, illustrates an example of an implementation for detecting spoofed positioning measurements from a UE 302, e.g., UE 102 or 202, based on a location uncertainty associated with the positioning measurements.

The UE 302 may be physically located in an Area A (e.g. where Area A corresponds to a country or a region of a country). As illustrated by arrow 312, a location server 352 (or another entity, such as one or more transmitters, or another server) may provide UE 302 with assistance data that may be used for obtaining positioning measurements and/or determining a location estimate of the UE 302, but that is incomplete and/or incorrect (e.g. completely incorrect or just partially incorrect). FIG. 3 illustrates UE 302 generating positioning measurements from SVs 360, but UE 302 may alternatively (or additionally) generate positioning measurements from terrestrial transmitters, e.g., gNBs 110 or APs. SVs 360 in FIG. 3 may correspond to any of SVs 190, 203, 205 or 207 in FIGS. 1-2C or to some type of SV. The location server 352 in FIG. 3 may correspond to any of LMF 152, LMF 252, SLP 162, SLP 164 or SLP 262 in FIGS. 1-2C or to some other location server.

In one example, the incomplete and/or incorrect assistance data provided to UE 302 may include a positioning signal schedule for each transmitter, illustrated as SVs 360 in FIG. 3. For example, a transmitting entity, such as any of SVs 360, may receive a positioning signal schedule (e.g. from a location server such as LMF 252 or from an O&M server), and may transmit positioning signals based on the positioning signal schedule. The positioning signals transmitted from the SVs 360 may be transmitted according to the positioning signal schedule for each transmitter, but where the actual transmission times of the positioning signals includes a variation in time that differs from the transmission times indicated in the positioning signal schedules provided to the UE 302, e.g., the UE 302 does not receive the variations in time. In some implementations, the variations in time in the transmission times of the positioning signals may change over time, e.g., in a random manner.

In some implementations, the incomplete and/or incorrect assistance data provided to UE 302 may include data for the positioning signals, the transmitters, or both. The data for the positioning signals, transmitters, or both may be configured to produce an inaccuracy in spoofed positioning measurements that are determined (e.g. by the UE 302 or by a user of the UE 302) based at least in part on the assistance data. The inaccuracy in the spoofed positioning measurements may produce a location uncertainty or error for an estimated location of the UE 302 that is greater than (e.g., more than a predetermined threshold greater than) a location uncertainty or error that would result from accurate (non-spoofed) positioning measurements obtained by a UE that was actually located at the spoofed location. In some implementations, the assistance data may include a time varying error, which may change in a random or pseudo-random manner, but that is known to the location server 352 but not the UE 302. The incomplete and/or incorrect data in the assistance data, for example, may include an indication of positioning signal transmission times that include a time varying error with respect to the actual positioning signal transmission times, which is known to the location server 352. The incomplete and/or incorrect data in the assistance data in some implementations may include space vehicle ephemeris, a base station or antenna location, clock data, a positioning signal transmission time, or any combination thereof.

The UE 302 may obtain positioning measurements from one or more transmitters (illustrated as SVs 360 in FIG. 3) while the UE 302 is at position (x,y) that is physically located in Area A. In UE assisted positioning, the UE 302 provides location information 314 to the location server 352, which estimates a location of the UE 302 with a location uncertainty based on the received positioning measurements and complete and correct assistance data available to the location server 352, e.g., including positioning signal times, transmitter or antenna locations, etc. If the UE 302 provides the location server 352 with the actual positioning measurements obtained for position (x,y), i.e., positioning measurements that are not spoofed, the location server 352 can estimate an accurate location of the UE 302 based on the positioning measurements and the complete and correct information for the positioning signals and transmitters available to the location server 352. For example, the estimated location may be within the circle 322 shown in FIG. 3 with a probability P (e.g. P=90%), where the circle 322 is centered on the actual position (x,y) and has a radius corresponding to the uncertainty of the location at a confidence level P. Because the positioning measurements are not spoofed, the positioning measurements will not include additional errors due to the incomplete and/or incorrect assistance data received by the UE 302, and the location uncertainty associated with the positioning measurements can be relatively small.

The UE 302 (or an attacker impersonating UE 302) may instead attempt to spoof positioning measurements for a different location (x1,y1) than the location (x,y) at which the UE 302 is really located using, e.g., actual positioning measurements for location (x,y) and the incomplete and/or incorrect assistance data. The different location (x1,y1) is shown as located in an area B, which may correspond to a different country or a different region of a country than the Area A, and the spoofing may be intended to falsely imply that UE 302 is located in the different country or different region of a country. For example, the UE 302 may calculate spoofed position measurements for location (x1,y1) based on (i) a known distance and bearing 326 from location (x,y) to location (x1,y1), (ii) the position measurements actually obtained at location (x,y), and (iii) the incomplete and/or incorrect assistance data. Consequently, the spoofed position measurements calculated by the UE 302 will include errors that are due to the incomplete and/or incorrect assistance data relied upon by the UE 302.

The UE 302 may provide the location server 352 with the spoofed positioning measurements for position (x1,y1), i.e., positioning measurements that include errors introduced due to the incomplete and/or incorrect assistance data. The location server 352 will estimate the location of the UE 302 and location uncertainty based on the spoofed positioning measurements and complete and correct assistance data available to the location server 352. Due to the errors included in the spoofed positioning measurements by the UE 302, the location server 352 will estimate the spoofed location (x1,y1) with a relatively large uncertainty (or error) shown by the circle 324 (e.g. the radius of the circle 324 may be many times (e.g. 5 to 100 times) the radius of the circle 322). The amount of uncertainty or error 324 in the spoofed position estimate (x1,y1) will be greater than the amount of uncertainty or error 322 in an accurate position estimate (x,y) by an amount that is a function of the incomplete and/or incorrect assistance data provided to the UE 302.

Thus, the location server 352 may determine a location uncertainty associated with positioning measurements received from the UE 302 by determining the estimated location (e.g., an estimate of the location (x,y) or an estimate of the spoofed location (x1,y1)) of the UE 302 and the location uncertainty for the estimated location (e.g., uncertainty 322 or uncertainty 324, respectively), based on the positioning measurements received from the UE 302 and the correct and complete assistance data for the positioning signals and transmitters.

The location server 352 may determine whether the positioning measurements from the UE 302 may have been spoofed based on the location uncertainty that is associated with the positioning measurements, e.g., by comparing the location uncertainty associated with the positioning measurements with an expected location uncertainty for positioning measurements that are not spoofed. For example, the expected location uncertainty for positioning measurements that are not spoofed would be similar to the uncertainty illustrated by circle 322, which is relatively small compared to the location uncertainty for positioning measurements that have been spoofed, e.g., illustrated by circle 324.

The location server 352 may determine that the positioning measurements from the UE 302 may have been spoofed if the location uncertainty is greater than the expected location uncertainty by more than a predetermined threshold. Conversely, the location server 352 may determine that the positioning measurements from the UE 302 are not spoofed if the location uncertainty is not greater than the expected location uncertainty by more than the predetermined threshold. The predetermined threshold, for example, may be a function of the incomplete and/or incorrect assistance data provided to the UE 302. The predetermined threshold may, for example, be some multiple of the expected location uncertainty. For example, where the expected location uncertainty (for actual measurements) is 10 meters and the uncertainty for spoofed measurements is typically around 1 kilometer, the multiple might be in the range of 5 to 20.

Figure 4A:
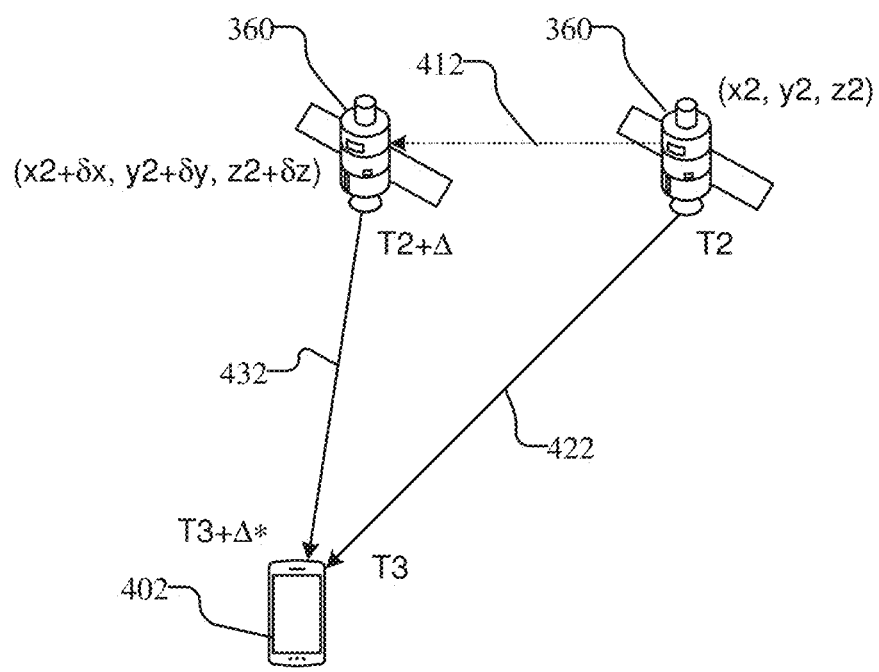
FIG. 4A illustrates an example of the effect of a variation in transmissions times of positioning signals from a space vehicle transmitter.

FIG. 4A illustrates an example of the effect of a variation in transmissions time of positioning signals from a non-terrestrial transmitter, e.g., an SV 360. If an SV 360, such as a LEO SV, transmits a positioning signal with varying transmission times, the location of the SV 360 at each transmission time will also vary. For example, as illustrated, the SV 360 may transmit a positioning signal 422 at a time T2 when the SV 360 is at a position (x2,y2,z2), which may arrive at the location of a UE 402 (e.g. corresponding to UE 102, 202 or 302) at a time T3. Alternatively, SV 360 may transmit a positioning signal 432 after the SV 360 has moved, as illustrated by arrow 412, at a slightly later time T2+A when the SV 360 is at different position (x2+δx,y2+δy,z2+δz), which may arrive at the location of UE 402 at a time T3+Δ*, where Δ* would typically be the same as or almost the same as Δ. If UE 402 has accurate and complete orbital data for the SV 360 and is accurately aware of its own location (e.g. using GNSS), the UE 402 could pinpoint the location of the SV 360 at which the signal was transmitted from the time of arrival of the signal (T3 or T3+Δ*) at UE 402, since (due to the much higher speed of the signal than the speed of SV 360), there will be a one to one mapping between signal arrival time at UE 402 and the SV 360 transmitting position. However, if UE 402 is only provided with incomplete or no orbital data for SV 360, such that UE 402 does know the association of possible transmission times to the position of SV 360 for each transmission time, then UE 402 would not be able to pinpoint the location of the SV 360 at which the signal was transmitted from the time of arrival of the signal at UE 402. Furthermore, if the exact transmission time is unknown to the UE 402, the UE 402 would not be able to determine the exact distance to the SV 360 from the time of arrival of the signal at UE 402, which might otherwise have been used to help infer the orbit of SV 360. Consequently, regardless of whether the UE 402 receives and measures the signal at time T3 or at time T3+Δ*, the UE 402 would not be able to determine whether the SV 360 transmitted the signal at position (x2,y2,z2), position (x2+δx,y2+Δy,z2+δz) or some other position in between these positions or further along the orbit of SV 360. This would prevent the UE 402 from accurately spoofing measurements for the SV 360 for some other location, as the UE 402 would not know when the signal from the SV 360 would arrive at the other location due to the uncertainty of the position of the SV 360 and the time at which the signal was transmitted.

It is noted that the random or pseudo-random variation in transmission time as just described can be effective in allowing detection of spoofing from a UE 402 which does not have accurate and complete data on SV 360 orbital data but not necessarily from a UE 402 which does have accurate and complete orbital data.

Figure 4B:
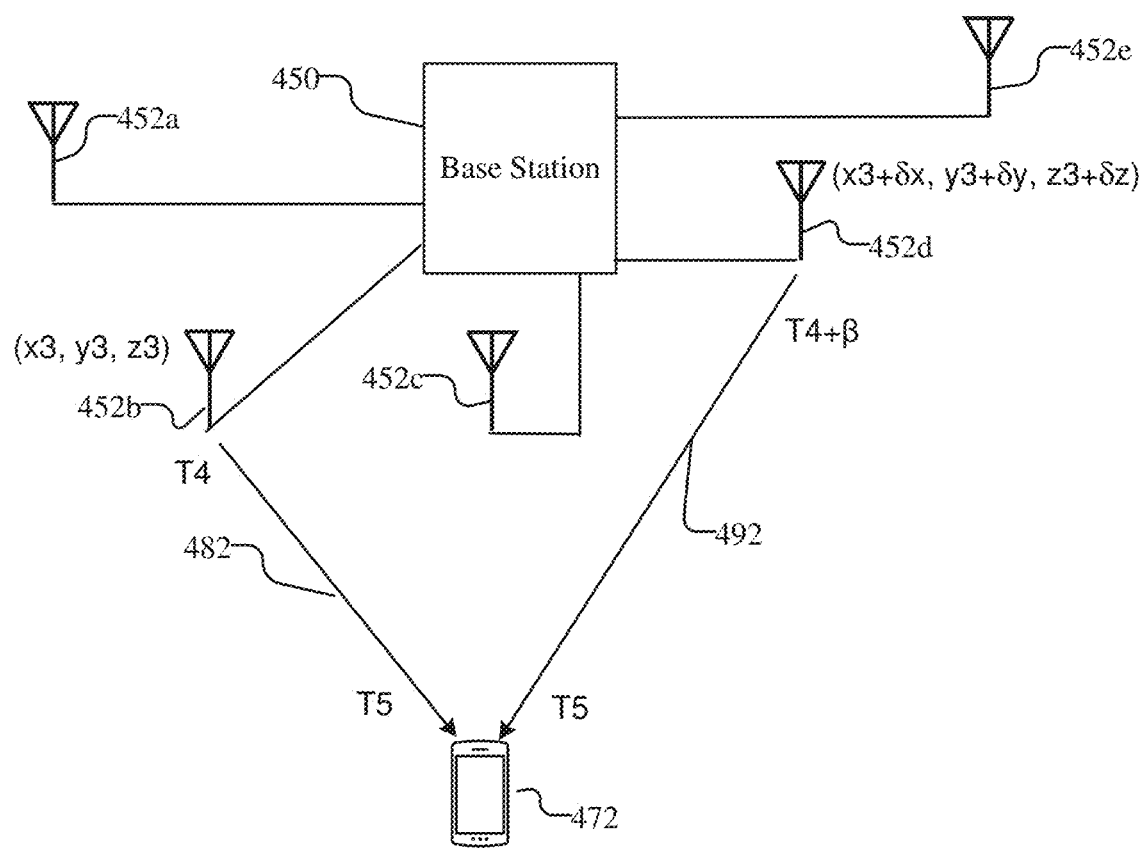
FIG. 4B illustrates an example of the effect of a variation in transmissions times and transmission locations of positioning signals from a terrestrial transmitter.

FIG. 4B illustrates an example of the effect of a variation in antennas and transmission times from a terrestrial base station 450. The terrestrial base station 450, for example, may be a gNB, such as gNB 110 shown in FIG. 1, with several remote antennas 452a, 452b, 452c, 452d, and 452e (collectively referred to as antennas 452). Each antenna may be a remote radio head, e.g., at distances that may range from 100 meters to 5 kms from the controller for the base station 450.

The base station 450 may transmit positioning signals from varying antennas and with varying transmission times that are not indicated to a UE. As illustrated, if a UE 472 (e.g. any of UEs 102, 202, 302, 402) were to receive a positioning signal from the base station 450 at a time T5, it is possible that the positioning signal was transmitted from antenna 452b (as positioning signal 482 in FIG. 4B), which is at a position (x3,y3,z3), at a time T4, where T5−T4 is the signal propagation time from antenna 452b to UE 472. Alternatively, the positioning signal could have been transmitted from antenna 452d (as positioning signal 492 in FIG. 4B), at a different position (x3+δx,y3+δy,3z+δz), and at a time T4+β, where β may be positive or negative and may equal the propagation time to UE 472 from antenna 452b minus the propagation time to UE 472 from antenna 452*d*. Similarly, it is possible that the positioning signal could have been transmitted from any of the other antennas 452 at slightly varying transmission times. This is a result of UE 472 not knowing which antenna 452 was used for the transmission and at what time the transmission occurred.

During positioning of the UE 472, the base station 450 may transmit each positioning signal from just one antenna, e.g., antenna 452*b* for a first transmission of a positioning signal, antenna 452*d* for a second transmission of the positioning signal, antenna 452*e* for a third transmission of the positioning signal, etc. The UE 472 would not be informed from which antenna the positioning signal is transmitted, e.g., the positioning signal schedule and/or positioning assistance data sent to UE 472 would not provide this data or provide inaccurate data. Combined with a variation in the time of transmission, when the UE 472 receives the positioning signal from a base station, the UE 402 would not be able to determine when the positioning signal was transmitted or from which antenna the positioning signal was transmitted, and accordingly, would not be able to spoof the positioning measurement without a large amount of error.

For example, even if UE 472 knows its own location accurately and knows the locations of each of the antennas 452 accurately, the UE 472 would not be able to determine the transmission time and transmitting antenna reliably, which would mean that UE 472 could not accurately spoof measurements for other locations. In some cases, UE 472 might attempt to use other measurements to identify the transmitting antenna (e.g. an angle of arrival measurement), but this would not always be reliable—e.g. if UE 472 was distant from all the antennas 452 (e.g. more than 5 kms distant) or if the distances between the antennas was small (e.g. 100 to 200 meters) which could result in small differences in angle of arrival (e.g. a few degrees) which typically could not be accurately measured by a UE 472.

Similar to increasing the location uncertainty by providing an incorrect time of transmission of the positioning signal and/or an incorrect (or no) location of transmission, the location uncertainty may be altered by providing other types of incomplete and/or incorrect assistance data, such as space vehicle ephemeris, a base station location, clock data, positioning signal transmission time, or any combination thereof.

Figure 5:
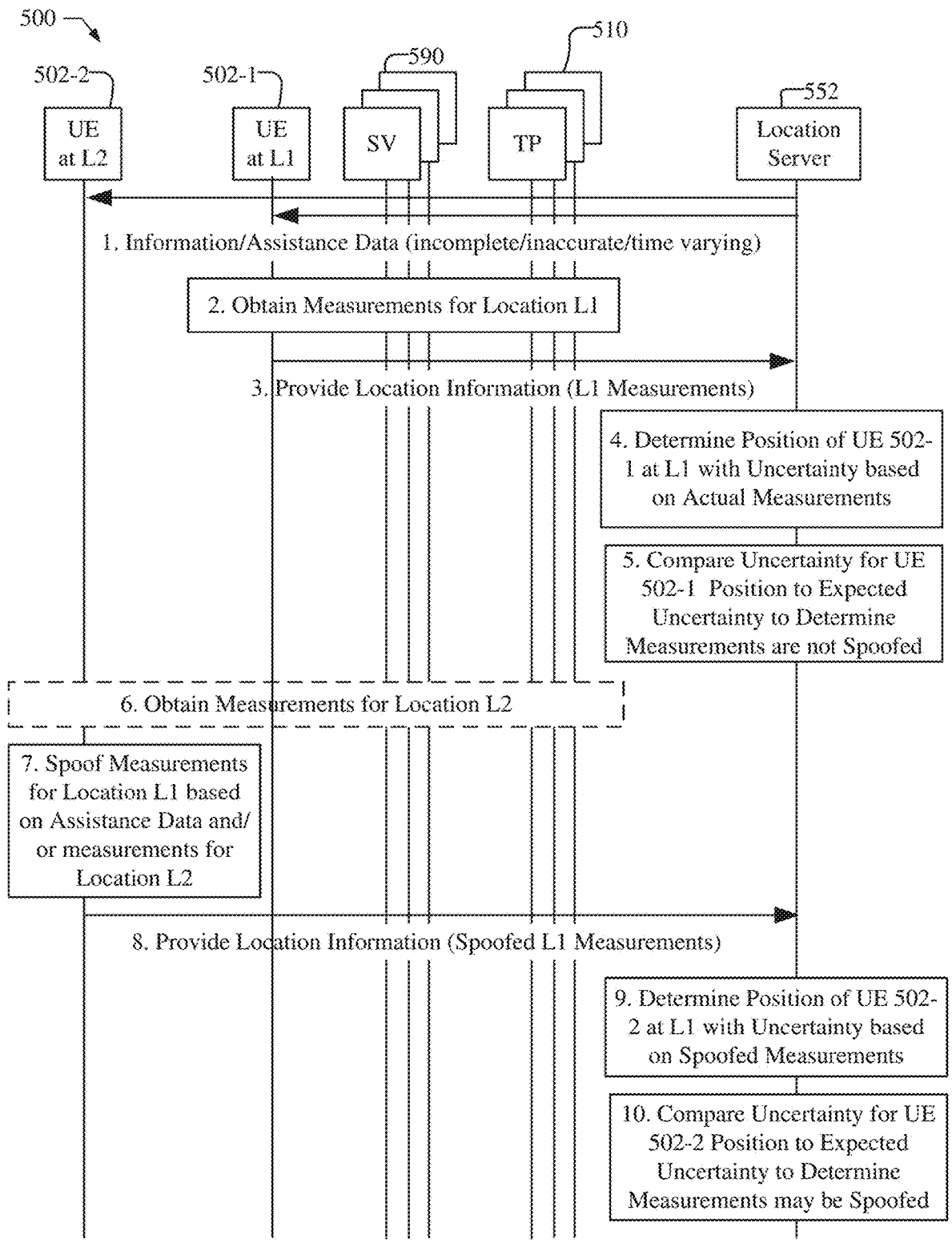
FIG. 5 shows a signaling flow illustrating various messages sent between components of a communication system in a procedure to enable securely locating a UE using UE assisted location as discussed herein.

FIG. 5 shows a signaling flow 500 that illustrates various messages sent between components of a communication system in a procedure to enable securely locating a UE using UE assisted location as discussed herein. The communication system, for example, may correspond to or be similar to any of the communication systems 100, 200A, 200B, or 200C illustrated in FIG. 1, 2A, 2B, or 2C, respectively. Moreover, the procedure implemented via the messages and actions illustrated in FIG. 5 may be similar to the procedure discussed in reference to FIG. 3. FIG. 5 illustrates for example, two UEs including UE 502-1 at location L1 and UE 502-2 at location L2. The UEs 502-1 and 502-2 may sometimes be referred to as UEs 502, and may be the same as or similar to UE 102 shown in FIG. 1, UE 202 shown in FIG. 2A, 2B, or 2C, UE 302 shown in FIG. 3, UE 402 shown in FIG. 4A or UE 472 shown in FIG. 4B. The UEs 502 may communicate with location server 552, which may be, e.g., LMF 152, SLP 162 or SLP 164 shown in FIG. 1, LMF 252 or SLP 262 shown in FIG. 2A, 2B, or 2C, or location server 352 shown in FIG. 3. The UEs 502 may further communicate with and/or obtain positioning measurements of signals (e.g. PRS signals) transmitted from one or more transmitters which may include Transmission Points (TPs) 510 and/or SVs 590. The TPs 510 may be terrestrial transmitters, such as an AP, a base station or a gNB 110 in FIG. 1. The SVs 590 may correspond to any of SVs 203, 205, or 207 shown in FIG. 2A, 2B, or 2C, respectively, SVs 360 in FIG. 3, and/or SVs 190 shown in FIGS. 1, 2A, 2B and 2C.

As illustrated at stage 1 in FIG. 5, the UEs 502 may receive information that may comprise assistance data that may include a positioning signal schedule for TPs 510 and/or SVs 590, ephemeris or orbital data for SVs 590, location information for TPs 510, characteristics or configuration information for positioning signal transmitted by SVs 590 and/or TPs 510 (e.g. such as signal timing, signal duration, signal periodicity, frequency, bandwidth, coding, muting etc.). The provided assistance data may be incomplete and/or inaccurate (e.g. not completely accurate), and may be time varying, e.g., where an inaccuracy varies over time in a random or pseudo-random manner. The incomplete and/or inaccurate assistance data, for example, may be received from the location server 552, as illustrated in FIG. 5, e.g., via one or more TPs 510 such as a serving base station, and/or via one or more SVs 590 such as a serving SV 590. In some implementations, the incomplete and/or inaccurate assistance data may be received by the UEs 502 from another entity, such as one or more of the TPs 510, SVs 590, or a separate server (not shown), which may in turn receive the incomplete and/or inaccurate assistance data (e.g. including a positioning signal schedule) from the location server 552 or from an O&M server.

The incomplete and/or incorrect assistance data, for example, may include a positioning signal schedule for each transmitter (e.g. each TP 510 and/or each SV 590) that includes a variation in time with respect to the actual scheduled transmissions times for the positioning signals. For example, the transmitters may receive the positioning signal schedule, and may transmit positioning signals based on the positioning signal schedule. The amount of the variation in scheduled transmissions times may change in a random or pseudo-random manner over time. The actual scheduled transmission time schedules, as well as the variations in scheduled transmissions times may be known by the location server 552. The incomplete and/or incorrect assistance data, for example, may not identify (or may inaccurately identify) the antenna (e.g. remote radio head) from which positioning signals from a transmitter such as a TP 510 are transmitted, i.e., the transmitter may transmit positioning signals from varying antennas, which the UEs 502 are not aware of. The incomplete and/or incorrect assistance data may include incomplete and/or incorrect data for the positioning signals, the transmitters, or both, and may be related to SV 590 ephemeris, a TP 510 location, clock data, positioning signal transmission time, or any combination thereof. The inaccuracy/incompleteness of the data for the positioning signals, transmitters, or both may be configured to produce an inaccuracy in spoofed positioning measurements that are produced (e.g. by a UE 502) based at least in part on the inaccurate/incomplete data. The inaccuracy in the spoofed positioning measurements will typically (or always) produce a location uncertainty or error that is greater than an location uncertainty or error that would result from accurate (un-spoofed) positioning measurements.

Stages 2-5 illustrated a UE assisted positioning procedure in which the UE 502-1 provides accurate position measurements to the location server 552 for a current location of the UE 502-1, i.e., the UE 502-1 does not attempt to spoof the position measurements, and the location server 552 determines that the position measurements received from the UE 502-1 are not spoofed based on the location uncertainty associated with the position measurements.

At stage 2, the UE 502-1, which is present at location L1 may obtain positioning measurements for positioning signals transmitted by one or more of the transmitters comprising TPs 510 and/or SVs 590. The transmitters, for example, may transmit positioning signals based on a positioning signal schedule, where the actual transmission times of the positioning signals may include a variation in time that differs from transmissions times indicated to the UE 502-1. The incomplete and/or incorrect assistance data provided to UE 502-1, for example, may not identify (or may inaccurately identify) an antenna (e.g. remote radio head) from which positioning signals from a TP 510 are transmitted, e.g., the TP 510 may transmit positioning signals from varying antennas, of which the UE 502-1 is not aware. One or more TPs 510 may transmit positioning signals from varying antennas, and the UE 502-1 is not provided with information (or is provided with inaccurate information) about which antenna is transmitting the positioning signal. The positioning measurements, for example, may be A-GNSS, RTK, PPP, DGNSS, etc., obtained from SVs 590 and/or DL-TDOA, ECID, RTT, multi-cell RTT, AOA, AOD, TOA, Rx-Tx, etc., obtained from transmitters 510. The positioning measurements may be obtained using the information or assistance data received at stage 1.

At stage 3, the UE 502-1 sends a provide location information message to the location server 552 that includes the actual positioning measurements for location L1 obtained by UE 502-1 at stage 2.

At stage 4, the location server 552 determines an estimated position of UE 502-1 at location L1 with a location uncertainty based on the actual positioning measurements received at stage 3, and using information/assistance data that is complete and accurate. The estimated position and location uncertainty, for example, may be determined using conventional positioning techniques based on the positioning measurements and known locations and known transmission times of the transmitters. The location uncertainty in the estimated position, for example, may be due to unavoidable measurement and/or assistance data inaccuracies caused by errors in measurement by UE 502-1, unknown additional signal transfer delays inside the transmitters and/or UE 502-1, transmission and/or reception timing errors, unknown extra ionospheric or tropospheric propagation delay for SVs 590, etc., but since the estimated position and location uncertainty are determined using the actual positioning measurements and complete and accurate information/assistance data, the location uncertainty is not due to the inaccurate and/or incomplete assistance data provided to the UE 502-1 at stage 1.

At stage 5, the location server 552 may determine whether the positioning measurements provided in stage 3 from the UE 502-1 have been spoofed based on the location uncertainty associated with the positioning measurements. The location server 552, for example, may compare the location uncertainty determined in stage 4 with an expected location uncertainty for positioning measurements that are not spoofed. The location server 552 may determine that the positioning measurements obtained at stage 3 from the UE 502-1 are not spoofed (or are unlikely to be spoofed) if the location uncertainty determined at stage 4 is not greater than an expected location uncertainty by more than the predetermined threshold. The predetermined threshold, for example, may be a function of the type and/or magnitude of the incomplete and/or inaccurate information or assistance data provided to the UE 502-1 at stage 1. For example, the predetermined threshold may be some multiple (e.g. 5 to 20) of the expected location uncertainty.

Stages 6-10 illustrate a UE assisted positioning procedure in which the UE 502-2 attempts to spoof position measurements that are provided to the location server 552 and the location server 552 determines that the position measurements received from the UE 502-1 are or may be spoofed based on the location uncertainty associated with the position measurements.

At stage 6, the UE 502-2, which is present at location L2, may obtain positioning measurements (which will apply to location L2) for positioning signals transmitted by one or more of the transmitters, comprising TPs 510 and/or SVs 590, and received by the UE 502-2 at the location L2. The transmitters, for example, may transmit positioning signals based on a positioning signal schedule, where the actual transmission times of the positioning signals may include a variation in time that differs from transmissions times indicated to the UE 502-2. The UE 502-2, for example, may use the positioning measurements for the location L2 for calculating spoofed positioning measurements for location L1 (at stage 7). It is noted that a different spoofed location than L1 could have been assumed here, and that the reason for assuming L1 is to show the difference between actual measurements for L1 from UE 502-1 compared to spoofed measurements for L1 from UE 502-2.

In some implementations, the UE 502-2 may not use positioning measurements for location L2 for calculating the spoofed positioning measurements for location L1 (at stage 7), and in such an implementation, the UE 502-2 would not need to obtain position measurements for location L2 at stage 6. One or more transmitters (e.g. one or more TPs 510) may transmit positioning signals from varying remote antennas (e.g. remote radio heads), and the UE 502-2 is not provided with information (or is provided with inaccurate information) about which antenna is transmitting each positioning signal. The positioning measurements, for example, may be for A-GNSS, RTK, PPP, DGNSS, etc., obtained from SVs 590 and/or DL-TDOA, ECID, RTT, multi-cell RTT, AOA, AOD, TOA, Rx-Tx, etc., obtained from TPs 510. The positioning measurements for location L2 may be obtained (i.e. measured) using the information or assistance data received at stage 1.

At stage 7, the UE 502-2 generates spoofed positioning measurements for location L1 based on the information or assistance data received at stage 1. In some implementations, the UE 502-2 may use the positioning measurements obtained at stage 6 at location L2 along with the information or assistance data received at stage 1 to generate the spoofed positioning measurements for location L1. Because the information/assistance data received at stage 1 is incomplete and/or inaccurate, the spoofed positioning measurements calculated by the UE 502-2 based on the information or assistance data will include errors, which are not present in actual positioning measurements obtained at location L1 (e.g., as obtained by UE 502-1 at stage 2). The type and magnitude in the errors in the spoofed positioning measurements is a function of the type of incomplete information/assistance data and/or the type and magnitude of the inaccuracy of the information/assistance data provided to the UE 502-2 at stage 1.

At stage 8, the UE 502-2 sends a provide location information message to the location server 552 that includes the spoofed positioning measurements for location L1 that were generated by UE 502-2 at stage 7.

At stage 9, the location server 552 determines an estimated position of UE 502-2 at (or near to) location L1 with a location uncertainty based on the spoofed positioning measurements received at stage 8, and using information/ assistance data that is complete and accurate. The estimated position and location uncertainty, for example, may be determined using conventional positioning techniques based on the positioning measurements and known locations and transmission times of the transmitters. The location uncertainty in the estimated position will be mainly due to the errors in the spoofed positioning measurements resulting from the incomplete and/or inaccurate information or assistance data that the UE 502-2 relied upon for generating the spoofed positioning measurements in stage 7.

At stage 10, the location server 552 may determine whether the positioning measurements provided in stage 8 from the UE 502-2 have been spoofed based on the location uncertainty associated with the positioning measurements. The location server 552, for example, may compare the location uncertainty determined in stage 9 using spoofed positioning measurements with an expected location uncertainty for positioning measurements that are not spoofed. The location server 552 may determine that the positioning measurements obtained at stage 8 from the UE 502-2 either are, or may have been, spoofed if the location uncertainty determined at stage 9 is greater than an expected location uncertainty by more than the predetermined threshold. The predetermined threshold, for example, may be a function of the type and/or magnitude of the incomplete and/or inaccurate information or assistance data provided to the UE 502-2 at stage 1. For example, the predetermined threshold may be some multiple (e.g. 5 to 20) of the expected location uncertainty.

One possible problem in the determination of spoofed positioning measurements, as just described above, may arise if a UE 502 has a poor implementation or is at a location where larger errors occur in positioning measurements obtained at that location compared to other locations. In that case, and when the UE 502 is not spoofing positioning measurements, the location server 552 may determine a higher uncertainty for the estimated location of the UE 502 due to the higher errors in the positioning measurements and may mistakenly determine that the UE 502 has or may have spoofed the positioning measurements. To avoid this type of error, and in a variant of the procedure shown in FIG. 5, the location server 552 or another entity (e.g. a TP 510 or SV 590) provides the UE 502 with incomplete and/or inaccurate information or assistance data at stage 1 for some subset P1 of the positioning signals to be measured by the UE 502 and optionally for a subset S1 of transmitters (TPs 510 and/or SVs 590) that transmit the subset P1 of positioning signals. The location server 552 or the other entity (e.g. a TP 510 or SV 590) also provides the UE 502 with complete and accurate information or assistance data for a remaining subset P2 of positioning signals to be measured by the UE 502 and optionally for a remaining subset S2 of transmitters that transmit the subset P2 of positioning signals. However, the UE 502 is not informed which positioning signals are in the subset P1 and which positioning signals are in the subset P2 or which transmitters are in the subset S1 and which transmitters are in the subset S2.

In the case of the UE 502-1, the positioning measurements obtained at stage 2 and provided to the location server 552 at stage 3 would typically not be affected, or only be marginally affected, by the differing accuracy and completeness of the information or assistance data provided at stage 1. So the determination at stage 5 that the positioning measurements from UE 502-1 are not spoofed (or are unlikely to be spoofed) need not be affected. Conversely, for UE 502-2 which spoofs positioning measurements for location L1 at stage 7, the complete and accurate information or assistance data for the positioning signals in the subset P2 and optionally for the transmitters in the subset S2 will allow UE 502-2 to spoof more accurate positioning measurements M2 for these positioning signals compared to spoofing less accurate positioning measurements M1 for the other positioning signals in the subset P1 for which incomplete and/or inaccurate information or assistance data was provided at stage 1. Location server 552 may then determine a greater uncertainty in location for the positioning measurements M1 and a lower uncertainty in location for the positioning measurements M2. For example, the location server 552 could determine an estimated location E1 of the UE 502-2 based on the positioning measurements M1 and another estimated location E2 of the UE 502-2 based on the positioning measurements M2 and determine that the uncertainty of the location E1 is higher than the uncertainty of the location E2 by some predetermined threshold. In that case, the location server 552 can determine that the UE 502-2 has (or may have) spoofed the positioning measurements M1 and M2. In the case of the UE 502-1, analogous estimated locations E1* and E2* for analogous positioning measurements M1* and M2* from UE 502-1 may be determined by the location server 552 to be the same or approximately the same. For example, the location server 552 may determine that the uncertainty of the location E1* is not higher than the uncertainty of the location E2* by the predetermined threshold and that UE 501-1 has therefore not spoofed the positioning measurements.

Figure 6:
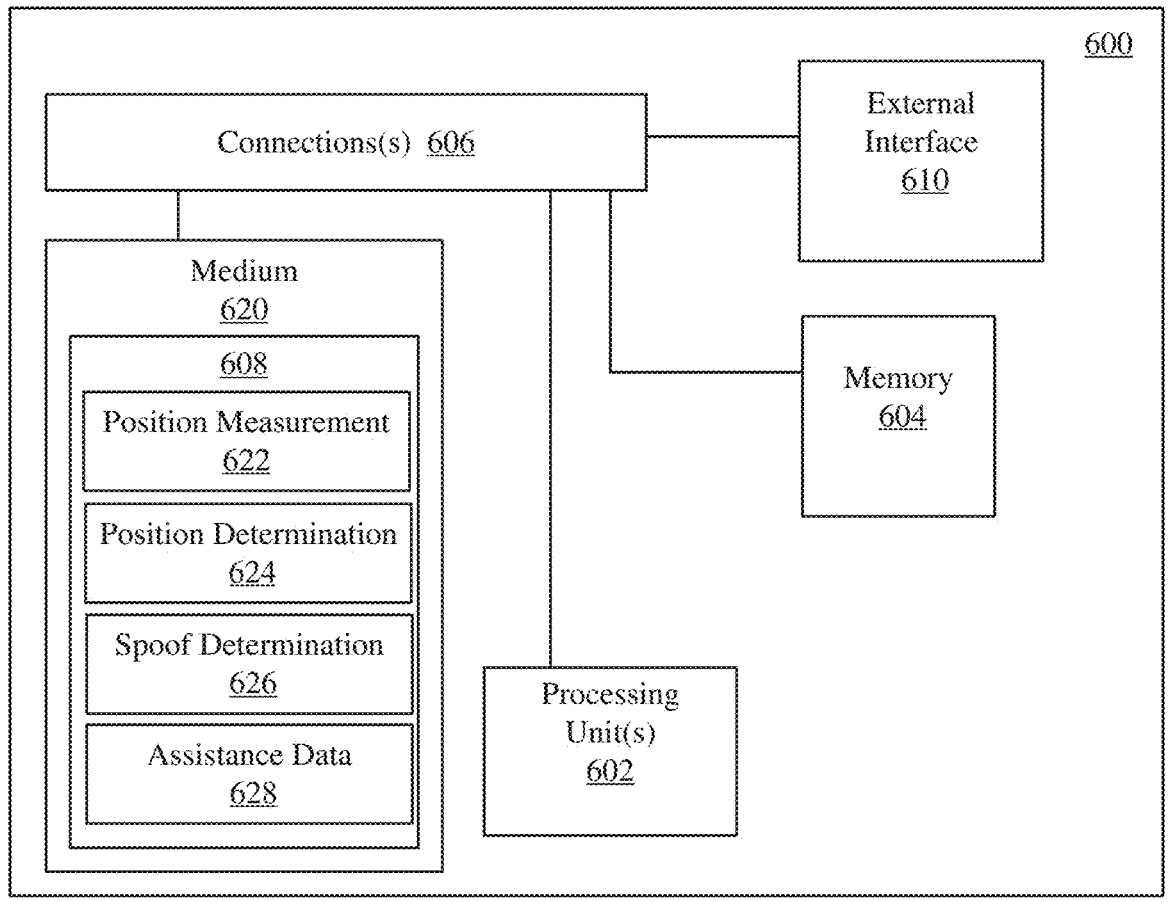
FIG. 6 shows a schematic block diagram illustrating certain exemplary features of a location server configured for supporting reliable positioning of a UE in a wireless network.

FIG. 6 shows a schematic block diagram illustrating certain exemplary features of a location server 600, which may be an LMF or SLP, such as LMF 152, SLP 162 or SLP 164 shown in FIG. 1, LMF 252 or SLP 262 shown in FIG. 2A, 2B, or 2C, or location server 352 shown in FIG. 3 or location server 552 shown in FIG. 5. The location server 600 is configured for supporting reliable positioning of a UE in a wireless network, e.g., as discussed herein. The location server 600 may be configured to perform the signal flow shown in FIG. 5 and the process flow shown in FIG. 9 and techniques and algorithms disclosed herein. Location server 600 may, for example, include one or more processors 602, memory 604, an external interface 610 (e.g., wireline or wireless network interface to other entities in the network), which may be operatively coupled with one or more connections 606 (e.g., buses, lines, fibers, links, etc.) to non-transitory computer readable medium 620 and memory 604. The location server 600 may further include additional items, which are not shown, such as a user interface that may include e.g., a display, a keypad or other input device, such as virtual keypad on the display, through which a user may interface with the UE. In certain example implementations, all or part of location server 600 may take the form of a chipset, and/or the like. The external interface 610 may be a wired or wireless interface capable of connecting to other servers in the RAN or network entities, such as an AFM or GMLC, or to communicate with a UE via one or more intervening entities.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of location server 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in location server 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in location server 600 is merely exemplary, and as such the functionality of the modules and/or data structures may be combined, separated, and/or be structured in different ways depending upon the implementation of the location server 600.

The medium 620 and/or memory 604 may include position measurement module 622 that when implemented by the one or more processors 602 configures the one or more processors 602 to receive positioning measurements from the UE, via the external interface 610. The position measurements, for example, may be received in a provide location information message.

The medium 620 and/or memory 604 may include a position determination module 624 that when implemented by the one or more processors 602 configures the one or more processors 602 to determine a location uncertainty associated with positioning measurements received from a UE, e.g., as discussed in reference to FIG. 3 and FIG. 5. The one or more processors 602, for example, may be configured to determine an estimated location of the UE and the location uncertainty for the estimated location of the UE based on positioning measurements received from the UE and correct complete data for the positioning signals purported to produce the positioning measurements and the transmitters that transmitted the positioning signals. The one or more processors 602, for example, may be configured to determine a first location uncertainty that is associated with the positioning measurements for the positioning signals and a second location uncertainty that is associated with the positioning measurements for additional positioning signals received from the UE, which are generated based on additional assistance data including at least one of complete data or correct data, or a combination.

The medium 620 and/or memory 604 may include a spoof determination module 626 that when implemented by the one or more processors 602 configures the one or more processors 602 to determine whether the positioning measurements may have been spoofed based on the location uncertainty associated with the positioning measurements, e.g., as discussed in reference to FIG. 3 and FIG. 5. For example, the one or more processors 602 may be configured to compare the location uncertainty associated with positioning measurements received from a UE with an expected location uncertainty for positioning measurements that are not spoofed, e.g., as discussed in reference to FIG. 3 and FIG. 5. The one or more processors 602 may be configured, for example, to determine that positioning measurements are spoofed if the associated location uncertainty is greater than the expected location uncertainty by more than a predetermined threshold and to determine that positioning measurements are not spoofed if the location uncertainty is not greater than the expected location uncertainty by more than the predetermined threshold. The one or more processors 602 may be configured, for example, to determine whether the positioning measurements have been spoofed based on the first location uncertainty and the second location uncertainty. For example, the one or more processors 602 may be configured to compare the first location uncertainty with the second location uncertainty, and determine that the positioning measurements have been spoofed if the first location uncertainty is greater than the second location uncertainty by more than a predetermined threshold, or determine that the positioning measurements are not spoofed if the first location uncertainty is not greater than the second location uncertainty by more than the predetermined threshold.

The medium 620 and/or memory 604 may include an assistance data module 628 that when implemented by the one or more processors 602 configures the one or more processors 602 to provide assistance data to the UE, via the external interface 610, the assistance data including data for positioning signals, one or more transmitters, or both, wherein the assistance data comprises at least one of incomplete data or incorrect data, or a combination thereof, e.g., as discussed in reference to FIG. 3 and FIG. 5. The one or more processors 602, for example, may be configured to include one of incomplete data or incorrect data, or the combination thereof in the assistance data that is configured to produce an inaccuracy in spoofed positioning measurements produced based at least in part on the assistance data. The one or more processors 602, for example, may be configured to include incorrect data that includes a time varying error. The one or more processors 602, for example, may be configured to include incomplete data or incorrect data, or the combination thereof in the assistance data that includes include an indication of positioning signal transmission times that includes a time varying error, or that includes include at least one of space vehicle ephemeris, a base station location, clock data, positioning signal transmission time, or a combination thereof. The one or more processors 602, for example, may be configured to provide, via the external interface 610, additional assistance data to the UE, where the additional assistance data may be data for additional positioning signals, and may include at least one of complete data or correct data, or a combination thereof.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support reliable positioning of a UE in a wireless network in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include an external interface 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
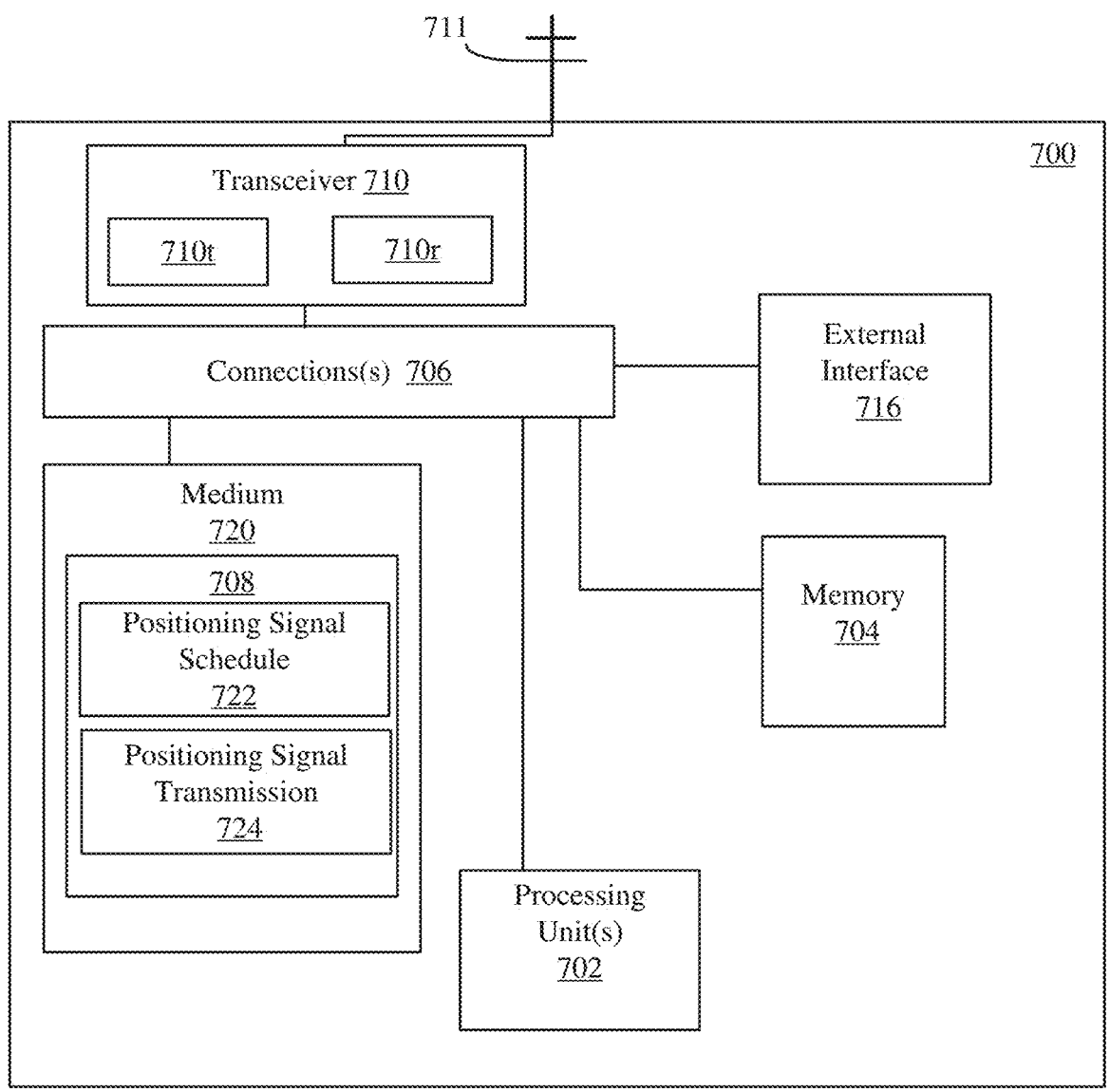
FIG. 7 shows a schematic block diagram illustrating certain exemplary features of a transmitter configured for supporting reliable positioning of a UE in a wireless network.

FIG. 7 shows a schematic block diagram illustrating certain exemplary features of a transmitter 700, which may be a terrestrial base station or a space vehicle, such as a gNB 110 or 210 in FIG. 1 or 2A, an SV 203, 205, or 207 shown in FIG. 2A, 2B, or 2C, an SV 190 shown in FIGS. 1, 2A, 2B, 2C, an SV 360 shown in FIGS. 3 and 4A, a base station 450 shown in FIG. 4B, or an SV 590 or TP 510 shown in FIG. 5. The transmitter 700 is configured for supporting the reliable positioning of a UE in a wireless network, e.g., as discussed herein. The transmitter 700 may be configured to perform the signal flow shown in FIG. 5 and the process flow shown in FIG. 10 and techniques and algorithms disclosed herein. Transmitter 700 may, for example, include one or more processors 702, memory 704, a communications interface, which may include a transceiver 710 (e.g., a wireless network interface and/or a satellite interface) and an external interface 716 (e.g., a wireline or wireless network interface to other base stations and/or a core network), which may be operatively coupled with one or more connections 706 (e.g., buses, lines, fibers, links, etc.) to non-transitory computer readable medium 720 and memory 704. The transmitter 700 may further include additional items, which are not shown, such as a user interface that may include e.g., a display, a keypad or other input device, such as virtual keypad on the display, through which a user may interface. In certain example implementations, all or part of transmitter 700 may take the form of a chipset, and/or the like. Transceiver 710 may, for example, include a transmitter 710$t$ enabled to transmit one or more signals over one or more types of wireless communication networks and a receiver 710$r$ to receive one or more signals transmitted over the one or more types of wireless communication networks. The external interface 716 may be a wired or wireless interface capable of connecting to other base stations in the RAN or network entities, such as AMF and LMF.

In some embodiments, transmitter 700 may include antenna 711, which may be internal or external. Antenna 711 may be used to transmit and/or receive signals processed by transceiver 710. In some embodiments, antenna 711 may be coupled to transceiver 710. In some embodiments, measurements of signals received (transmitted) by transmitter 700 may be performed at the point of connection of the antenna 711 and transceiver 710. For example, the measurement point of reference for received (transmitted) RF signal measurements may be an input (output) terminal of the receiver 710$r$ (transmitter 710$t$) and an output (input) terminal of the antenna 711. In a transmitter 700 with multiple antennas 711 or antenna arrays, the antenna connector may be viewed as a virtual point representing the aggregate output (input) of multiple antennas. In some implementations, multiple antennas, e.g., remote radio heads, may be used that are displaced from base station controller over a range of distances, e.g., from 100 meters to 2 kms.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of transmitter 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in transmitter 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in transmitter 700 is merely exemplary, and as such the functionality of the modules and/or data structures may be combined, separated, and/or be structured in different ways depending upon the implementation of the transmitter 700.

The medium 720 and/or memory 704 may include a positioning signal schedule module 722 that when implemented by the one or more processors 702 configures the one or more processors 702 to receive, e.g., via external interface 716 or transceiver 710 a positioning signal schedule.

The medium 720 and/or memory 704 may include a positioning signal transmission module 724 that when implemented by the one or more processors 702 configures the one or more processors 702 to transmit positioning signals, via the transceiver 710, based on the positioning signal schedule to enable positioning measurements by the UE. The one or more processors 702 are configured, for example, to transmit the positioning signals, via the transceiver 710, with actual transmission times that include a variation in time that differs from transmissions times indicated to the UE. The one or more processors 702 may be configured to transmit positioning signals to the UE using varying antennas 711, where the UE does not receive an indication of the varying antennas.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support supporting the reliable positioning of a UE in a wireless network in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
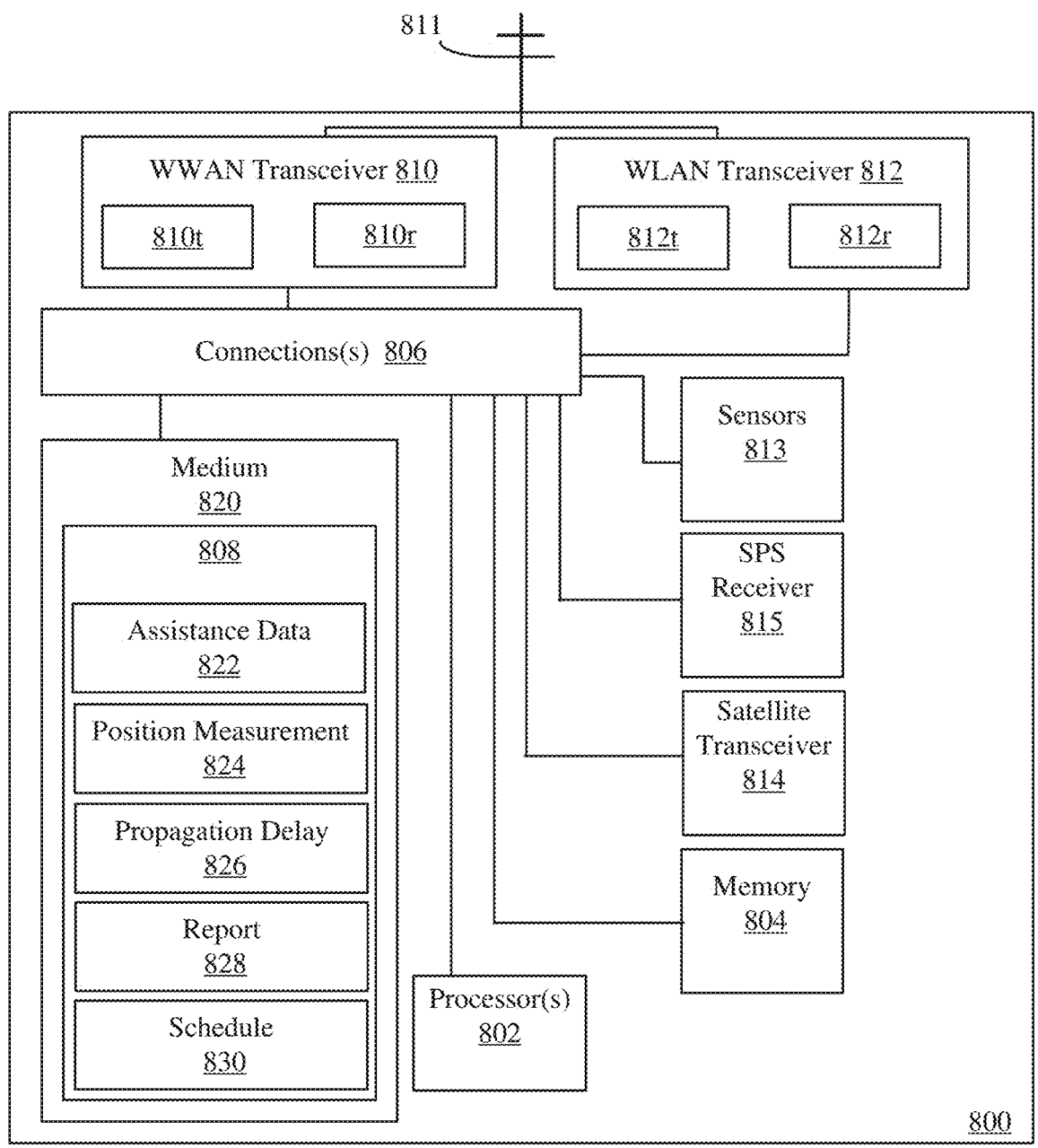
FIG. 8 shows a schematic block diagram illustrating certain exemplary features of a UE configured for supporting reliable positioning of the UE in a wireless network.

FIG. 8 shows a schematic block diagram illustrating certain exemplary features of a UE 800, e.g., which may be UE 102, 202, 302, 402, 472, or 502 shown in FIGS. 1, 2A-2C, 3, 4A-4B, and 5. The UE 800 is configured for supporting the reliable positioning of a UE in a wireless network, e.g., as discussed herein. The UE 800, for example, may perform the signal flow shown in FIG. 5 and the process flow shown in FIG. 11 and algorithms and techniques disclosed herein. The UE 800 may include, e.g., hardware components such as a satellite transceiver 814 to wirelessly communicate with an SV 203/205/207 via a wireless antenna (not shown in FIG. 8), e.g., as shown in FIGS. 2A-2C. The UE 800 may further include, for example, one or more processors 802, memory 804, an external interface such as at least one wireless transceiver (e.g., wireless network interface) illustrated as WWAN transceiver 810 and WLAN transceiver 812, SPS receiver 815, and one or more sensors 813, which may be operatively coupled with one or more connections 806 (e.g., buses, lines, fibers, links, etc.) to non-transitory computer readable medium 820 and memory 804. The SPS receiver 815, for example, may receive and process SPS signals from SVs 190 shown in FIG. 1. The one or more sensors 813, for example, may be an inertial measurement unit (IMU) that may include one or more accelerometers, one or more gyroscopes, a magnetometer, etc. The UE 800 may further include additional items, which are not shown, such as a user interface that may include e.g., a display, a keypad or other input device, such as virtual keypad on the display, through which a user may interface with the UE. In certain example implementations, all or part of UE 800 may take the form of a chipset, and/or the like.

The at least one wireless transceivers may be a transceiver 810 for a WWAN communication system and a transceiver 812 for a WLAN communication system, or may be a combined a transceiver for both WWAN and WLAN. The WWAN transceiver 810 may include a transmitter 810t and receiver 810r coupled to one or more antennas 811 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 812 may include a transmitter 812t and receiver 812r coupled to one or more antennas 811 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 810t and 812t may include multiple transmitters that may be discrete components or combined/integrated components, and/or the receivers 810r and 812r may include multiple receivers that may be discrete components or combined/integrated components. The WWAN transceiver 810 may be configured to communicate signals (e.g., with base stations and/or one or more other devices) according to a variety of radio access technologies (RATs) such as 8G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHz frequencies. The WLAN transceiver 812 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The transceivers 810 and 812 may be communicatively coupled to a transceiver interface, e.g., by optical and/or electrical connection, which may be at least partially integrated with the transceivers 810 and 812.

In some embodiments, UE 800 may include antenna 811, which may be internal or external. UE antenna 811 may be used to transmit and/or receive signals processed by wireless transceivers 810 and 812. In some embodiments, UE antenna 811 may be coupled to wireless transceivers 810 and 812. In some embodiments, measurements of signals received (transmitted) by UE 800 may be performed at the point of connection of the UE antenna 811 and wireless transceivers 810 and 812. For example, the measurement point of reference for received (transmitted) RF signal measurements may be an input (output) terminal of the receiver 810r (transmitter 810t) and an output (input) terminal of the UE antenna 811. In a UE 800 with multiple UE antennas 811 or antenna arrays, the antenna connector may be viewed as a virtual point representing the aggregate output (input) of multiple UE antennas. In some embodiments, UE 800 may measure received signals including signal strength and TOA measurements and the raw measurements may be processed by the one or more processors 802.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of UE 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in UE 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in UE 800 is merely exemplary, and as such the functionality of the modules and/or data structures may be combined, separated, and/or be structured in different ways depending upon the implementation of the UE 800.

The medium 820 and/or memory 804 may include an assistance data module 822 that when implemented by the one or more processors 802 configures the one or more processors 802 to receive assistance data, via transceiver 810, 812, or 814, the assistance data including data for positioning signals, one or more transmitters, or both, wherein the assistance data comprises at least one of incomplete data or incorrect data, or a combination thereof, e.g., as discussed in reference to FIG. 3 and FIG. 5. The one or more processors 802, for example, may be configured to receive, via the transceiver 810, 812, or 814, additional assistance data, where the additional assistance data may be data for additional positioning signals, and may include at least one of complete data or correct data, or a combination thereof.

The medium 820 and/or memory 804 may include a position measurement module 824 that when implemented by the one or more processors 802 configures the one or more processors 802 to obtains positioning measurements for the positioning signals, the one or more transmitters, or both. The positioning measurements, for example, may be any measurements such as TDOA, AOD, Multi-RTT, ECID, GNSS, A-GNSS, etc. The one or more processors 802 may be further configured to additional positioning measurements for the additional positioning signals.

The medium 820 and/or memory 804 may include a report module 826 that when implemented by the one or more processors 802 configures the one or more processors 802 to send, via transceiver 810, 812, or 814, the positioning measurements to a location server.

The medium 820 and/or memory 804 may include a schedule module 828 that when implemented by the one or more processors 802 configures the one or more processors 802 to receive, via transceiver 810, 812, or 814, the positioning signal schedule for one or more terrestrial base stations, one or more space vehicles or a combination thereof.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program code 808. For example, the non-transitory computer readable medium including program code 808 stored thereon may include program code 808 to support reliable positioning of a UE in a wireless network in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a wireless transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable program code 808 stored thereon, which if executed by one or more processors 802 may be operatively enabled to perform all or portions of the example operations as described herein. Computer readable medium 820 may be a part of memory 804.

Figure 9:
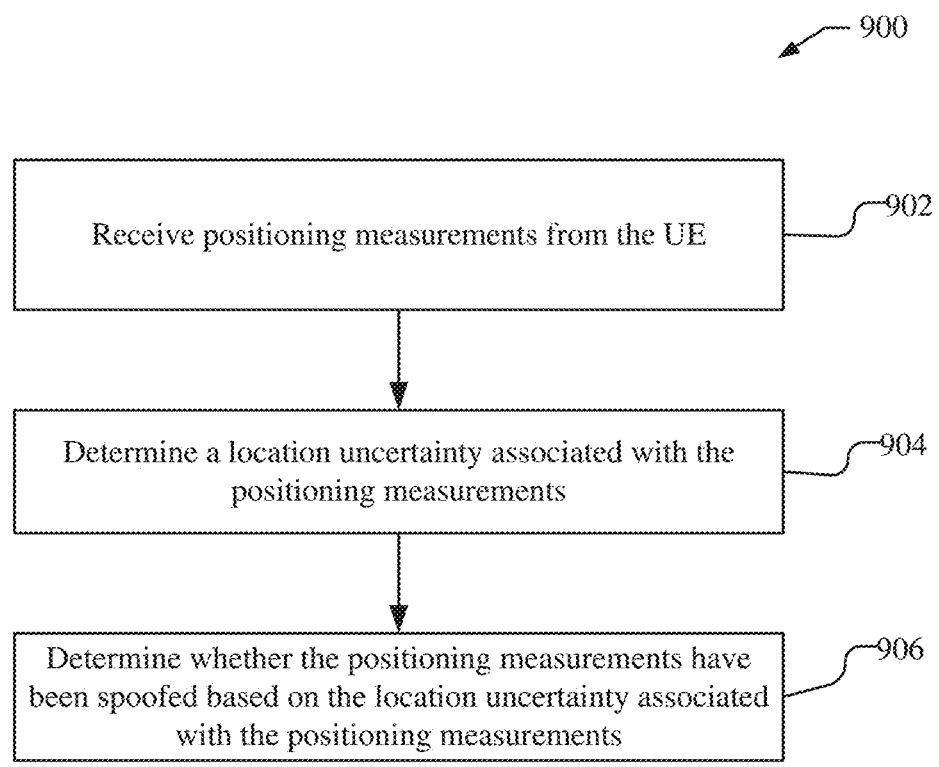
FIG. 9 shows a flowchart for an exemplary method for supporting reliable positioning of a UE in a wireless network performed by a location server.

FIG. 9 shows a flowchart for an exemplary method 900 for supporting reliable positioning of a UE (e.g. a UE 102, 202, 302, 402, 472 or 502) in a wireless network, which may be performed by a location server, such as LMF 152, SLP 162 or SLP 154 shown in FIG. 1, LMF 252 or SLP 262 shown in FIG. 2A, 2B, or 2C, location server 352 shown in FIG. 3, location server 552 shown in FIG. 5 or location server 600 shown in FIG. 6, in a manner consistent with disclosed implementations.

At block 902, the location server receives positioning measurements from the UE, e.g., as illustrated in message 314 in FIG. 3 or stages 3 or 8 in FIG. 5. The positioning measurements may be provided in a provide location information message for example. A means for receiving positioning measurements from the UE may include, e.g., the external interface 610 and one or more processors 602 with dedicated hardware or implementing executable code or software instructions in memory 604 and/or medium 620 in location server 600, such as the position measurement module 622, shown in FIG. 6.

At block 904, the location server may determine a location uncertainty associated with the positioning measurements, e.g., as discussed in reference to FIG. 3 and illustrated in stages 4 or 9 of FIG. 5. A means for determining a location uncertainty associated with the positioning measurements may include, e.g., the one or more processors 602 with dedicated hardware or implementing executable code or software instructions in memory 604 and/or medium 620 in location server 600, such as the position determination module 624, shown in FIG. 6.

At block 906, the location server may determine whether the positioning measurements have been (or may have been) spoofed based on the location uncertainty associated with the positioning measurements, e.g., as discussed in reference to FIG. 3 and illustrated in stages 5 or 10 of FIG. 5. A means for determining whether the positioning measurements may have been spoofed based on the location uncertainty associated with the positioning measurements may include, e.g., the one or more processors 602 with dedicated hardware or implementing executable code or software instructions in memory 604 and/or medium 620 in location server 600, such as the spoof determination module 626, shown in FIG. 6.

In one implementation, the positioning measurements from the UE may include actual positioning measurements or spoofed positioning measurements of positioning signals transmitted from one or more transmitters, e.g., as illustrated by stages 2 and 3 or stages 7 and 8, respectively, in FIG. 5. The one or more transmitters, for example, may comprise one or more terrestrial base stations, one or more space vehicles or a combination thereof, e.g., which may be gNBs 110, 210 in FIGS. 1, 2A, base station 450 in FIG. 4B, TPs 510 in FIG. 5, or SVs 203, 205, or 207 in FIG. 2A, 2B, or 2C, SVs 190 in FIGS. 1, 2A, 2B, 2C, SVs 360 in FIG. 3 or 4A, SVs 590 in FIG. 5, or transmitter 700 shown in FIG. 7. The positioning signals transmitted from the one or more transmitters may be transmitted according to a positioning signal schedule for each transmitter, wherein actual transmission times of the positioning signals includes a variation in time that differs from transmissions times indicated in the positioning signal schedule, wherein the UE receives the positioning signal schedule for each transmitter, and where the UE does not receive an indication of the variation in time for the actual transmission times of the positioning signals, e.g., as discussed in reference to FIGS. 3, 4A, 4B and stages 1, 2, and 6 of FIG. 5. In one implementation, the UE receives the positioning signal schedule for each transmitter from the transmitter, from another of the one or more transmitters, from the location server or from another server, e.g., as discussed in reference to FIG. 3 and stage 1 of FIG. 5. The positioning signals transmitted from the one or more transmitters may be transmitted from varying antennas (e.g. remote antennas such as remote radio heads) for each transmitter, wherein an indication of the varying antennas is not received by the UE, e.g., as discussed in FIG. 4B and stages 1, 2, and 6 of FIG. 5.

In one implementation, the location server may provide assistance data to the UE, the assistance data comprising data for positioning signals, one or more transmitters, or both, wherein the assistance data comprises at least one of incomplete data or incorrect data (e.g. not completely correct data), or a combination thereof, e.g., as discussed in reference to FIG. 3 and stage 1 of FIG. 5. A means for providing assistance data to the UE, the assistance data comprising data for positioning signals, one or more transmitters, or both, wherein the assistance data comprises at least one of incomplete data or incorrect data, or a combination thereof may include, e.g., the external interface 610 and one or more processors 602 with dedicated hardware or implementing executable code or software instructions in memory 604 and/or medium 620 in location server 600, such as the assistance data module 628, shown in FIG. 6.

In some implementations, the at least one of incomplete data or incorrect data, or the combination thereof in the assistance data may be configured to produce an inaccuracy in spoofed positioning measurements produced (e.g. by the UE or by a user of the UE) based at least in part on the assistance data, e.g., as discussed in reference to FIGS. 3, 4A and 4B and stages 1, 5, 7, and 10 of FIG. 5. The assistance data may include incorrect data that includes a time varying error, e.g., as discussed in reference to FIGS. 3, 4A, and 4B, and stage 1 of FIG. 5. In some implementations, the at least one of incomplete data or incorrect data, or the combination thereof in the assistance data may include an indication of positioning signal transmission times that includes a time varying error with respect to actual positioning signal transmission times, e.g., as discussed in reference to FIGS. 3, 4A, and 4B, and stage 1 of FIG. 5. The at least one of incomplete data or incorrect data, or a combination thereof in the assistance data, may comprise an antenna variation for each positioning signal transmission, e.g., as discussed in reference to FIG. 4B. The at least one of incomplete data or incorrect data, or the combination thereof in the assistance data may include at least one of space vehicle ephemeris, a base station location, an antenna location, clock data, positioning signal transmission time, or a combination thereof, e.g., as discussed in reference to FIG. 3 and stage 1 of FIG. 5. In some implementations, the location server may determine the location uncertainty associated with the positioning measurements by determining an estimated location of the UE and the location uncertainty for the estimated location of the UE based on the positioning measurements and correct and complete data for the positioning signals and the one or more transmitters, e.g., as discussed in stages 4 and 9 of FIG. 5. A means for determining an estimated location of the UE and the location uncertainty for the estimated location of the UE based on the positioning measurements and correct complete data for the positioning signals and the one or more transmitters may include, e.g., the one or more processors 602 with dedicated hardware or implementing executable code or software instructions in memory 604 and/or medium 620 in location server 600, such as the position determination module 624, shown in FIG. 6.

In one implementation, the location server may determine whether the positioning measurements have been (or may have been) spoofed based on the location uncertainty associated with the positioning measurements by comparing the location uncertainty associated with the positioning measurements with an expected location uncertainty for positioning measurements that are not spoofed, e.g., as discussed in reference to FIG. 3 and illustrated in stages 5 and 10 of FIG. 5. The location server may determine that the positioning measurements have been spoofed (or may have been spoofed) if the location uncertainty is greater than the expected location uncertainty by more than a predetermined threshold, e.g., as discussed in reference to FIG. 3 and illustrated in stage 10 of FIG. 5. The location server may determine instead that the positioning measurements are not spoofed if the location uncertainty is not greater than the expected location uncertainty by more than the predetermined threshold, e.g., as discussed in reference to FIG. 3 and illustrated in stage 5 of FIG. 5. A means for comparing the location uncertainty associated with the positioning measurements with an expected location uncertainty for positioning measurements that are not spoofed may include, e.g., the one or more processors 602 with dedicated hardware or implementing executable code or software instructions in memory 604 and/or medium 620 in location server 600, such as the spoof determination module 626, shown in FIG. 6. A means for determining that the positioning measurements have been spoofed if the location uncertainty is greater than the expected location uncertainty by more than a predetermined threshold, or determining that the positioning measurements are not spoofed if the location uncertainty is not greater than the expected location uncertainty by more than the predetermined threshold may include, e.g., the one or more processors 602 with dedicated hardware or implementing executable code or software instructions in memory 604 and/or medium 620 in location server 600, such as the spoof determination module 626, shown in FIG. 6.

In one implementation, and as described above for the variant of the procedure in FIG. 5, the location server may provide additional assistance data to the UE, where the additional assistance data comprises data for additional positioning signals, where the additional assistance data comprises at least one of complete data or correct data, or a combination thereof. The location server may then determine whether the positioning measurements have been spoofed based on the location uncertainty associated with the positioning measurements by: receiving positioning measurements from the UE for the positioning signals and the additional positioning signals; determining a first location uncertainty associated with the positioning measurements for the positioning signals and a second location uncertainty associated with the positioning measurements for the additional positioning signals; and determining whether the positioning measurements have been spoofed based on the first location uncertainty and the second location uncertainty. A means for providing additional assistance data to the UE, where the additional assistance data comprises data for additional positioning signals, where the additional assistance data comprises at least one of complete data or correct data, or a combination thereof may include, e.g., the external interface 610 and one or more processors 602 with dedicated hardware or implementing executable code or software instructions in memory 604 and/or medium 620 in location server 600, such as the assistance data module 628, shown in FIG. 6. A means for receiving positioning measurements from the UE for the positioning signals and the additional positioning signals may include, e.g., the external interface 610 and one or more processors 602 with dedicated hardware or implementing executable code or software instructions in memory 604 and/or medium 620 in location server 600, such as the position measurement module 622, shown in FIG. 6. A means for determining a first location uncertainty associated with the positioning measurements for the positioning signals and a second location uncertainty associated with the positioning measurements for the additional positioning signals may include, e.g., the one or more processors 602 with dedicated hardware or implementing executable code or software instructions in memory 604 and/or medium 620 in location server 600, such as the position determination module 624, shown in FIG. 6. A means for determining whether the positioning measurements have been spoofed based on the first location uncertainty and the second location uncertainty may include, e.g., the one or more processors 602 with dedicated hardware or implementing executable code or software instructions in memory 604 and/or medium 620 in location server 600, such as the spoof determination module 626, shown in FIG.

In some implementations, as described above for the variant of the procedure in FIG. 5, determining whether the positioning measurements have been spoofed based on the first location uncertainty and the second location uncertainty may comprise: comparing the first location uncertainty with the second location uncertainty; and determining that the positioning measurements have been spoofed if the first location uncertainty is greater than the second location uncertainty by more than a predetermined threshold, or determining that the positioning measurements are not spoofed if the first location uncertainty is not greater than the second location uncertainty by more than the predetermined threshold. A means for comparing the first location uncertainty with the second location uncertainty may include, e.g., the one or more processors 602 with dedicated hardware or implementing executable code or software instructions in memory 604 and/or medium 620 in location server 600, such as the spoof determination module 626, shown in FIG. 6. A means for determining that the positioning measurements have been spoofed if the first location uncertainty is greater than the second location uncertainty by more than a predetermined threshold, or determining that the positioning measurements are not spoofed if the first location uncertainty is not greater than the second location uncertainty by more than the predetermined threshold may include, e.g., the one or more processors 602 with dedicated hardware or implementing executable code or software instructions in memory 604 and/or medium 620 in location server 600, such as the spoof determination module 626, shown in FIG. 6.

Figure 10:
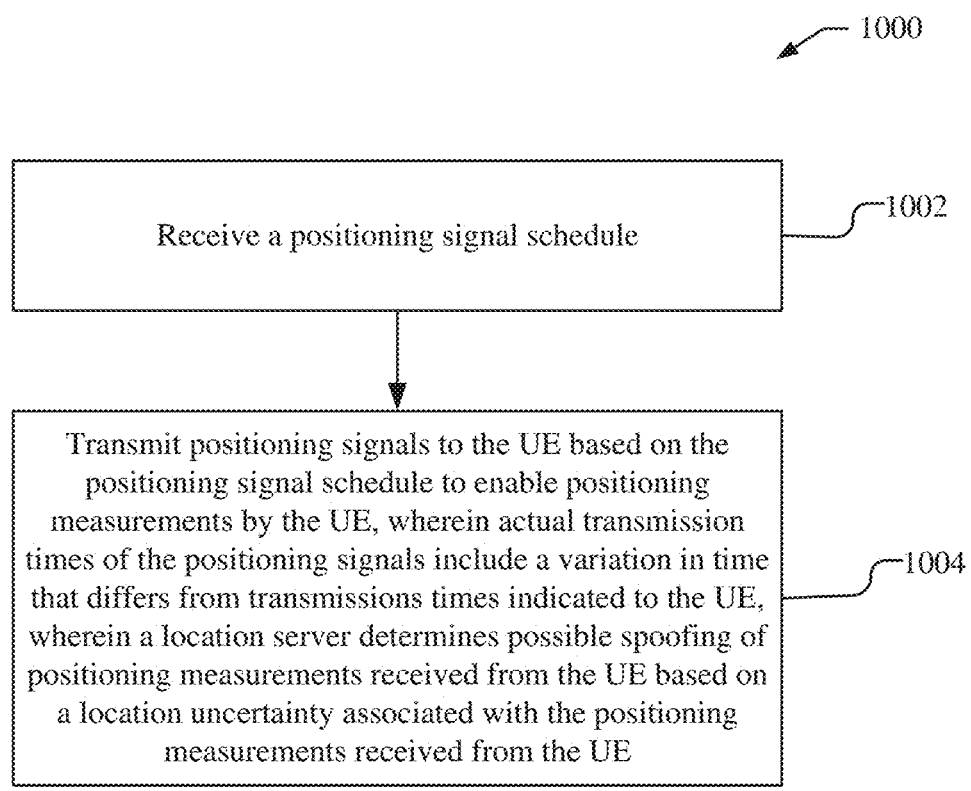
FIG. 10 shows a flowchart for an exemplary method for supporting reliable positioning of a UE in a wireless network performed by a transmitting entity.

FIG. 10 shows a flowchart for an exemplary method 1000 for supporting reliable positioning of a UE (e.g. a UE 102, 202, 302, 402, 472 or 502) in a wireless network, which may be performed by a transmitting entity in a manner consistent with disclosed implementations. In some implementations, the transmitting entity may be a terrestrial base station or a space vehicle, such as a gNB 110, 210 in FIGS. 1, 2A, the base station 450 in FIG. 4B, a TP 510 in FIG. 5, an SV 203, 205, or 207 in FIG. 2A, 2B, or 2C, an SV 190 in FIGS. 1, 2A, 2B, 2C, an SV 360 in FIG. 3 or 4A, an SV 590 in FIG. 5, or the transmitter 700 shown in FIG. 7.

At block 1002, the transmitting entity receives a positioning signal schedule, e.g., as discussed in reference to FIG. 3 and stage 1 of FIG. 5. A means for receiving a positioning signal schedule may include, e.g., the external interface 716 or transceiver 710 and one or more processors 702 with dedicated hardware or implementing executable code or software instructions in memory 704 and/or medium 720 in transmitter 700, such as the positioning signal schedule module 722, shown in FIG. 7.

At block 1004, the transmitting entity transmits positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server (e.g. an LMF 152 or 252 or the location server 552) to determine possible spoofing of positioning measurements received from the UE based on a location uncertainty associated with the positioning measurements received from the UE, e.g., as discussed in reference to FIG. 3 and stages 1, 5, 6, and 10 of FIG. 5. A means for transmitting positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE may include, e.g., the transceiver 710 and one or more processors 702 with dedicated hardware or implementing executable code or software instructions in memory 704 and/or medium 720 in transmitter 700, such as the positioning signal transmission module 724, shown in FIG. 7.

In some implementations, the transmitting entity transmits positioning signals to the UE using varying antennas (e.g. remote antennas such as remote radio heads) for the transmitting entity, wherein an indication of the varying antennas is not received by the UE, e.g., as discussed in reference to FIG. 4B and stages, 1, 2, and 6 of FIG. 5. A means for transmitting positioning signals to the UE using varying antennas for the transmitting entity, wherein an indication of the varying antennas is not received by the UE may include, e.g., the transceiver 710 and one or more processors 702 with dedicated hardware or implementing executable code or software instructions in memory 704 and/or medium 720 in transmitter 700, such as the positioning signal transmission module 724, shown in FIG. 7.

In some implementations, the location server determines spoofing, or possible spoofing, of positioning measurements received from the UE based on the location uncertainty associated with the positioning measurements received from the UE exceeding, by more than a predetermined threshold, an expected location uncertainty for positioning measurements that are not spoofed. In these implementations, the location server may also determine the positioning measurements received from the UE are not spoofed based on the location uncertainty associated with the positioning measurements received from the UE not exceeding, by more than the predetermined threshold, the expected location uncertainty for positioning measurements that are not spoofed, e.g., as discussed in reference to FIG. 3 and illustrated in stages 5 and 10 of FIG. 5.

Figure 11:
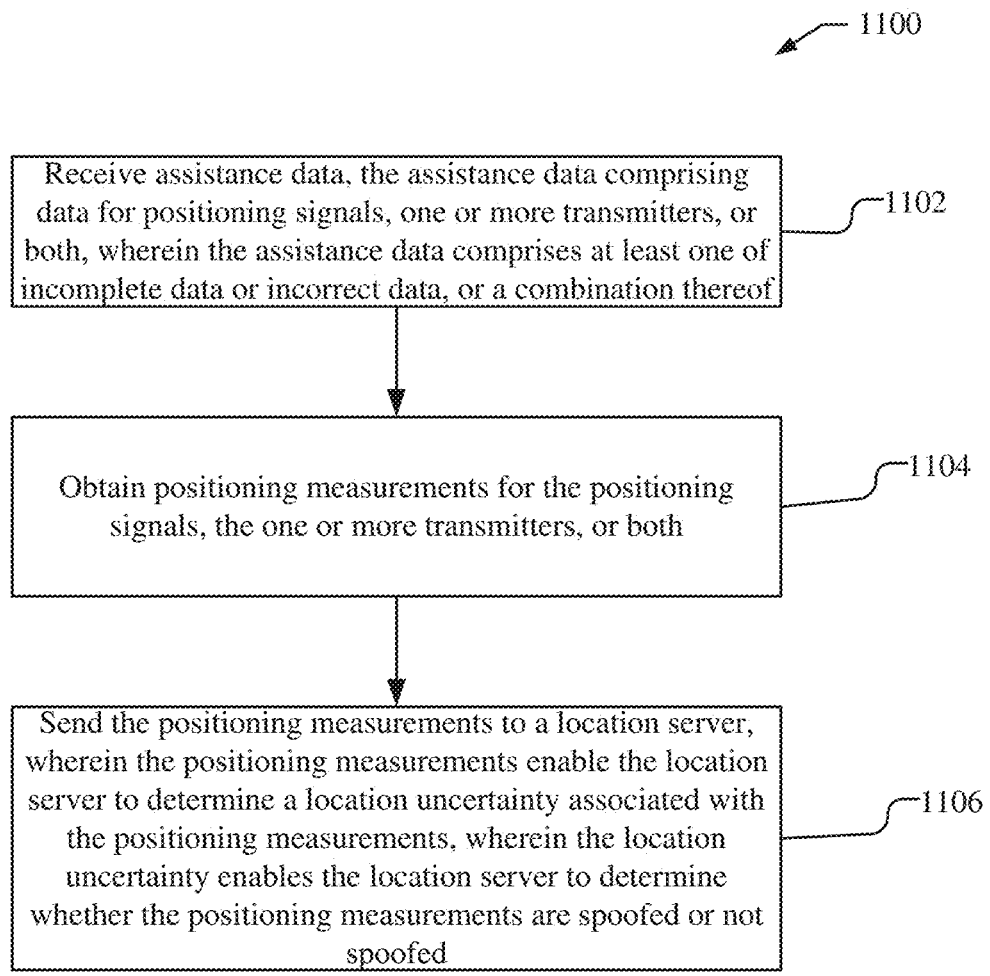
FIG. 11 shows a flowchart for an exemplary method for supporting reliable positioning of a UE in a wireless network performed by a UE.

FIG. 11 shows a flowchart for an exemplary method 1100 for supporting reliable positioning of a UE (e.g. a UE 102, 202, 302, 402, 472, 502, 800) in a wireless network, which may be performed by the UE, in a manner consistent with disclosed implementations.

At block 1102, the UE receive assistance data, the assistance data comprising data for positioning signals, one or more transmitters, or both, wherein the assistance data comprises at least one of incomplete data or incorrect data, or a combination thereof, e.g., as discussed in reference to FIG. 3 and stage 1 of FIG. 5. A means for receiving assistance data, the assistance data comprising data for positioning signals, one or more transmitters, or both, wherein the assistance data comprises at least one of incomplete data or incorrect data may include, e.g., the wireless transceiver 810 or 812 or 814 and one or more processors 802 with dedicated hardware or implementing executable code or software instructions in memory 804 and/or medium 820 in UE 800, such as the assistance data module 822, shown in FIG. 8.

At block 1104, the UE obtains positioning measurements for the positioning signals, the one or more transmitters, or both, e.g., as discussed in reference to FIG. 3 and stage 2 of FIG. 5. A means for obtaining positioning measurements for the positioning signals, the one or more transmitters, or both may include, e.g., the wireless transceiver 810 or 812 or SPS receiver 815 and one or more processors 802 with dedicated hardware or implementing executable code or software instructions in memory 804 and/or medium 820 in UE 800, such as the position measurement module 824, shown in FIG. 8.

At block 1106, the UE sends the positioning measurements to a location server (e.g. an LMF 152, SLP 162, SLP 164, LMF 252, SLP 262, location server 352, location server 552, location server 600), wherein the positioning measurements enable the location server to determine a location uncertainty associated with the positioning measurements, wherein the location uncertainty enables the location server to determine whether the positioning measurements are spoofed or not spoofed, e.g., as illustrated in message 314 in FIG. 3 or stages 3, 4, and 5 in FIG. 5. The positioning measurements may be provided in a provide location information message for example. A means for sending the positioning measurements to a location server, wherein the positioning measurements enable the location server to determine a location uncertainty associated with the positioning measurements, wherein the location uncertainty enables the location server to determine whether the positioning measurements are spoofed or not spoofed may include, e.g., the wireless transceiver 810 or 812 or 814 and one or more processors 802 with dedicated hardware or implementing executable code or software instructions in memory 804 and/or medium 820 in UE 800, such as the report module 826, shown in FIG. 8.

In one implementation, the one or more transmitters, for example, may comprise one or more terrestrial base stations, one or more space vehicles or a combination thereof, e.g., which may be gNBs 110, 210 in FIGS. 1, 2A, base station 450 in FIG. 4B, TPs 510 in FIG. 5, or SVs 203, 205, or 207 in FIG. 2A, 2B, or 2C, SVs 190 in FIGS. 1, 2A, 2B, 2C, SVs 360 in FIG. 3 or 4A, SVs 590 in FIG. 5, or transmitter 700 shown in FIG. 7. The positioning signals transmitted from the one or more transmitters may be transmitted according to a positioning signal schedule for each transmitter, wherein actual transmission times of the positioning signals includes a variation in time that differs from transmissions times indicated in the positioning signal schedule. The UE may further receive the positioning signal schedule for each transmitter, but where the UE does not receive an indication of the variation in time for the actual transmission times of the positioning signals, e.g., as discussed in reference to FIGS. 3, 4A, 4B and stages 1, 2, and 6 of FIG. 5. A means for receiving the positioning signal schedule for each transmitter, and where the UE does not receive an indication of the variation in time for the actual transmission times of the positioning signals may include, e.g., the wireless transceiver 810 or 812 or 814 and one or more processors 802 with dedicated hardware or implementing executable code or software instructions in memory 804 and/or medium 820 in UE 800, such as the schedule module 828, shown in FIG. 8. In one implementation, the UE receives the positioning signal schedule for each transmitter from the transmitter, from another of the one or more transmitters, from the location server or from another server, e.g., as discussed in reference to FIG. 3 and stage 1 of FIG. 5.

The positioning signals transmitted from the one or more transmitters may be transmitted from varying antennas (e.g. remote antennas such as remote radio heads) for each transmitter, wherein the UE does not receive an indication of the varying antennas, e.g., as discussed in FIG. 4B and stages 1, 2, and 6 of FIG. 5.

In some implementations, the at least one of incomplete data or incorrect data, or the combination thereof in the assistance data may be configured to produce an inaccuracy in spoofed positioning measurements produced (e.g. by the UE or by a user of the UE) based at least in part on the assistance data, e.g., as discussed in reference to FIGS. 3, 4A and 4B and stages 1, 5, 7, and 10 of FIG. 5. The assistance data may include incorrect data that includes a time varying error, e.g., as discussed in reference to FIGS. 3, 4A, and 4B, and stage 1 of FIG. 5. In some implementations, the at least one of incomplete data or incorrect data, or the combination thereof in the assistance data may include an indication of positioning signal transmission times that includes a time varying error with respect to actual positioning signal transmission times, e.g., as discussed in reference to FIGS. 3, 4A, and 4B, and stage 1 of FIG. 5. The at least one of incomplete data or incorrect data, or a combination thereof in the assistance data, may comprise an antenna variation for each positioning signal transmission, e.g., as discussed in reference to FIG. 4B. The at least one of incomplete data or incorrect data, or the combination thereof in the assistance data may comprise at least one of space vehicle ephemeris, a base station location, an antenna location, clock data, positioning signal transmission time, or a combination thereof, e.g., as discussed in reference to FIG. 3 and stage 1 of FIG. 5.

In one implementation, and as described above for the variant of the procedure in FIG. 5, the UE may receive additional assistance data, where the additional assistance data comprises data for additional positioning signals, where the additional assistance data comprises at least one of complete data or correct data, or a combination thereof. The UE may obtain additional positioning measurements for the additional positioning signals. The UE may send the additional positioning measurements to the location server, wherein the additional positioning measurements enable the location server to determine a second location uncertainty associated with the additional positioning measurements, wherein the second location uncertainty in addition to the location uncertainty associated with the positioning measurements enables the location server to determine whether the positioning measurements are spoofed or not spoofed. A means for receiving additional assistance data, the additional assistance data comprising data for additional positioning signals, wherein the additional assistance data comprises at least one of complete data or correct data, or a combination thereof may include, e.g., the wireless transceiver 810 or 812 or SPS receiver 815 and one or more processors 802 with dedicated hardware or implementing executable code or software instructions in memory 804 and/or medium 820 in UE 800, such as the position measurement module 824, shown in FIG. 8. A means for obtaining additional positioning measurements for the additional positioning signals may include, e.g., the wireless transceiver 810 or 812 or SPS receiver 815 and one or more processors 802 with dedicated hardware or implementing executable code or software instructions in memory 804 and/or medium 820 in UE 800, such as the position measurement module 824, shown in FIG. 8. A means for sending the additional positioning measurements to the location server, wherein the additional positioning measurements enable the location server to determine a second location uncertainty associated with the additional positioning measurements, wherein the second location uncertainty in addition to the location uncertainty associated with the positioning measurements enables the location server to determine whether the positioning measurements are spoofed or not spoofed may include, e.g., the wireless transceiver 810 or 812 or 814 and one or more processors 802 with dedicated hardware or implementing executable code or software instructions in memory 804 and/or medium 820 in UE 800, such as the report module 826, shown in FIG. 8.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description, embodiments may include different combinations of features. Implementation examples are described in the following numbered clauses:

Clause 1. A method performed by a location server for supporting reliable positioning of a User Equipment (UE) in a wireless network, comprising: receiving positioning measurements from the UE; determining a location uncertainty associated with the positioning measurements; and determining whether the positioning measurements have been spoofed based on the location uncertainty associated with the positioning measurements.

Clause 2. The method of clause 1, wherein the positioning measurements from the UE comprise actual positioning measurements or spoofed positioning measurements of positioning signals transmitted from one or more transmitters.

Clause 3. The method of clause 2, wherein the one or more transmitters comprise one or more terrestrial base stations, one or more space vehicles or a combination thereof.

Clause 4. The method any of clauses 2-3, wherein the positioning signals transmitted from the one or more transmitters are transmitted according to a positioning signal schedule for each transmitter, wherein actual transmission times of the positioning signals includes a variation in time that differs from transmissions times indicated in the positioning signal schedule, wherein the positioning signal schedule for each transmitter is provided to the UE, wherein an indication of the variation in time for the actual transmission times of the positioning signals is not provided to the UE.

Clause 5. The method of clause 4, wherein the positioning signal schedule for each transmitter is received by the UE from the transmitter, from another of the one or more transmitters, from the location server or from another server.

Clause 6. The method any of clauses 2-5, wherein the positioning signals transmitted from the one or more transmitters are transmitted from varying antennas for each transmitter, wherein an indication of the varying antennas is not received by the UE.

Clause 7. The method any of clauses 1-6, further comprising providing assistance data to the UE, the assistance data comprising data for positioning signals, one or more transmitters, or both, wherein the assistance data comprises at least one of incomplete data or incorrect data, or a combination thereof.

Clause 8. The method of clause 7, wherein the at least one of incomplete data or incorrect data, or the combination thereof in the assistance data is configured to produce an inaccuracy in spoofed positioning measurements produced based at least in part on the assistance data.

Clause 9. The method any of clauses 7-8, wherein the assistance data comprises incorrect data that includes a time varying error.

Clause 10. The method any of clauses 7-9, wherein the at least one of incomplete data or incorrect data, or the combination thereof in the assistance data comprises an indication of positioning signal transmission times that includes a time varying error with respect to actual positioning signal transmission times.

Clause 11. The method any of clauses 7-10, wherein the at least one of incomplete data or incorrect data, or a combination thereof in the assistance data comprises an antenna variation for each positioning signal transmission.

Clause 12. The method any of clauses 7-11, wherein the at least one of incomplete data or incorrect data, or the combination thereof in the assistance data comprises at least one of space vehicle ephemeris, a base station location, an antenna location, clock data, positioning signal transmission time, or a combination thereof.

Clause 13. The method any of clauses 7-12, wherein determining the location uncertainty associated with the positioning measurements comprises determining an estimated location of the UE and the location uncertainty for the estimated location of the UE based on the positioning measurements and correct and complete data for the positioning signals and the one or more transmitters.

Clause 14. The method any of clauses 1-13, wherein determining whether the positioning measurements have been spoofed based on the location uncertainty associated with the positioning measurements comprises: comparing the location uncertainty associated with the positioning measurements with an expected location uncertainty for positioning measurements that are not spoofed; and determining that the positioning measurements have been spoofed if the location uncertainty is greater than the expected location uncertainty by more than a predetermined threshold, or determining that the positioning measurements are not spoofed if the location uncertainty is not greater than the expected location uncertainty by more than the predetermined threshold.

Clause 15. The method any of clauses 7-14, further comprising: providing additional assistance data to the UE, the additional assistance data comprising data for additional positioning signals, wherein the additional assistance data comprises at least one of complete data or correct data, or a combination thereof, wherein determining whether the positioning measurements have been spoofed based on the location uncertainty associated with the positioning measurements comprises: receiving positioning measurements from the UE for the positioning signals and the additional positioning signals; determining a first location uncertainty associated with the positioning measurements for the positioning signals and a second location uncertainty associated with the positioning measurements for the additional positioning signals; and determining whether the positioning measurements have been spoofed based on the first location uncertainty and the second location uncertainty.

Clause 16. The method of clause 15, wherein determining whether the positioning measurements have been spoofed based on the first location uncertainty and the second location uncertainty comprises: comparing the first location uncertainty with the second location uncertainty; and determining that the positioning measurements have been spoofed if the first location uncertainty is greater than the second location uncertainty by more than a predetermined threshold, or determining that the positioning measurements are not spoofed if the first location uncertainty is not greater than the second location uncertainty by more than the predetermined threshold.

Clause 17. A location server configured for supporting reliable positioning of a User Equipment (UE) in a wireless network, comprising: an external interface configured to wirelessly communicate with entities in the wireless network; at least one memory; at least one processor coupled to the external interface and the at least one memory, wherein the at least one processor is configured to: receive, via the external interface, positioning measurements from the UE; determine a location uncertainty associated with the positioning measurements; and determine whether the positioning measurements have been spoofed based on the location uncertainty associated with the positioning measurements.

Clause 18. The location server of clause 17, wherein the positioning measurements from the UE comprise actual positioning measurements or spoofed positioning measurements of positioning signals transmitted from one or more transmitters.

Clause 19. The location server of clause 18, wherein the one or more transmitters comprise one or more terrestrial base stations, one or more space vehicles or a combination thereof.

Clause 20. The location server any of clauses 18-19, wherein the positioning signals transmitted from the one or more transmitters are transmitted according to a positioning signal schedule for each transmitter, wherein actual transmission times of the positioning signals includes a variation in time that differs from transmissions times indicated in the positioning signal schedule, wherein the positioning signal schedule for each transmitter is provided to the UE, wherein an indication of the variation in time for the actual transmission times of the positioning signals is not provided to the UE.

Clause 21. The location server of clause 20, wherein the positioning signal schedule for each transmitter is received by the UE from the transmitter, from another of the one or more transmitters, from the location server or from another server.

Clause 22. The location server any of clauses 18-21, wherein the positioning signals transmitted from the one or more transmitters are transmitted from varying antennas for each transmitter, wherein an indication of the varying antennas is not received by the UE.

Clause 23. The location server any of clauses 17-22, wherein the at least one processor is further configured to provide assistance data, via the external interface, to the UE, the assistance data comprising data for positioning signals, one or more transmitters, or both, wherein the assistance data comprises at least one of incomplete data or incorrect data, or a combination thereof.

Clause 24. The location server of clause 23, wherein the at least one of incomplete data or incorrect data, or the combination thereof in the assistance data is configured to produce an inaccuracy in spoofed positioning measurements produced based at least in part on the assistance data.

Clause 25. The location server any of clauses 23-24, wherein the assistance data comprises incorrect data that includes a time varying error.

Clause 26. The location server any of clauses 23-25, wherein the at least one of incomplete data or incorrect data, or the combination thereof in the assistance data comprises an indication of positioning signal transmission times that includes a time varying error with respect to actual positioning signal transmission times.

Clause 27. The location server any of clauses 23-26, wherein the at least one of incomplete data or incorrect data, or a combination thereof in the assistance data comprises an antenna variation for each positioning signal transmission.

Clause 28. The location server any of clauses 23-27, wherein the at least one of incomplete data or incorrect data, or the combination thereof in the assistance data comprises at least one of space vehicle ephemeris, a base station location, clock data, positioning signal transmission time, or a combination thereof.

Clause 29. The location server any of clauses 23-28, wherein the at least one processor is configured to determine the location uncertainty associated with the positioning measurements by being configured to determine an estimated location of the UE and the location uncertainty for the estimated location of the UE based on the positioning measurements and correct complete data for the positioning signals and the one or more transmitters.

Clause 30. The location server any of clauses 17-29, wherein the at least one processor is configured to determine whether the positioning measurements may have been spoofed based on the location uncertainty associated with the positioning measurements by being configured to: compare the location uncertainty associated with the positioning measurements with an expected location uncertainty for positioning measurements that are not spoofed; and determine that the positioning measurements have been spoofed if the location uncertainty is greater than the expected location uncertainty by more than a predetermined threshold, or determine that the positioning measurements are not spoofed if the location uncertainty is not greater than the expected location uncertainty by more than the predetermined threshold.

Clause 31. The location server any of clauses 23-30, wherein the at least one processor further is further configured to: provide additional assistance data to the UE, the additional assistance data comprising data for additional positioning signals, wherein the additional assistance data comprises at least one of complete data or correct data, or a combination thereof, wherein determining whether the positioning measurements have been spoofed based on the location uncertainty associated with the positioning measurements comprises: receive positioning measurements from the UE for the positioning signals and the additional positioning signals; determine a first location uncertainty associated with the positioning measurements for the positioning signals and a second location uncertainty associated with the positioning measurements for the additional positioning signals; and determine whether the positioning measurements have been spoofed based on the first location uncertainty and the second location uncertainty.

Clause 32. The location server of clause 31, wherein the at least one processor further is configured to determine whether the positioning measurements have been spoofed based on the first location uncertainty and the second location uncertainty by being configured to: compare the first location uncertainty with the second location uncertainty; and determine that the positioning measurements have been spoofed if the first location uncertainty is greater than the second location uncertainty by more than a predetermined threshold, or determining that the positioning measurements are not spoofed if the first location uncertainty is not greater than the second location uncertainty by more than the predetermined threshold.

Clause 33. A location server configured for supporting reliable positioning of a User Equipment (UE) in a wireless network, comprising: means for receiving positioning measurements from the UE; means for determining a location uncertainty associated with the positioning measurements; and means for determining whether the positioning measurements have been spoofed based on the location uncertainty associated with the positioning measurements.

Clause 34. The location server of clause 33, wherein the positioning measurements from the UE comprise actual positioning measurements or spoofed positioning measurements of positioning signals transmitted from one or more transmitters.

Clause 35. The location server of clause 34, wherein the one or more transmitters comprise one or more terrestrial base stations, one or more space vehicles or a combination thereof.

Clause 36. The location server any of clauses 34-35, wherein the positioning signals transmitted from the one or more transmitters are transmitted according to a positioning signal schedule for each transmitter, wherein actual transmission times of the positioning signals includes a variation in time that differs from transmissions times indicated in the positioning signal schedule, wherein the positioning signal schedule for each transmitter is provided to the UE, wherein an indication of the variation in time for the actual transmission times of the positioning signals is not provided to the UE.

Clause 37. The location server of clause 36, wherein the positioning signal schedule for each transmitter is received by the UE from the transmitter, from another of the one or more transmitters, from the location server or from another server.

Clause 38. The location server any of clauses 34-37, wherein the positioning signals transmitted from the one or more transmitters are transmitted from varying antennas for each transmitter, wherein an indication of the varying antennas is not received by the UE.

Clause 39. The location server any of clauses 33-38, further comprising means for providing assistance data to the UE, the assistance data comprising data for positioning signals, one or more transmitters, or both, wherein the assistance data comprises at least one of incomplete data or incorrect data, or a combination thereof.

Clause 40. The location server of clause 39, wherein the at least one of incomplete data or incorrect data, or the combination thereof in the assistance data is configured to produce an inaccuracy in spoofed positioning measurements produced based at least in part on the assistance data.

Clause 41. The location server any of clauses 39-40, wherein the assistance data comprises incorrect data that includes a time varying error.

Clause 42. The location server any of clauses 39-41, wherein the at least one of incomplete data or incorrect data, or the combination thereof in the assistance data comprises an indication of positioning signal transmission times that includes a time varying error with respect to actual positioning signal transmission times.

Clause 43. The location server any of clauses 39-42, wherein the at least one of incomplete data or incorrect data, or a combination thereof in the assistance data comprises an antenna variation for each positioning signal transmission.

Clause 44. The location server any of clauses 39-43, wherein the at least one of incomplete data or incorrect data, or the combination thereof in the assistance data comprises at least one of space vehicle ephemeris, a base station location, clock data, positioning signal transmission time, or a combination thereof.

Clause 45. The location server any of clauses 39-44, wherein the means for determining the location uncertainty associated with the positioning measurements comprises means for determining an estimated location of the UE and the location uncertainty for the estimated location of the UE based on the positioning measurements and correct complete data for the positioning signals and the one or more transmitters.

Clause 46. The location server any of clauses 33-45, wherein the means for determining whether the positioning measurements may have been spoofed based on the location uncertainty associated with the positioning measurements comprises: means for comparing the location uncertainty associated with the positioning measurements with an expected location uncertainty for positioning measurements that are not spoofed; and means for determining that the positioning measurements have been spoofed if the location uncertainty is greater than the expected location uncertainty by more than a predetermined threshold, or determining that the positioning measurements are not spoofed if the location uncertainty is not greater than the expected location uncertainty by more than the predetermined threshold.

Clause 47. The location server any of clauses 39-46, further comprising: means for providing additional assistance data to the UE, the additional assistance data comprising data for additional positioning signals, wherein the additional assistance data comprises at least one of complete data or correct data, or a combination thereof, wherein determining whether the positioning measurements have been spoofed based on the location uncertainty associated with the positioning measurements comprises: means for receiving positioning measurements from the UE for the positioning signals and the additional positioning signals; means for determining a first location uncertainty associated with the positioning measurements for the positioning signals and a second location uncertainty associated with the positioning measurements for the additional positioning signals; and means for determining whether the positioning measurements have been spoofed based on the first location uncertainty and the second location uncertainty.

Clause 48. The location server of clause 47, wherein the means for determining whether the positioning measurements have been spoofed based on the first location uncertainty and the second location uncertainty comprises: means for comparing the first location uncertainty with the second location uncertainty; and means for determining that the positioning measurements have been spoofed if the first location uncertainty is greater than the second location uncertainty by more than a predetermined threshold, or determining that the positioning measurements are not spoofed if the first location uncertainty is not greater than the second location uncertainty by more than the predetermined threshold.

Clause 49. A non-transitory computer readable storage medium including program code stored thereon, the program code is operable to configure at least one processor in a location server for supporting reliable positioning of a User Equipment (UE) in a wireless network, the program code comprising instructions to: receive positioning measurements from the UE; determine a location uncertainty associated with the positioning measurements; and determine whether the positioning measurements have been spoofed based on the location uncertainty associated with the positioning measurements.

Clause 50. The non-transitory computer readable storage medium of clause 49, wherein the positioning measurements from the UE comprise actual positioning measurements or spoofed positioning measurements of positioning signals transmitted from one or more transmitters.

Clause 51. The non-transitory computer readable storage medium of clause 50, wherein the one or more transmitters comprise one or more terrestrial base stations, one or more space vehicles or a combination thereof.

Clause 52. The non-transitory computer readable storage medium any of clauses 50-51, wherein the positioning signals transmitted from the one or more transmitters are transmitted according to a positioning signal schedule for each transmitter, wherein actual transmission times of the positioning signals includes a variation in time that differs from transmissions times indicated in the positioning signal schedule, wherein the positioning signal schedule for each transmitter is provided to the UE, wherein an indication of the variation in time for the actual transmission times of the positioning signals is not provided to the UE.

Clause 53. The non-transitory computer readable storage medium of clause 52, wherein the positioning signal schedule for each transmitter is received by the UE from the transmitter, from another of the one or more transmitters, from the location server or from another server.

Clause 54. The non-transitory computer readable storage medium any of clauses 50-53, wherein the positioning signals transmitted from the one or more transmitters are transmitted from varying antennas for each transmitter, wherein an indication of the varying antennas is not received by the UE.

Clause 55. The non-transitory computer readable storage medium any of clauses 49-54, wherein the program code further comprises instructions to provide assistance data to the UE, the assistance data comprising data for positioning signals, one or more transmitters, or both, wherein the assistance data comprises at least one of incomplete data or incorrect data, or a combination thereof.

Clause 56. The non-transitory computer readable storage medium of clause 55, wherein the at least one of incomplete data or incorrect data, or the combination thereof in the assistance data is configured to produce an inaccuracy in spoofed positioning measurements produced based at least in part on the assistance data.

Clause 57. The non-transitory computer readable storage medium any of clauses 55-56, wherein the assistance data comprises incorrect data that includes a time varying error.

Clause 58. The non-transitory computer readable storage medium any of clauses 55-67, wherein the at least one of incomplete data or incorrect data, or the combination thereof in the assistance data comprises an indication of positioning signal transmission times that includes a time varying error with respect to actual positioning signal transmission times.

Clause 59. The non-transitory computer readable storage medium any of clauses 55-58, wherein the at least one of incomplete data or incorrect data, or a combination thereof in the assistance data comprises an antenna variation for each positioning signal transmission.

Clause 60. The non-transitory computer readable storage medium any of clauses 55-59, wherein the at least one of incomplete data or incorrect data, or the combination thereof in the assistance data comprises at least one of space vehicle ephemeris, a base station location, clock data, positioning signal transmission time, or a combination thereof.

Clause 61. The non-transitory computer readable storage medium any of clauses 55-60, wherein the instructions to determine the location uncertainty associated with the positioning measurements comprises instructions to determine an estimated location of the UE and the location uncertainty for the estimated location of the UE based on the positioning measurements and correct complete data for the positioning signals and the one or more transmitters.

Clause 62. The non-transitory computer readable storage medium any of clauses 49-61, wherein the instructions to determine whether the positioning measurements may have been spoofed based on the location uncertainty associated with the positioning measurements comprises instructions to: compare the location uncertainty associated with the positioning measurements with an expected location uncertainty for positioning measurements that are not spoofed; and determine that the positioning measurements have been spoofed if the location uncertainty is greater than the expected location uncertainty by more than a predetermined threshold, or determine that the positioning measurements are not spoofed if the location uncertainty is not greater than the expected location uncertainty by more than the predetermined threshold.

Clause 63. The non-transitory computer readable storage medium any of clauses 55-62, wherein the program code further comprises instructions to: provide additional assistance data to the UE, the additional assistance data comprising data for additional positioning signals, wherein the additional assistance data comprises at least one of complete data or correct data, or a combination thereof, wherein determining whether the positioning measurements have been spoofed based on the location uncertainty associated with the positioning measurements comprises: receive positioning measurements from the UE for the positioning signals and the additional positioning signals; determine a first location uncertainty associated with the positioning measurements for the positioning signals and a second location uncertainty associated with the positioning measurements for the additional positioning signals; and determine whether the positioning measurements have been spoofed based on the first location uncertainty and the second location uncertainty.

Clause 64. The non-transitory computer readable storage medium of clause 63, wherein the instructions to determine whether the positioning measurements have been spoofed based on the first location uncertainty and the second location uncertainty comprise instructions to: compare the first location uncertainty with the second location uncertainty; and determine that the positioning measurements have been spoofed if the first location uncertainty is greater than the second location uncertainty by more than a predetermined threshold, or determining that the positioning measurements are not spoofed if the first location uncertainty is not greater than the second location uncertainty by more than the predetermined threshold.

Clause 65. A method performed by a transmitting entity for supporting reliable positioning of a User Equipment (UE) in a wireless network, comprising: receiving a positioning signal schedule; and transmitting positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE.

Clause 66. The method of clause 65, wherein the transmitting entity comprises a terrestrial base station or a space vehicle.

Clause 67. The method any of clauses 65-66, further comprising transmitting positioning signals to the UE using varying antennas for the transmitting entity, wherein an indication of the varying antennas is not received by the UE.

Clause 68. The method any of clauses 65-67, wherein possible spoofing of positioning measurements from the UE is determined by the location server based on the location uncertainty associated with the positioning measurements received from the UE exceeding, by more than a predetermined threshold, an expected location uncertainty for positioning measurements that are not spoofed, wherein the positioning measurements from the UE are determined by the location server to be not spoofed based on the location uncertainty associated with the positioning measurements received from the UE not exceeding, by more than the predetermined threshold, the expected location uncertainty for positioning measurements that are not spoofed.

Clause 69. A transmitting entity configured for supporting reliable positioning of a User Equipment (UE) in a wireless network, comprising: a communications interface configured to communicate with entities in the wireless network; at least one memory; at least one processor coupled to the communications interface the at least one memory, wherein the at least one processor is configured to: receive, via the communications interface, a positioning signal schedule; and transmit, via the communications interface, positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE.

Clause 70. The transmitting entity of clause 69, wherein the transmitting entity comprises a terrestrial base station or a space vehicle.

Clause 71. The transmitting entity any of clauses 69-70, further comprising transmitting positioning signals to the UE using varying antennas for the transmitting entity, wherein an indication of the varying antennas is not received by the UE.

Clause 72. The transmitting entity any of clauses 69-71, wherein possible spoofing of positioning measurements from the UE is determined by the location server based on the location uncertainty associated with the positioning measurements received from the UE exceeding, by more than a predetermined threshold, an expected location uncertainty for positioning measurements that are not spoofed, wherein the positioning measurements from the UE are determined by the location server to be not spoofed based on the location uncertainty associated with the positioning measurements received from the UE not exceeding, by more than the predetermined threshold, the expected location uncertainty for positioning measurements that are not spoofed.

Clause 73. A transmitting entity configured for supporting reliable positioning of a User Equipment (UE) in a wireless network, comprising: means for receiving a positioning signal schedule; and means for transmitting positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE.

Clause 74. The transmitting entity of clause 73, wherein the transmitting entity comprises a terrestrial base station or a space vehicle.

Clause 75. The transmitting entity any of clauses 73-74, further comprising transmitting positioning signals to the UE using varying antennas for the transmitting entity, wherein an indication of the varying antennas is not received by the UE.

Clause 76. The transmitting entity any of clauses 73-75, wherein possible spoofing of positioning measurements from the UE is determined by the location server based on the location uncertainty associated with the positioning measurements received from the UE exceeding, by more than a predetermined threshold, an expected location uncertainty for positioning measurements that are not spoofed, wherein the positioning measurements from the UE are determined by the location server to be not spoofed based on the location uncertainty associated with the positioning measurements received from the UE not exceeding, by more than the predetermined threshold, the expected location uncertainty for positioning measurements that are not spoofed.

Clause 77. A non-transitory computer readable storage medium including program code stored thereon, the program code is operable to configure at least one processor in a transmitting entity for supporting reliable positioning of a User Equipment (UE) in a wireless network, the program code comprising instructions to: receive a positioning signal schedule; and transmit positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE.

Clause 78. The non-transitory computer readable storage medium of clause 77, wherein the transmitting entity comprises a terrestrial base station or a space vehicle.

Clause 79. The non-transitory computer readable storage medium any of clauses 77-78, further comprising transmitting positioning signals to the UE using varying antennas for the transmitting entity, wherein an indication of the varying antennas is not received by the UE.

Clause 80. The non-transitory computer readable storage medium any of clauses 77-79, wherein possible spoofing of positioning measurements from the UE is determined by the location server based on the location uncertainty associated with the positioning measurements received from the UE exceeding, by more than a predetermined threshold, an expected location uncertainty for positioning measurements that are not spoofed, wherein the positioning measurements from the UE are determined by the location server to be not spoofed based on the location uncertainty associated with the positioning measurements received from the UE not exceeding, by more than the predetermined threshold, the expected location uncertainty for positioning measurements that are not spoofed.

Clause 81. A method performed by a User Equipment (UE) for supporting reliable positioning of the UE in a wireless network, comprising: receiving assistance data, the assistance data comprising data for positioning signals, one or more transmitters, or both, wherein the assistance data comprises at least one of incomplete data or incorrect data, or a combination thereof; obtaining positioning measurements for the positioning signals, the one or more transmitters, or both; sending the positioning measurements to a location server, wherein the positioning measurements enable the location server to determine a location uncertainty associated with the positioning measurements, wherein the location uncertainty enables the location server to determine whether the positioning measurements are spoofed or not spoofed.

Clause 82. The method of clause 81, wherein the one or more transmitters comprise one or more terrestrial base stations, one or more space vehicles or a combination thereof.

Clause 83. The method any of clauses 81-82, wherein the positioning signals transmitted from the one or more transmitters are transmitted according to a positioning signal schedule for each transmitter, wherein actual transmission times of the positioning signals includes a variation in time that differs from transmissions times indicated in the positioning signal schedule, further comprising receiving the positioning signal schedule for each transmitter, wherein the UE does not receive an indication of the variation in time for the actual transmission times of the positioning signals.

Clause 84. The method of clause 83, wherein the UE receives the positioning signal schedule for each transmitter from the transmitter, from another of the one or more transmitters, from the location server or from another server.

Clause 85. The method any of clauses 81-84, wherein the positioning signals transmitted from the one or more transmitters are transmitted from varying antennas for each transmitter, wherein the UE does not receive an indication of the varying antennas.

Clause 86. The method any of clauses 81-85, wherein the at least one of incomplete data or incorrect data, or the combination thereof in the assistance data is configured to produce an inaccuracy in spoofed positioning measurements produced based at least in part on the assistance data.

Clause 87. The method any of clauses 81-86, wherein the assistance data comprises incorrect data that includes a time varying error.

Clause 88. The method any of clauses 81-87, wherein the at least one of incomplete data or incorrect data, or the combination thereof in the assistance data comprises an indication of positioning signal transmission times that includes a time varying error with respect to actual positioning signal transmission times.

Clause 89. The method any of clauses 81-88, wherein the at least one of incomplete data or incorrect data, or a combination thereof in the assistance data comprises an antenna variation for each positioning signal transmission.

Clause 90. The method any of clauses 81-89, wherein the at least one of incomplete data or incorrect data, or the combination thereof in the assistance data comprises at least one of space vehicle ephemeris, a base station location, an antenna location, clock data, positioning signal transmission time, or a combination thereof.

Clause 91. The method any of clauses 81-90, further comprising: receiving additional assistance data, the additional assistance data comprising data for additional positioning signals, wherein the additional assistance data comprises at least one of complete data or correct data, or a combination thereof; obtaining additional positioning measurements for the additional positioning signals; sending the additional positioning measurements to the location server, wherein the additional positioning measurements enable the location server to determine a second location uncertainty associated with the additional positioning measurements, wherein the second location uncertainty in addition to the location uncertainty associated with the positioning measurements enables the location server to determine whether the positioning measurements are spoofed or not spoofed.

Clause 92. A User Equipment (UE) configured for supporting reliable positioning of the UE in a wireless network, comprising: a wireless transceiver configured to wirelessly communicate with entities in the wireless network; at least one memory; at least one processor coupled to the wireless transceiver and the at least one memory, wherein the at least one processor is configured to: receive, via the wireless transceiver, assistance data, the assistance data comprising data for positioning signals, one or more transmitters, or both, wherein the assistance data comprises at least one of incomplete data or incorrect data, or a combination thereof; obtain positioning measurements for the positioning signals, the one or more transmitters, or both; send, via the wireless transceiver, the positioning measurements to a location server, wherein the positioning measurements enable the location server to determine a location uncertainty associated with the positioning measurements, wherein the location uncertainty enables the location server to determine whether the positioning measurements are spoofed or not spoofed.

Clause 93. The UE of clause 92, wherein the one or more transmitters comprise one or more terrestrial base stations, one or more space vehicles or a combination thereof.

Clause 94. The UE any of clauses 92-93, wherein the positioning signals transmitted from the one or more transmitters are transmitted according to a positioning signal schedule for each transmitter, wherein actual transmission times of the positioning signals includes a variation in time that differs from transmissions times indicated in the positioning signal schedule, wherein the at least one processor is further configured to receive, via the wireless transceiver, the positioning signal schedule for each transmitter, wherein the UE does not receive an indication of the variation in time for the actual transmission times of the positioning signals.

Clause 95. The UE of clause 94, wherein the UE receives the positioning signal schedule for each transmitter from the transmitter, from another of the one or more transmitters, from the location server or from another server.

Clause 96. The UE any of clauses 92-95, wherein the positioning signals transmitted from the one or more transmitters are transmitted from varying antennas for each transmitter, wherein the UE does not receive an indication of the varying antennas.

Clause 97. The UE any of clauses 92-96, wherein the at least one of incomplete data or incorrect data, or the combination thereof in the assistance data is configured to produce an inaccuracy in spoofed positioning measurements produced based at least in part on the assistance data.

Clause 98. The UE any of clauses 92-97, wherein the assistance data comprises incorrect data that includes a time varying error.

Clause 99. The UE any of clauses 92-98, wherein the at least one of incomplete data or incorrect data, or the combination thereof in the assistance data comprises an indication of positioning signal transmission times that includes a time varying error with respect to actual positioning signal transmission times.

Clause 100. The UE any of clauses 92-99, wherein the at least one of incomplete data or incorrect data, or a combination thereof in the assistance data comprises an antenna variation for each positioning signal transmission.

Clause 101. The UE any of clauses 92-100, wherein the at least one of incomplete data or incorrect data, or the combination thereof in the assistance data comprises at least one of space vehicle ephemeris, a base station location, an antenna location, clock data, positioning signal transmission time, or a combination thereof.

Clause 102. The UE any of clauses 92-101, wherein the at least one processor is further configured to: receive additional assistance data, the additional assistance data comprising data for additional positioning signals, wherein the additional assistance data comprises at least one of complete data or correct data, or a combination thereof; obtain additional positioning measurements for the additional positioning signals; send the additional positioning measurements to the location server, wherein the additional positioning measurements enable the location server to determine a second location uncertainty associated with the additional positioning measurements, wherein the second location uncertainty in addition to the location uncertainty associated with the positioning measurements enables the location server to determine whether the positioning measurements are spoofed or not spoofed.

Clause 103. A User Equipment (UE) configured for supporting reliable positioning of the UE in a wireless network, comprising: means for receiving assistance data, the assistance data comprising data for positioning signals, one or more transmitters, or both, wherein the assistance data comprises at least one of incomplete data or incorrect data, or a combination thereof; means for obtaining positioning measurements for the positioning signals, the one or more transmitters, or both; means for sending the positioning measurements to a location server, wherein the positioning measurements enable the location server to determine a location uncertainty associated with the positioning measurements, wherein the location uncertainty enables the location server to determine whether the positioning measurements are spoofed or not spoofed.

Clause 104. The UE of clause 103, wherein the one or more transmitters comprise one or more terrestrial base stations, one or more space vehicles or a combination thereof.

Clause 105. The UE any of clauses 103-104, wherein the positioning signals transmitted from the one or more transmitters are transmitted according to a positioning signal schedule for each transmitter, wherein actual transmission times of the positioning signals includes a variation in time that differs from transmissions times indicated in the positioning signal schedule, further comprising means for receiving the positioning signal schedule for each transmitter, wherein the UE does not receive an indication of the variation in time for the actual transmission times of the positioning signals.

Clause 106. The UE of clause 105, wherein the UE receives the positioning signal schedule for each transmitter from the transmitter, from another of the one or more transmitters, from the location server or from another server.

Clause 107. The UE any of clauses 103-106, wherein the positioning signals transmitted from the one or more transmitters are transmitted from varying antennas for each transmitter, wherein the UE does not receive an indication of the varying antennas.

Clause 108. The UE any of clauses 103-107, wherein the at least one of incomplete data or incorrect data, or the combination thereof in the assistance data is configured to produce an inaccuracy in spoofed positioning measurements produced based at least in part on the assistance data.

Clause 109. The UE any of clauses 103-108, wherein the assistance data comprises incorrect data that includes a time varying error.

Clause 110. The UE any of clauses 103-109, wherein the at least one of incomplete data or incorrect data, or the combination thereof in the assistance data comprises an indication of positioning signal transmission times that includes a time varying error with respect to actual positioning signal transmission times.

Clause 111. The UE any of clauses 103-110, wherein the at least one of incomplete data or incorrect data, or a combination thereof in the assistance data comprises an antenna variation for each positioning signal transmission.

Clause 112. The UE any of clauses 103-111, wherein the at least one of incomplete data or incorrect data, or the combination thereof in the assistance data comprises at least one of space vehicle ephemeris, a base station location, an antenna location, clock data, positioning signal transmission time, or a combination thereof.

Clause 113. The UE any of clauses 103-112, further comprising: means for receiving additional assistance data, the additional assistance data comprising data for additional positioning signals, wherein the additional assistance data comprises at least one of complete data or correct data, or a combination thereof; means for obtaining additional positioning measurements for the additional positioning signals; means for sending the additional positioning measurements to the location server, wherein the additional positioning measurements enable the location server to determine a second location uncertainty associated with the additional positioning measurements, wherein the second location uncertainty in addition to the location uncertainty associated with the positioning measurements enables the location server to determine whether the positioning measurements are spoofed or not spoofed.

Clause 114. A non-transitory computer readable storage medium including program code stored thereon, the program code is operable to configure at least one processor in a User Equipment (UE) to support reliable positioning of the UE in a wireless network, the program code comprising instructions to: receive assistance data, the assistance data comprising data for positioning signals, one or more transmitters, or both, wherein the assistance data comprises at least one of incomplete data or incorrect data, or a combination thereof; obtain positioning measurements for the positioning signals, the one or more transmitters, or both; send the positioning measurements to a location server, wherein the positioning measurements enable the location server to determine a location uncertainty associated with the positioning measurements, wherein the location uncertainty enables the location server to determine whether the positioning measurements are spoofed or not spoofed.

Clause 115. The non-transitory computer readable storage medium of clause 114, wherein the one or more transmitters comprise one or more terrestrial base stations, one or more space vehicles or a combination thereof.

Clause 116. The non-transitory computer readable storage medium any of clauses 114-115, wherein the positioning signals transmitted from the one or more transmitters are transmitted according to a positioning signal schedule for each transmitter, wherein actual transmission times of the positioning signals includes a variation in time that differs from transmissions times indicated in the positioning signal schedule, wherein the program code further comprises instructions to receive the positioning signal schedule for each transmitter, wherein the UE does not receive an indication of the variation in time for the actual transmission times of the positioning signals.

Clause 117. The non-transitory computer readable storage medium of clause 116, wherein the UE receives the positioning signal schedule for each transmitter from the transmitter, from another of the one or more transmitters, from the location server or from another server.

Clause 118. The non-transitory computer readable storage medium any of clauses 114-117, wherein the positioning signals transmitted from the one or more transmitters are transmitted from varying antennas for each transmitter, wherein the UE does not receive an indication of the varying antennas.

Clause 119. The non-transitory computer readable storage medium any of clauses 114-118, wherein the at least one of incomplete data or incorrect data, or the combination thereof in the assistance data is configured to produce an inaccuracy in spoofed positioning measurements produced based at least in part on the assistance data.

Clause 120. The non-transitory computer readable storage medium any of clauses 114-119, wherein the assistance data comprises incorrect data that includes a time varying error.

Clause 121. The non-transitory computer readable storage medium any of clauses 114-120, wherein the at least one of incomplete data or incorrect data, or the combination thereof in the assistance data comprises an indication of positioning signal transmission times that includes a time varying error with respect to actual positioning signal transmission times.

Clause 122. The non-transitory computer readable storage medium any of clauses 114-121, wherein the at least one of incomplete data or incorrect data, or a combination thereof in the assistance data comprises an antenna variation for each positioning signal transmission.

Clause 123. The non-transitory computer readable storage medium of any clauses 114-122, wherein the at least one of incomplete data or incorrect data, or the combination thereof in the assistance data comprises at least one of space vehicle ephemeris, a base station location, an antenna location, clock data, positioning signal transmission time, or a combination thereof.

Clause 124. The non-transitory computer readable storage medium of any clauses 114-123, wherein the program code further comprises instructions to: receive additional assistance data, the additional assistance data comprising data for additional positioning signals, wherein the additional assistance data comprises at least one of complete data or correct data, or a combination thereof; obtain additional positioning measurements for the additional positioning signals; send the additional positioning measurements to the location server, wherein the additional positioning measurements enable the location server to determine a second location uncertainty associated with the additional positioning measurements, wherein the second location uncertainty in addition to the location uncertainty associated with the positioning measurements enables the location server to determine whether the positioning measurements are spoofed or not spoofed.

Therefore, it is intended that claimed subject matter not be limited to the particular examples disclosed, but that such claimed subject matter may also include all aspects falling within the scope of appended claims, and equivalents thereof.

What is claimed is:

1. A method performed by a location server for supporting reliable positioning of a User Equipment (UE) in a wireless network, comprising:
   receiving positioning measurements from the UE, wherein:
      the positioning measurements from the UE comprise actual positioning measurements or spoofed positioning measurements of positioning signals transmitted from one or more transmitters,
      the positioning signals transmitted from the one or more transmitters are transmitted according to a positioning signal schedule for each transmitter,
      actual transmission times of the positioning signals includes a variation in time that differs from transmission times indicated in the positioning signal schedule,
      the positioning signal schedule for each transmitter is provided to the UE, and
      an indication of the variation in time for the actual transmission times of the positioning signals is not provided to the UE;
   determining a location uncertainty associated with the positioning measurements; and
   determining whether the positioning measurements have been spoofed based on the location uncertainty associated with the positioning measurements.

2. The method of claim 1, wherein the one or more transmitters comprise one or more terrestrial base stations, one or more space vehicles or a combination thereof.

3. The method of claim 1, wherein the positioning signal schedule for each transmitter is received by the UE from the transmitter, from another of the one or more transmitters, from the location server or from another server.

4. The method of claim 1, wherein the positioning signals transmitted from the one or more transmitters are transmitted from varying antennas for each transmitter, wherein the UE does not receive an indication of the varying antennas is not received by the UE.

5. The method of claim 1, wherein determining whether the positioning measurements have been spoofed based on the location uncertainty associated with the positioning measurements comprises:
   comparing the location uncertainty associated with the positioning measurements with an expected location uncertainty for positioning measurements that are not spoofed; and
   determining that the positioning measurements have been spoofed if the location uncertainty is greater than the expected location uncertainty by more than a predetermined threshold, or determining that the positioning measurements are not spoofed if the location uncertainty is not greater than the expected location uncertainty by more than the predetermined threshold.

6. A method performed by a location server for supporting reliable positioning of a User Equipment (UE) in a wireless network, comprising:
   providing assistance data to the UE, the assistance data comprising data for positioning signals, one or more transmitters, or both, wherein the assistance data comprises at least one of incomplete data or incorrect data, or a combination thereof;

receiving positioning measurements from the UE;

determining a location uncertainty associated with the positioning measurements; and determining whether the positioning measurements have been spoofed based on the location uncertainty associated with the positioning measurements.

7. The method of claim 6, wherein the at least one of incomplete data or incorrect data, or the combination thereof in the assistance data is configured to produce an inaccuracy in spoofed positioning measurements produced based at least in part on the assistance data.

8. The method of claim 6, wherein the assistance data comprises incorrect data that includes a time varying error.

9. The method of claim 6, wherein the at least one of incomplete data or incorrect data, or the combination thereof in the assistance data comprises an indication of positioning signal transmission times that includes a time varying error with respect to actual positioning signal transmission times.

10. The method of claim 6, wherein the at least one of incomplete data or incorrect data, or a combination thereof in the assistance data comprises an antenna variation for each positioning signal transmission.

11. The method of claim 6, wherein the at least one of incomplete data or incorrect data, or the combination thereof in the assistance data comprises at least one of space vehicle ephemeris, a base station location, an antenna location, clock data, positioning signal transmission time, or a combination thereof.

12. The method of claim 6, wherein determining the location uncertainty associated with the positioning measurements comprises determining an estimated location of the UE and the location uncertainty for the estimated location of the UE based on the positioning measurements and correct and complete data for the positioning signals and the one or more transmitters.

13. The method of claim 6, further comprising:
providing additional assistance data to the UE, the additional assistance data comprising data for additional positioning signals, wherein the additional assistance data comprises at least one of complete data or correct data, or a combination thereof,
wherein determining whether the positioning measurements have been spoofed based on the location uncertainty associated with the positioning measurements comprises:
receiving positioning measurements from the UE for the positioning signals and the additional positioning signals;
determining a first location uncertainty associated with the positioning measurements for the positioning signals and a second location uncertainty associated with the positioning measurements for the additional positioning signals; and
determining whether the positioning measurements have been spoofed based on the first location uncertainty and the second location uncertainty.

14. The method of claim 13, wherein determining whether the positioning measurements have been spoofed based on the first location uncertainty and the second location uncertainty comprises:
comparing the first location uncertainty with the second location uncertainty; and determining that the positioning measurements have been spoofed if the first location uncertainty is greater than the second location uncertainty by more than a predetermined threshold, or determining that the positioning measurements are not spoofed if the first location uncertainty is not greater than the second location uncertainty by more than the predetermined threshold.

15. A location server configured for supporting reliable positioning of a User Equipment (UE) in a wireless network, comprising:
an external interface configured to wirelessly communicate with entities in the wireless network;
at least one memory;
at least one processor coupled to the external interface and the at least one memory, wherein the at least one processor is configured to:
receive, via the external interface, positioning measurements from the UE, wherein:
the positioning measurements from the UE comprise actual positioning measurements or spoofed positioning measurements of positioning signals transmitted from one or more transmitters,
the positioning signals transmitted from the one or more transmitters are transmitted according to a positioning signal schedule for each transmitter,
actual transmission times of the positioning signals includes a variation in time that differs from transmission times indicated in the positioning signal schedule,
the positioning signal schedule for each transmitter is provided to the UE, and
an indication of the variation in time for the actual transmission times of the positioning signals is not provided to the UE;
determine a location uncertainty associated with the positioning measurements; and
determine whether the positioning measurements have been spoofed based on the location uncertainty associated with the positioning measurements.

16. The location server of claim 15, wherein the one or more transmitters comprise one or more terrestrial base stations, one or more space vehicles or a combination thereof.

17. The location server of claim 15, wherein the positioning signal schedule for each transmitter is received by the UE from the transmitter, from another of the one or more transmitters, from the location server or from another server.

18. The location server of claim 15, wherein the positioning signals transmitted from the one or more transmitters are transmitted from varying antennas for each transmitter, wherein an indication of the varying antennas is not received by the UE.

19. The location server of claim 15, wherein the at least one processor is configured to determine whether the positioning measurements may have been spoofed based on the location uncertainty associated with the positioning measurements by being configured to:
compare the location uncertainty associated with the positioning measurements with an expected location uncertainty for positioning measurements that are not spoofed; and
determine that the positioning measurements have been spoofed if the location uncertainty is greater than the expected location uncertainty by more than a predetermined threshold, or determine that the positioning measurements are not spoofed if the location uncertainty is not greater than the expected location uncertainty by more than the predetermined threshold.

20. A location server configured for supporting reliable positioning of a User Equipment (UE) in a wireless network, comprising:
an external interface configured to wirelessly communicate with entities in the wireless network;
at least one memory;
at least one processor coupled to the external interface and the at least one memory, wherein the at least one processor is configured to:
provide assistance data, via the external interface, to the UE, the assistance data comprising data for positioning signals, one or more transmitters, or both, wherein the assistance data comprises at least one of incomplete data or incorrect data, or a combination thereof;
receive, via the external interface, positioning measurements from the UE;
determine a location uncertainty associated with the positioning measurements; and
determine whether the positioning measurements have been spoofed based on the location uncertainty associated with the positioning measurements.

21. The location server of claim 20, wherein the at least one of incomplete data or incorrect data, or the combination thereof in the assistance data is configured to produce an inaccuracy in spoofed positioning measurements produced based at least in part on the assistance data.

22. The location server of claim 20, wherein the assistance data comprises incorrect data that includes a time varying error.

23. The location server of claim 20, wherein the at least one of incomplete data or incorrect data, or the combination thereof in the assistance data comprises an indication of positioning signal transmission times that includes a time varying error with respect to actual positioning signal transmission times.

24. The location server of claim 20, wherein the at least one of incomplete data or incorrect data, or a combination thereof in the assistance data comprises an antenna variation for each positioning signal transmission.

25. The location server of claim 20, wherein the at least one of incomplete data or incorrect data, or the combination thereof in the assistance data comprises at least one of space vehicle ephemeris, a base station location, clock data, positioning signal transmission time, or a combination thereof.

26. The location server of claim 20, wherein the at least one processor is configured to determine the location uncertainty associated with the positioning measurements by being configured to determine an estimated location of the UE and the location uncertainty for the estimated location of the UE based on the positioning measurements and correct complete data for the positioning signals and the one or more transmitters.

27. The location server of claim 20, wherein the at least one processor further is further configured to:
provide additional assistance data to the UE, the additional assistance data comprising data for additional positioning signals, wherein the additional assistance data comprises at least one of complete data or correct data, or a combination thereof,
wherein determining whether the positioning measurements have been spoofed based on the location uncertainty associated with the positioning measurements comprises:
receive positioning measurements from the UE for the positioning signals and the additional positioning signals;
determine a first location uncertainty associated with the positioning measurements for the positioning signals and a second location uncertainty associated with the positioning measurements for the additional positioning signals; and
determine whether the positioning measurements have been spoofed based on the first location uncertainty and the second location uncertainty.

28. The location server of claim 27, wherein the at least one processor further is configured to determine whether the positioning measurements have been spoofed based on the first location uncertainty and the second location uncertainty by being configured to:
compare the first location uncertainty with the second location uncertainty; and
determine that the positioning measurements have been spoofed if the first location uncertainty is greater than the second location uncertainty by more than a predetermined threshold, or determining that the positioning measurements are not spoofed if the first location uncertainty is not greater than the second location uncertainty by more than the predetermined threshold.

29. A method performed by a transmitting entity for supporting reliable positioning of a User Equipment (UE) in a wireless network, comprising:
receiving a positioning signal schedule; and
transmitting positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE.

30. The method of claim 29, wherein the transmitting entity comprises a terrestrial base station or a space vehicle.

31. The method of claim 29, further comprising transmitting positioning signals to the UE using varying antennas for the transmitting entity, wherein an indication of the varying antennas is not received by the UE.

32. The method of claim 29, wherein possible spoofing of positioning measurements from the UE is determined by the location server based on the location uncertainty associated with the positioning measurements received from the UE exceeding, by more than a predetermined threshold, an expected location uncertainty for positioning measurements that are not spoofed, wherein the positioning measurements from the UE are determined by the location server to be not spoofed based on the location
uncertainty associated with the positioning measurements received from the UE not exceeding, by more than the predetermined threshold, the expected location uncertainty for positioning measurements that are not spoofed.

33. A transmitting entity configured for supporting reliable positioning of a User Equipment (UE) in a wireless network, comprising:
a communications interface configured to communicate with entities in the wireless network;
at least one memory;

at least one processor coupled to the communications interface the at least one memory, wherein the at least one processor is configured to:

receive, via the communications interface, a positioning signal schedule; and transmit, via the communications interface, positioning signals to the UE based on the positioning signal schedule to enable positioning measurements by the UE, wherein actual transmission times of the positioning signals include a variation in time that differs from transmissions times indicated to the UE, wherein positioning measurements by the UE are used by a location server to determine possible spoofing of positioning measurements received from the UE based on a location uncertainty associated with the positioning measurements received from the UE.

34. The transmitting entity of claim 33, wherein the transmitting entity comprises a terrestrial base station or a space vehicle.

35. The transmitting entity of claim 33, further comprising transmitting positioning signals to the UE using varying antennas for the transmitting entity, wherein an indication of the varying antennas is not received by the UE.

36. The transmitting entity of claim 33, wherein possible spoofing of positioning measurements from the UE is determined by the location server based on the location uncertainty associated with the positioning measurements received from the UE exceeding, by more than a predetermined threshold, an expected location uncertainty for positioning measurements that are not spoofed, wherein the positioning measurements from the UE are determined by the location server to be not spoofed based on the location uncertainty associated with the positioning measurements received from the UE not exceeding, by more than the predetermined threshold, the expected location uncertainty for positioning measurements that are not spoofed.

* * * * *